US012412449B2

(12) United States Patent
Acres et al.

(10) Patent No.: US 12,412,449 B2
(45) Date of Patent: Sep. 9, 2025

(54) DISPATCHING CASINO AGENTS TO AN ELECTRONIC GAMING MACHINE

(71) Applicant: Acres Technology, Las Vegas, NV (US)

(72) Inventors: John F. Acres, Las Vegas, NV (US); Kevin Parker, Las Vegas, NV (US); Andrea McCurry, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 0 days.

(21) Appl. No.: 18/476,554

(22) Filed: Sep. 28, 2023

(65) Prior Publication Data

US 2024/0135775 A1 Apr. 25, 2024
US 2024/0233484 A9 Jul. 11, 2024

Related U.S. Application Data

(60) Continuation of application No. 17/512,102, filed on Oct. 27, 2021, now Pat. No. 11,810,420, which is a continuation of application No. 16/750,325, filed on Jan. 23, 2020, now Pat. No. 11,183,011, which is a continuation of application No. 15/628,855, filed on Jun. 21, 2017, now Pat. No. 10,593,151, which is a division of application No. 15/207,061, filed on Jul. 11, 2016, now abandoned, which is a continuation of application No. 13/917,506, filed on Jun. 13, 2013, now abandoned.

(51) Int. Cl.
*G07F 17/32* (2006.01)

(52) U.S. Cl.
CPC ...... *G07F 17/3234* (2013.01); *G07F 17/3232* (2013.01)

(58) Field of Classification Search
None
See application file for complete search history.

(56) References Cited

U.S. PATENT DOCUMENTS

| | | | |
|---|---|---|---|
| 5,111,391 | A | 5/1992 | Fields et al. |
| 5,127,651 | A | 7/1992 | Okada |

(Continued)

FOREIGN PATENT DOCUMENTS

| | | | |
|---|---|---|---|
| EP | 0443738 | A2 | 8/1991 |
| EP | 0896305 | A2 | 2/1999 |

(Continued)

OTHER PUBLICATIONS

Bally Command Center Brochure, Ballys Technologies 2009.

(Continued)

*Primary Examiner* — Omkar A Deodhar
(74) *Attorney, Agent, or Firm* — Ballard Spahr LLP

(57) ABSTRACT

Embodiments of the present invention are directed to a method for dispatching a person to an electronic gaming machine in response to a predefined event at the electronic gaming machine. A listing of casino agents who may be dispatched is stored on in a database. A communication on a network of gaming machines is received indicating that a casino agent should be dispatched to one of the electronic gaming machines. A signal is automatically sent to a wireless device carried by a person including data that identifies the one electronic gaming device.

20 Claims, 60 Drawing Sheets

(56) References Cited

U.S. PATENT DOCUMENTS

| | | | |
|---|---|---|---|
| 5,830,065 | A | 11/1998 | Sitrick |
| 5,857,909 | A | 1/1999 | Rubin |
| 5,970,143 | A | 10/1999 | Schneier et al. |
| 6,113,492 | A | 9/2000 | Walker et al. |
| 6,146,273 | A | 11/2000 | Olsen |
| 6,174,234 | B1 | 1/2001 | Seibert, Jr. et al. |
| 6,176,774 | B1 | 1/2001 | Filiberti et al. |
| 6,217,447 | B1 | 4/2001 | Lofink et al. |
| 6,227,970 | B1 | 5/2001 | Shimizu et al. |
| 6,319,122 | B1 | 11/2001 | Packes, Jr. et al. |
| 6,454,651 | B1 | 9/2002 | Yoseloff |
| 6,699,124 | B2 | 3/2004 | Suchocki |
| 6,728,679 | B1 | 4/2004 | Strubbe et al. |
| 6,800,027 | B2 | 10/2004 | Giobbi et al. |
| 6,932,702 | B1 | 8/2005 | Harris |
| 6,962,531 | B2 | 11/2005 | Pace et al. |
| 7,105,736 | B2 | 9/2006 | Laakso |
| 7,327,217 | B2 | 2/2008 | Carter et al. |
| 7,361,088 | B2 | 4/2008 | Maya et al. |
| 7,729,946 | B2 | 6/2010 | Chu |
| 7,753,789 | B2 | 7/2010 | Walker et al. |
| 7,765,121 | B2 | 7/2010 | Pace et al. |
| 7,957,565 | B1 | 6/2011 | Sharma et al. |
| 8,023,965 | B2 | 9/2011 | Michaud |
| 8,571,905 | B2 | 10/2013 | Risnoveanu et al. |
| 9,805,315 | B1 | 10/2017 | Cohen et al. |
| 2001/0024971 | A1 | 9/2001 | Brossard |
| 2002/0046102 | A1 | 4/2002 | Dohring et al. |
| 2002/0058550 | A1* | 5/2002 | Pace .................... G06Q 10/109 463/42 |
| 2002/0107715 | A1 | 8/2002 | Pace et al. |
| 2002/0132666 | A1 | 9/2002 | Lind et al. |
| 2002/0152120 | A1 | 10/2002 | Howington |
| 2002/0161882 | A1 | 10/2002 | Chatani |
| 2003/0003997 | A1 | 1/2003 | Vuong et al. |
| 2003/0013527 | A1 | 1/2003 | Rowe et al. |
| 2003/0027635 | A1 | 2/2003 | Walker et al. |
| 2003/0054878 | A1 | 3/2003 | Benoy et al. |
| 2003/0069074 | A1 | 4/2003 | Jackson |
| 2003/0100373 | A1 | 5/2003 | Fujimoto et al. |
| 2003/0114217 | A1 | 6/2003 | Walker et al. |
| 2003/0195031 | A1 | 10/2003 | O'Donovan et al. |
| 2003/0220139 | A1 | 11/2003 | Peterson |
| 2004/0014479 | A1 | 1/2004 | Milman |
| 2004/0018478 | A1 | 1/2004 | Styles |
| 2004/0024608 | A1 | 2/2004 | Saenz et al. |
| 2004/0127290 | A1 | 7/2004 | Walker et al. |
| 2004/0147300 | A1 | 7/2004 | Seelig et al. |
| 2005/0125244 | A1 | 6/2005 | Schneider |
| 2005/0181873 | A1 | 8/2005 | Bond |
| 2005/0192086 | A1 | 9/2005 | Walker et al. |
| 2005/0282626 | A1 | 12/2005 | Manfredi et al. |
| 2006/0053035 | A1 | 3/2006 | Eisenberg |
| 2006/0128463 | A1 | 6/2006 | Okada |
| 2006/0154720 | A1 | 7/2006 | Okuniewicz |
| 2006/0172792 | A1 | 8/2006 | Vancura |
| 2006/0189367 | A1 | 8/2006 | Nguyen et al. |
| 2006/0287068 | A1* | 12/2006 | Walker .................... G07F 17/32 463/25 |
| 2007/0054738 | A1 | 3/2007 | Muir |
| 2007/0087797 | A1 | 4/2007 | Van Luchene |
| 2007/0087810 | A1 | 4/2007 | Walker et al. |
| 2007/0087834 | A1 | 4/2007 | Moser et al. |
| 2007/0117608 | A1 | 5/2007 | Roper et al. |
| 2007/0135202 | A1 | 6/2007 | Linard et al. |
| 2007/0174809 | A1 | 7/2007 | Brown et al. |
| 2007/0178909 | A1 | 8/2007 | Doyle |
| 2007/0180389 | A1 | 8/2007 | Holm et al. |
| 2007/0225076 | A1 | 9/2007 | Aida |
| 2008/0004996 | A1 | 1/2008 | Kuehling |
| 2008/0020788 | A1 | 1/2008 | Griswold et al. |
| 2008/0020845 | A1 | 1/2008 | Low et al. |
| 2008/0076529 | A1 | 3/2008 | Richards et al. |
| 2008/0086325 | A1 | 4/2008 | James |
| 2008/0090645 | A1 | 4/2008 | Walker et al. |
| 2008/0183678 | A1 | 7/2008 | Weston et al. |
| 2008/0280684 | A1 | 11/2008 | McBride et al. |
| 2008/0311979 | A1 | 12/2008 | Walker et al. |
| 2009/0055204 | A1 | 2/2009 | Pennington et al. |
| 2009/0124355 | A1 | 5/2009 | Acres |
| 2009/0138342 | A1 | 5/2009 | Otto et al. |
| 2009/0170608 | A1 | 7/2009 | Herrmann et al. |
| 2009/0234712 | A1 | 9/2009 | Kolawa et al. |
| 2009/0239667 | A1 | 9/2009 | Rowe et al. |
| 2009/0284348 | A1 | 11/2009 | Pfeffer |
| 2009/0291762 | A1 | 11/2009 | Walker |
| 2009/0307349 | A1 | 12/2009 | Harris et al. |
| 2010/0029382 | A1 | 2/2010 | Cao |
| 2010/0093434 | A1 | 4/2010 | Rivas |
| 2010/0113161 | A1* | 5/2010 | Walker ................ G07F 17/3234 463/43 |
| 2010/0121808 | A1 | 5/2010 | Kuhn |
| 2010/0125789 | A1 | 5/2010 | Burke et al. |
| 2010/0188936 | A1 | 7/2010 | Beppu et al. |
| 2010/0298040 | A1 | 11/2010 | Joshi et al. |
| 2010/0323785 | A1 | 12/2010 | Motyl et al. |
| 2011/0071880 | A1 | 3/2011 | Spector |
| 2011/0183732 | A1 | 7/2011 | Block et al. |
| 2011/0205068 | A1 | 8/2011 | Huynh et al. |
| 2011/0289064 | A1 | 11/2011 | Lebeau et al. |
| 2011/0314297 | A1 | 12/2011 | Jakobsson |
| 2012/0094756 | A1 | 4/2012 | Griswold et al. |
| 2012/0122585 | A1 | 5/2012 | Nguyen |
| 2012/0150578 | A1 | 6/2012 | Mangat et al. |
| 2012/0214583 | A1 | 8/2012 | Uchiyama et al. |
| 2012/0315880 | A1 | 12/2012 | Peitrow et al. |
| 2013/0063008 | A1 | 3/2013 | Martin |
| 2013/0084960 | A1 | 4/2013 | Frady |
| 2013/0084971 | A1 | 4/2013 | Frady |
| 2013/0084972 | A1 | 4/2013 | Frady |
| 2013/0084973 | A1 | 4/2013 | Frady |
| 2013/0217508 | A1 | 8/2013 | Golden |
| 2013/0227437 | A1 | 8/2013 | Brody et al. |
| 2013/0275169 | A1 | 10/2013 | Acres |
| 2013/0324237 | A1* | 12/2013 | Adiraju ............... G07F 17/3237 463/29 |
| 2014/0080590 | A1 | 3/2014 | Link et al. |
| 2014/0279244 | A1 | 9/2014 | Robinson et al. |
| 2014/0370989 | A1 | 12/2014 | Acres et al. |
| 2015/0310380 | A1 | 10/2015 | Acres et al. |
| 2016/0284162 | A1 | 9/2016 | Acres et al. |
| 2016/0321866 | A1 | 11/2016 | Acres et al. |
| 2017/0186270 | A1 | 6/2017 | Acres |
| 2017/0278345 | A1 | 9/2017 | Acres et al. |
| 2017/0287268 | A1 | 10/2017 | Acres et al. |
| 2017/0330424 | A1 | 11/2017 | Acres |

FOREIGN PATENT DOCUMENTS

| | | | |
|---|---|---|---|
| GB | 2354179 | A | 3/2001 |
| GB | 2408949 | A | 6/2005 |
| JP | 4024039 | B2 | 12/2007 |
| JP | 6343738 | B1 | 6/2018 |
| WO | 0195265 | A1 | 12/2001 |
| WO | 02/32517 | A2 | 4/2002 |
| WO | 2008/130398 | A1 | 10/2008 |

OTHER PUBLICATIONS

Bally Technologies, "RCT Online, Daily News, Bally Technologies provides Foxwoods with new slots," 2011, 1 page.

Brighthub, "Best Voice Recorder Apps for the iPhone," found at http://www.brighthub.com:80/mobile/iphone/articles/79855.aspx.

Casino City Press, "Chops & Assoc. Live Animation," Nov. 11, 2011, 1 page.

CHS Backoffice UI Design part 2, cargocollective webpages, Mar. 2012 http://yanays.com/79633/728672/-portfolio/-chs-boffice.

Factiva, Inc., Norte! Networks Ltd—"Solutions Enhance Competitive Edge of Hospitality Sector in Caribbean and Latin America," May 17, 2006, 3 pages.

(56) References Cited

OTHER PUBLICATIONS

Factivia, Inc., Resort and Casino Companies: Great Wolf Lodge—Pocono Mountains Unveils Great Wolfe Story Explorers-, 2011, 2 pages.
Garnett, O., "An Introduction to skills-based routing and its operational complexities," Service Engineering 2000.
Montana, "Genetic Algorithms for Complex, Real-Time Scheduling", International Conference on Systems, Man and Cybemetic,s, 1998, http://citeseerx.ist.psu.edu/viewdoc/summary?doi=10.1.1.130.3277.
OHS Backoffice UI Design, cargocollective webpages, Mar. 2012 http://cargocollective.com/yaays#CHS-BackOffice.
Patrachari Ram, "Business Process Management for Casinos," Indian Gaming, Nov. 2010 http://www.indiangaming.com/istore/Nov10_Patrachari.pdf.
Reateguia, E. et al. "Personalization in an interactive learning environment through a virtual character," abstract only, 1 page, 2007, Computers & Education vol. 51, Issue 2, found at www.sciencedirect.com.
SDS line testing with the 19C Scopemeter test tool, fluke webpages, Feb. 2012 http://supportfluke.comffind-sales/download/asset/2444901_a_w.pdf.
U.S. Appl. No. 16/429,4-44 filed Jun. 5, 2019 to Acres.
U.S. Appl. No. 16/676,743, filed Nov. 7, 2019 to Acres.
Xue et al, "A fuzzy mathematics based optimal delivery scheduling approach," Computers in Industry 45, 245-259, 2001.

* cited by examiner

FIG. 57
iPod
2:08 PM
Alpha Z.
06 / 04 / 2013
PENDING CALL
Bill James Elite
Location:
C063201
Event:
Hot Player
Call
Hot Player at C063201 for Bill James (Elite)
Accept
Defer
Defer
Accept
Status
Call
Text
Radio
About

FIG. 60
iPod
1:38 PM
Alpha Z.
06 / 04 / 2013
PENDING CALL
Bill James Elite
Location:
C063201
Event:
Abandoned Card
Call
Abandoned Card at C063201 for
Bill James (Elite)
Accept
Defer
Defer
Accept
Status
Call
Text
Radio
About

FIG. 61
iPod
1:38 PM
Alpha Z.
06 / 04 / 2013
ACTIVE CALL
Bill James Elite
Location:
C063201
Event:
Abandonded Card
Joining you:
No co-workers joining.
Quit
Arrive
Status
Call
Text
Radio
About

DISPATCHING CASINO AGENTS TO AN ELECTRONIC GAMING MACHINE

CROSS REFERENCE TO RELATED APPLICATIONS

This application is continuation of U.S. patent application Ser. No. 17/512,102 filed Oct. 27, 2021, which is a continuation of U.S. patent application Ser. No. 16/750,325 filed Jan. 23, 2020, now U.S. Pat. No. 11,183,011 issued Nov. 23, 2021, which is a continuation of U.S. patent application Ser. No. 15/628,855, filed Jun. 21, 2017, now U.S. Pat. No. 10,593,151 issued Mar. 17, 2020, which is a divisional of U.S. patent application Ser. No. 15/207,061, filed Jul. 11, 2016, now abandoned, which is a continuation of, and claims priority to, U.S. patent application Ser. No. 13/917,506, filed Jun. 13, 2013, now abandoned, which are hereby incorporated by reference.

This application also is related to applicant's application Ser. No. 13/445,355 for Method and Apparatus for Communicating Information about Networked Gaming Machines to Prospective Players ("the '355 application"), which was filed on Apr. 12, 2012, now U.S. Pat. No. 9,224,260 issued on Dec. 29, 2015, and is hereby incorporated by reference. It is also related to applicant's application Ser. No. 13/445,438 for Method and Apparatus for Monitoring a Network of Gaming Machines and Dispatching Service Providers, which was also filed on Apr. 12, 2012, and is hereby incorporated by reference.

FIELD OF THE INVENTION

This disclosure relates generally to systems to facilitate communication with and among casino employees using mobile computing devices and to log information about service provided by the employees in the course of their work.

BACKGROUND

Most casinos include networks of electronic gaming devices. Any one of the gaming devices, e.g., a slot machine, might need service for a variety of reasons such as a full bill acceptor, a hardware failure, a printer malfunction, a ticket printer that is out of paper, a low memory backup-battery, a jackpot large enough to require hand payment, etc. In addition, a player at the gaming machine can press a button at the machine to request an attendant to make change to place a drink order. There are many varied reasons why a casino agent may need to make a trip to a specified slot machine. In a busy casino, there may be as many as 20 calls per minute for service of one sort or another.

As can be appreciated, for many of the service requirements, the game is not playable until the problem is addressed. This is especially troublesome when someone is playing the game when the problem arises and is prevented from playing until it is addressed. The most difficult situation for the casino is when this happens to a player who is a frequent guest, who wagers large amounts, or who has the potential to be such a player. Casinos expend a lot of effort to extend special courtesies to players who wager significant amounts on a regular basis. Ideally, the attendant responding to a problem at a machine being played by such a player would know the value of the player and be motivated to treat him or her accordingly.

Dealing with service problems and requests that arise during game play is problematic enough but it can be compounded when a casino is limited in its ability to fire, discipline, or motivate the workers whose job it is to respond to these calls.

In addition to the types of service requirements that arise during game play—and therefore require a fast response—there are tasks, such as preventative maintenance, that can be performed anytime. As a result, it is desirable to schedule these tasks when the casino staff is not busy addressing the types of problems that require immediate attention.

It is also desirable to prioritize among the casino guests who should be accorded faster and/or higher levels of service and to personalize all service provided to the extent possible.

Most casinos equip employees who respond to service calls on the game floor with 2-way radios, with which the employee may be dispatched on calls or updated with new information relating to a call. And the employee may use the radio to summon assistance from other employees or for any other on-the-job reason that might require verbal communication. This can be distracting to employees who must provide service and interact with players and co-workers while listening or responding to talk that is piped into an earpiece worn by each employee who carries a radio. Reducing and simplifying verbal communications for these casino employees would be helpful.

Casinos provide incentives for players to join a player club. This permits the casino to track the player's play, typically via a card that is inserted into a player-tracking device that is associated with each machine. Using data so collected, the casino can appropriately award and cater to players based upon their level of play. One way to provide such awards is via points, like those awarded by airlines for miles flown. The casino points correspond to amounts wagered and may be redeemed for meals, shows, free wagering, etc. In addition, casinos often have marketing departments that have responsibility for providing appropriate complementary goods and services to players—especially the regulars, the players whose gaming brings in high revenues, or players who have the potential for joining one of those categories. It would be desirable for casino marketing employees to know when important players arrive, what players are currently wagering heavily, where a certain player is, the name of a player at a particular machine, where particular games are located, when a significant jackpot is won, etc. Having this kind of information essentially in real time would provide a significant advantage to marketing personnel.

DETAILED DESCRIPTION

Figure 1A:
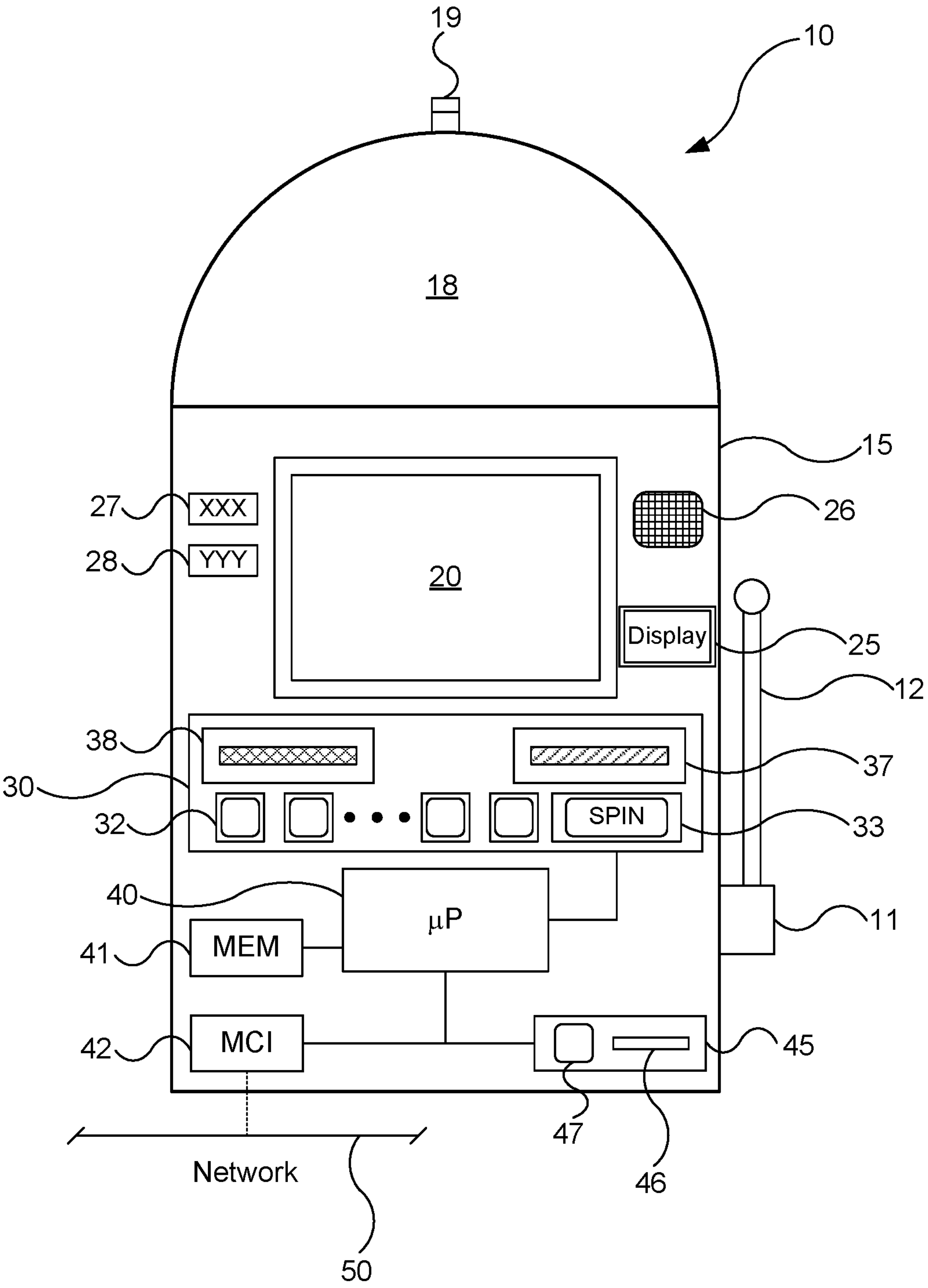
FIG. 1A is a functional block diagram that illustrates a gaming device according to embodiments of the invention.
Figure 1B:
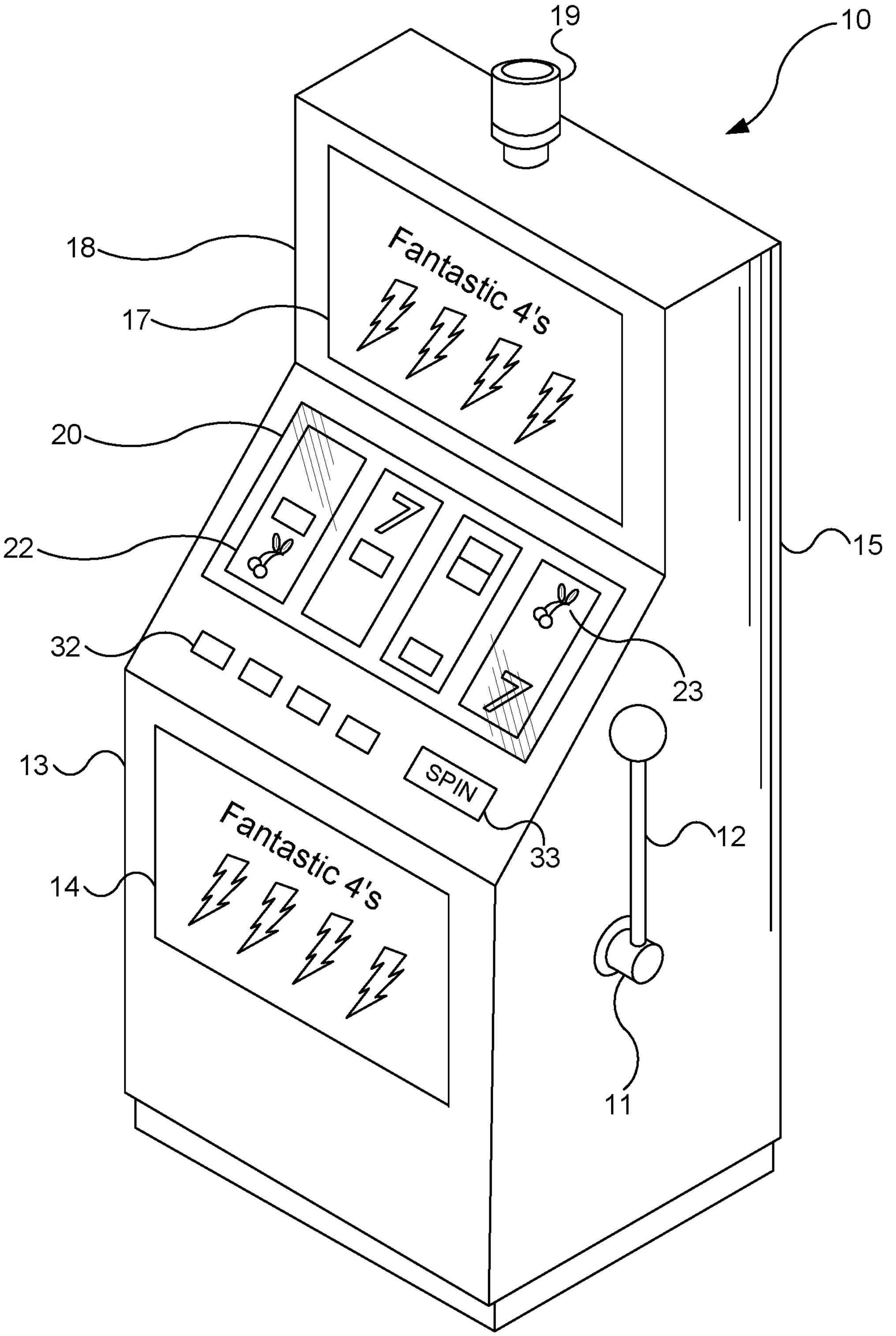
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request service from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
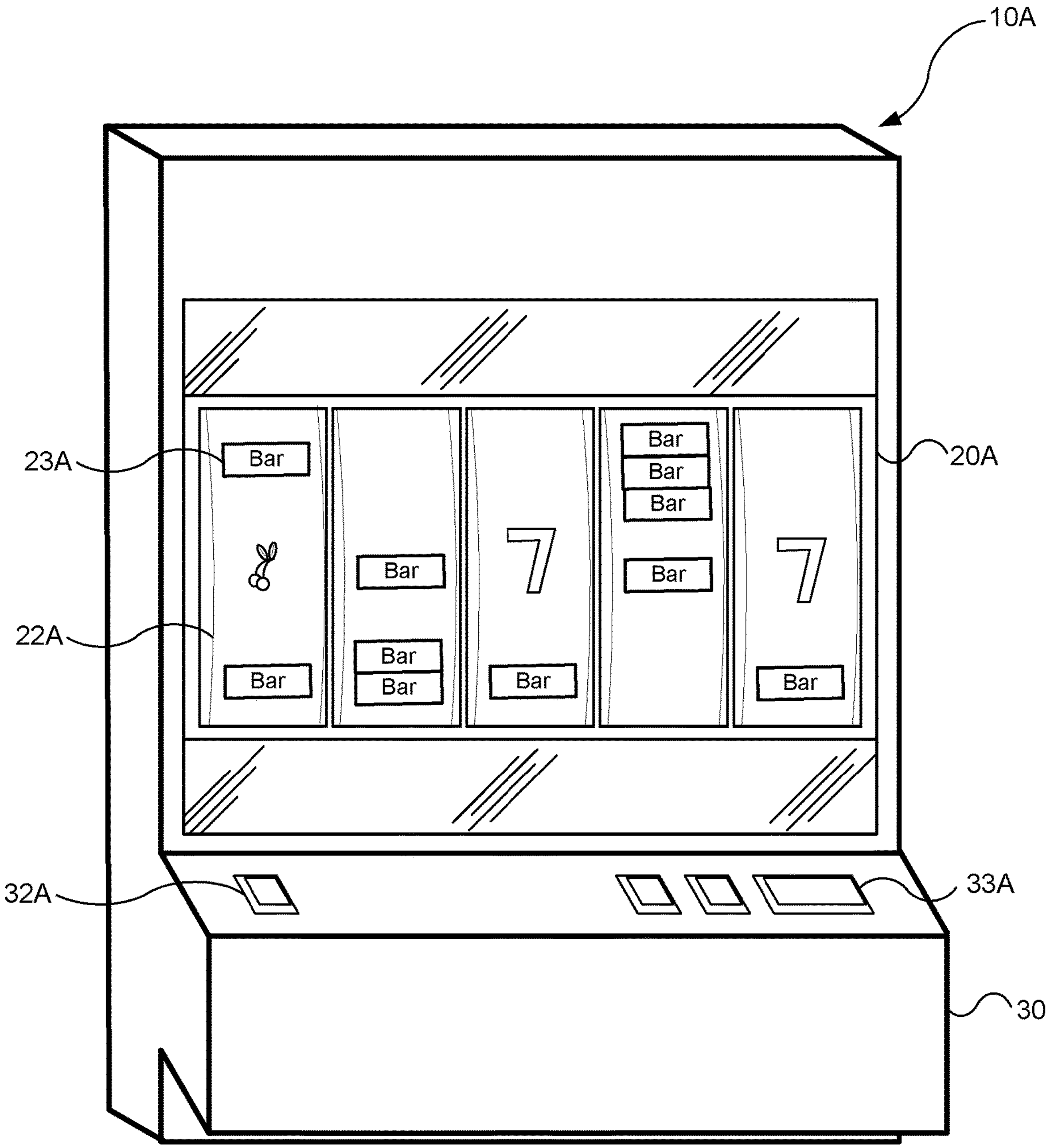
FIGS. 2A, 2B, and 2C are detail diagrams of exemplary types of gaming devices according to embodiments of the invention.
Figure 2B:
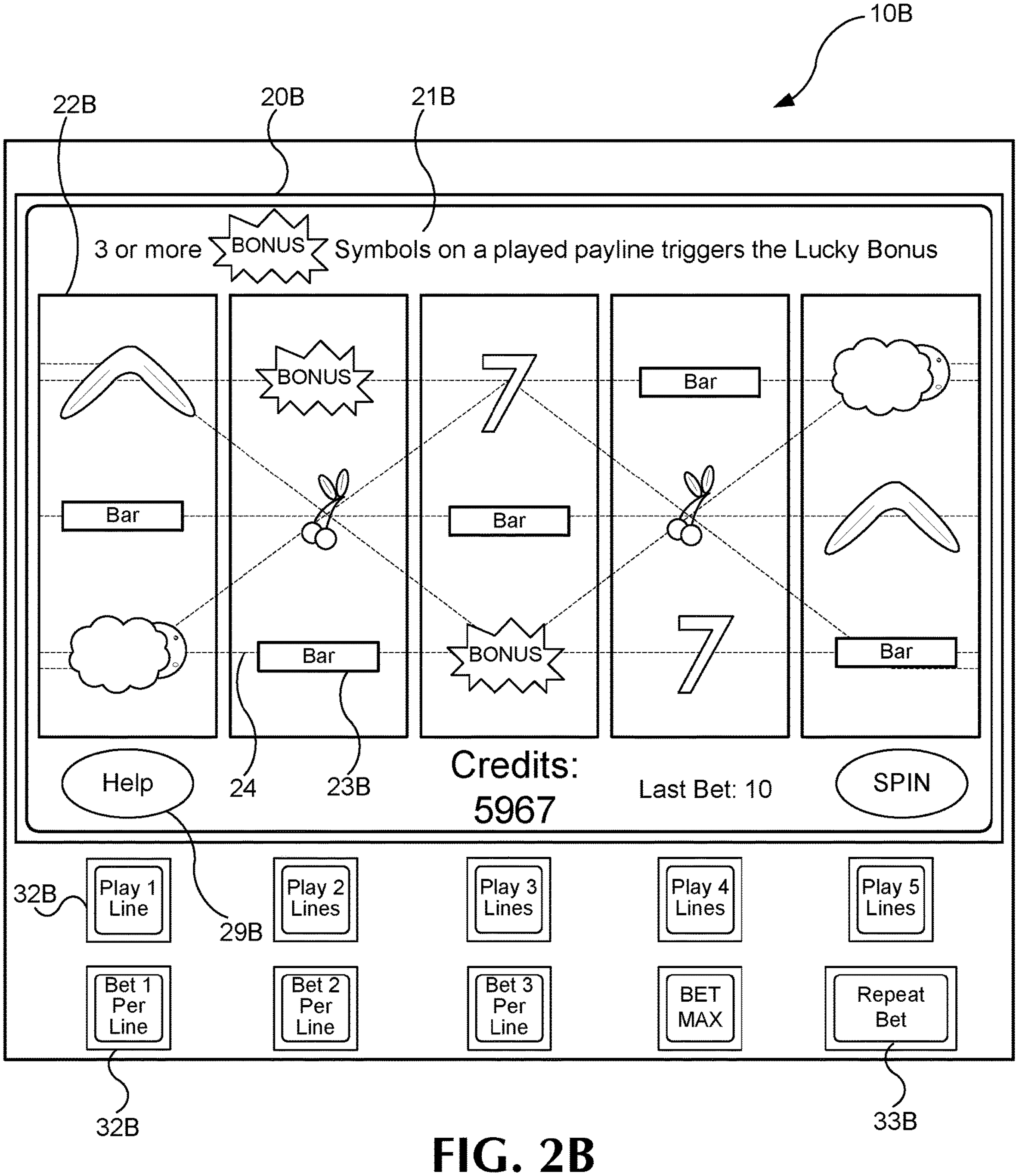
Figure 2C:
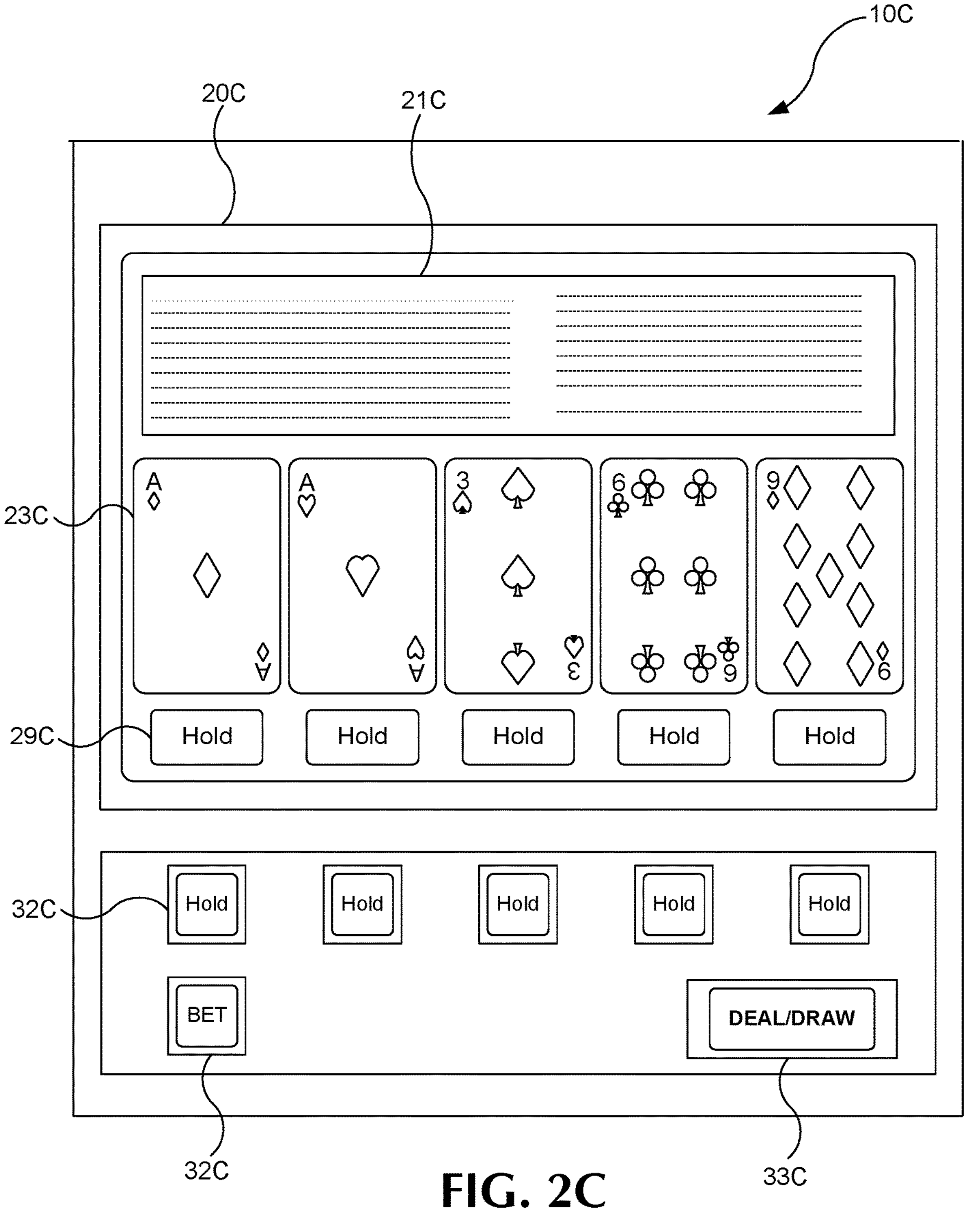

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty-two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five-line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touchscreen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
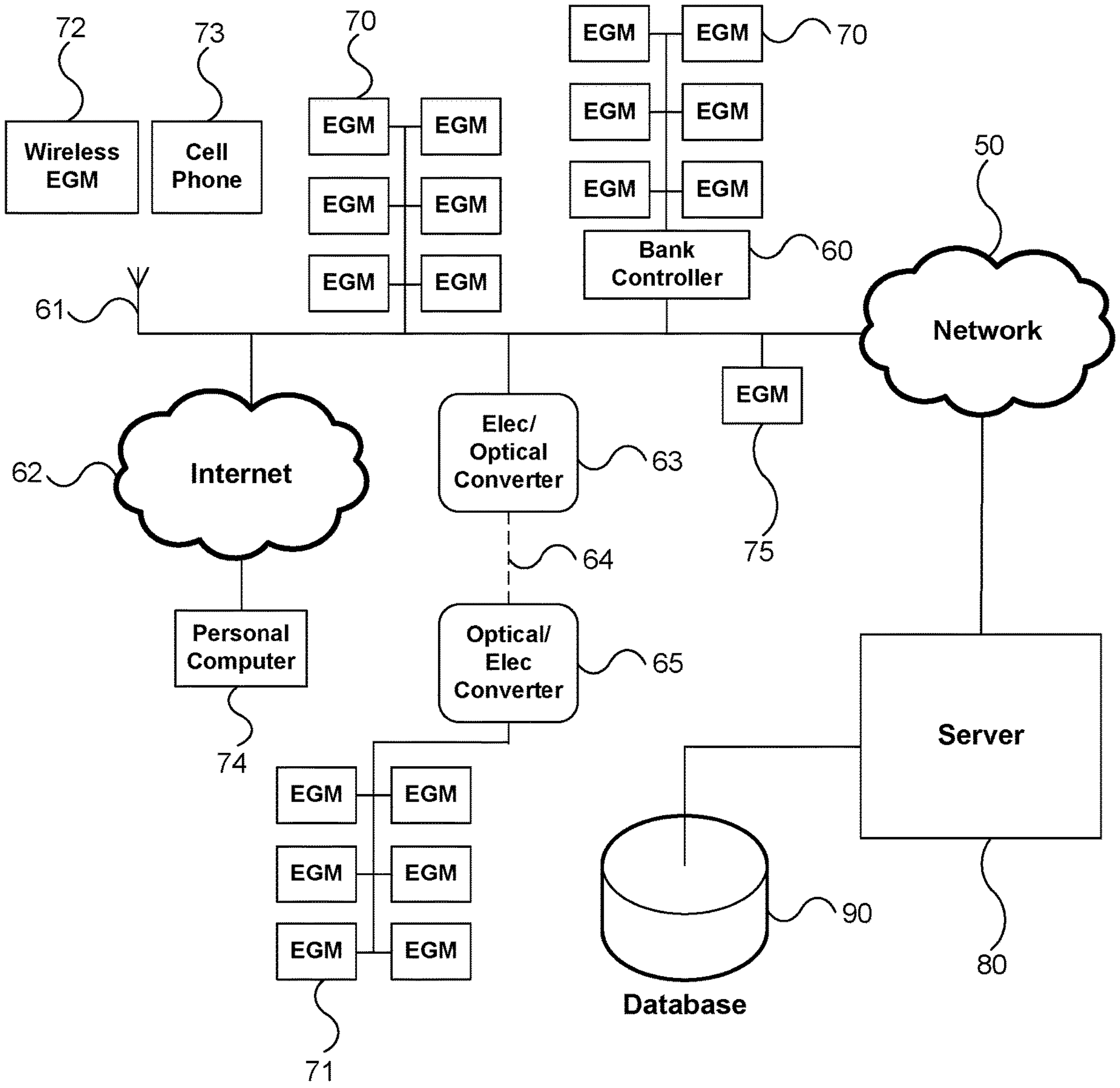
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
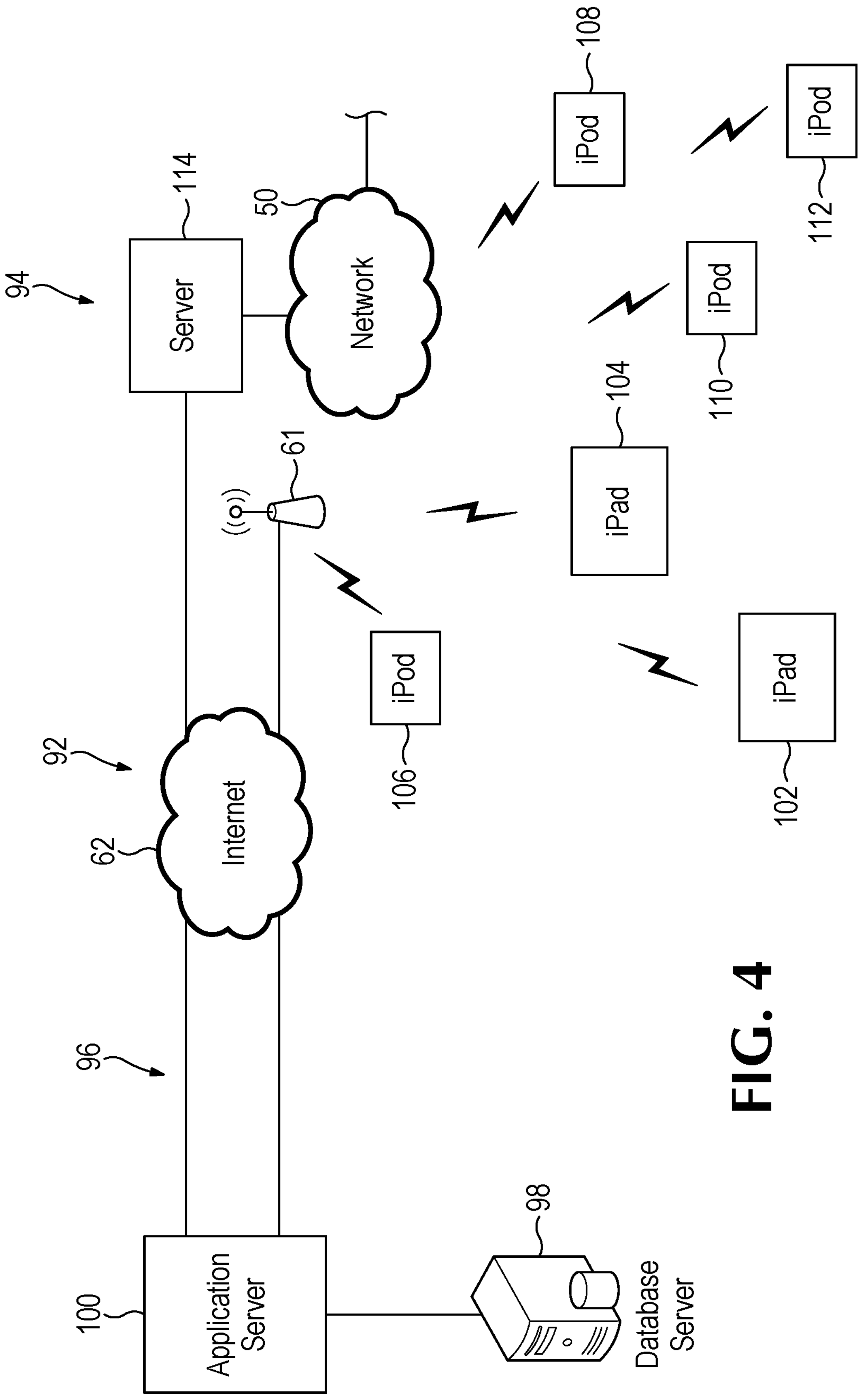
FIG. 4 is a schematic diagram illustrating an embodiment that incorporates the present invention.

Turning now to FIG. 4, indicated generally at 92 is a system constructed according to the present invention. In the present implementation, the system is distributed among several locations, primarily a casino—indicated generally at 94—and an offsite location—indicated generally at 96. Among other things, system 92 collects data, processes it, and creates communications at the offsite location that are directed to casino agents located at casino 94, typically employees such as slot attendants and technicians, security personnel, beverage servers, and the managers and supervisors of the foregoing. Because the present implementation of system 92 is deployed on several networks, it will be appreciated that the entire system could be located in one place or distributed along and among various networks. The solid lines connecting components in FIG. 4 indicate hard-wired connections, but these connections may readily be made via wireless connections.

As an alternative, the present invention may be readily implemented with all of the components in system 92 being located at casino 94, as shown in FIG. 4, or distributed via one or more networks. In the present implementation, offsite location 96 is built, operated, and maintained by a third party vendor to casino 94. The functionality described below may be provided to a number of different casinos, like casino 94, all responsive to software operating at location 96 via multiple, reliable Internet connections to each of the various casinos. Such casinos could have the same or different ownership.

Considering first offsite location 96, a Database Server 98 collects data from the casino and stores it in a manner that will be later described in connection with the operation of system 92. An Application Server 100 provides support for software applications, to be shortly described, that are installed on various computing devices included in system 92. The application server provides the software applications with services such as security, data services, transaction support, and load balancing.

In the present implementation, many communications between offsite location 96 and casino 94 are conducted through the Internet 62 via a reliable, high-speed connection. In the casino, a wireless router 61 provides a wireless network for various computing devices as will be shortly described. In the present implementation, the wireless network is implemented using the IEEE 802.11 standard.

Included on the wireless network implemented via router 61 are mobile computing devices, in the present implementation tablet computers 102, 104, made by Apple Inc. and sold under the iPad™ brand. There may be many other such iPad computers that are omitted here to simplify the drawing. The iPad computers may be used, as will be described, to monitor the status of service calls on the casino floor, either within an area or department or casino wide. These are typically carried by a casino agent who has responsibility for supervising others in the process of making such service calls, but the iPad computer also receives notifications for service calls that may require a supervisor, i.e., the carrier of the iPad computer. The types of notifications and responses that may be received and made, respectively, on the iPad computer is described in more detail in connection with the operation of system 92.

In addition to iPad computers 102, 104, a plurality of mobile wireless computing devices 106, 108, 110, 112 are also connected to the network implemented via wireless router 61. In the present implementation computing devices 106, 108, 110, 112, are also made by Apple Inc. and sold under the iPod Touch™ brand. There may be many other such iPod touch devices that are omitted here to simplify the drawing. The iPod touch devices are typically carried by a casino employee, such as a floor attendant or slot technician, to communicate regarding service calls on the casino floor, either within an area or department or both. The types of notifications and responses that may be received and made, respectively, on the iPod touch devices is also described in more detail in connection with the operation of system 92.

A Server 114, also located at casino 94 in the present implementation, is connected to the Internet 62 and to network 50, which is shown in FIG. 3 and described above. In many casinos, a management system, such as IGT Advantage™ made and sold by IGT, resides on network 50. It collects data from each gaming machine on network 50 and stores the collected data, e.g., in database 90 (FIG. 3). Such data includes, among other things, an event list that detects many different types of activity at each of the slot machines on the network. The detected activity for our purposes relates to significant jackpots; the press of a service button by a player; and any malfunction, such as a bill jam, empty ticket paper, etc. This data containing this information is transmitted from server 114 via Internet 62 to offsite location 96. In the present implementation, server 114 accesses information on database 90 via network 50. Server 114 collects, among other things, call codes, which are listed under the Call Code heading in the first column of Table 1 below. Each call code corresponds to a general category of service requirement, shown under the Call Type column, and a particular service issue within that category, shown under the Call Name column. Three categories of responders appear in the remaining columns of Table 1. These are the job positions that may respond to this type of call under certain conditions, which are discussed further below. The information in this table is stored on database server 98 in FIG. 4. The data can either be stored there by using a computer connected to the database or to network 50 and storing there or it can be entered via a suitable computing device such as a desktop or laptop computer. In the present embodiment it may also be stored or altered via one or more of iPad computers, like iPad computers 102, 104, by a user having sufficient permissions to enter and alter this information.

In an alternative embodiment, dedicated devices are installed within each gaming machine to communicate with the machine's data ports, or the lamp illumination signal, and transfer that information, through wired or wireless networks, to a central event list maintained on the network, such as database server 98.

In still another embodiment, casino agents manually enter information about incident occurrence that is stored on the network, e.g., on database server 98. This information may be gathered from the machine signal light, from manual inspection of the machine, or both.

Regardless of the embodiment, all detectable events on network 50 may be collected and used to generate a call as described herein. For example, some player tracking systems permit player help requests to which responses could be made according to the present system. Many gaming machines include Help, Change, and Drink Request buttons, which may also generate a detected event.

TABLE 1

| CALL CODE | CALL TYPE | CALL NAME | PRIMARY RESPONDER | SUBSTITUTE RESPONDER | ESCALATION RESPONDERS |
|---|---|---|---|---|---|
| 13280700 | General Tilts | Bill Acceptor Full | Slot Technician<br>Slot Supervisor<br>Security Supervisor | Slot Tech Supervisor<br>Slot Manager<br>Security Manager | Slot Technician<br>Slot Technician Supervisor<br>Security Supervisor<br>Slot Manager<br>Security Manager |
| 13280900 | General Tilts | Bill Acceptor Hardware Failure | Slot Technician | Slot Tech Supervisor | Slot Technician<br>Slot Technician Supervisor<br>Slot Manager |
| 13285100 | General Tilts | Progressive Link Failure | Slot Technician | Slot Tech Supervisor | Slot Technician<br>Slot Technician Supervisor<br>Slot Manager |
| 13328001 | Jackpots | Jackpot Pending W2G | See JP Levels | See JP Levels | Slot Technician<br>Security Officer<br>Players Club<br>Beverage Server<br>Slot Supervisor |
| 20001303 | Hand/Short Pays | FJP Hand Pay Ticket | Floor Attendant | Slot Supervisor | Slot Technician |
| 20001305 | Hand/Short Pays | FJP Short Pay Ticket | Floor Attendant | Slot Supervisor | Slot Supervisor<br>Slot Manager<br>Security Officer<br>Player Services<br>Beverage Server |
| 13328100 | Hand/Short Pays | Cancel Credits | Floor Attendant | Slot Supervisor | Slot Technician<br>Slot Supervisor<br>Slot Manager<br>Security Officer<br>Player Services<br>Beverage Server |
| 10819703 | Hand/Short Pays | Unknown Hand Pay | Floor Attendant | Slot Supervisor | Slot Technician<br>Slot Supervisor<br>Slot Manager<br>Security Officer<br>Player Services<br>Beverage Server |
| 13282700 | General Tilts | Low Battery | Slot Technician | Slot Tech Supervisor | Slot Technician<br>Floor Attendant<br>Slot Technician Supervisor<br>Slot Supervisor |
| 13288100 | Manual | Change Light | Floor Attendant | Slot Technician | Slot Technician<br>Slot Supervisor<br>Security Officer<br>Player Services<br>Beverage Server |
| 13283800 | General Tilts | Reel Disconnected | Slot Technician | Slot Tech Supervisor | Slot Technician<br>Floor Attendant<br>Slot Technician Supervisor<br>Slot Supervisor |
| 20000202 | General Tilts | BE2 Offline | Slot Technician | Slot Tech Supervisor | Slot Technician<br>Floor Attendant<br>Slot Technician Supervisor<br>Slot Supervisor<br>Slot Manager |
| 13288400 | Printer/Paper | Printer Paper Low | Floor Attendant | Slot Technician | Slot Technician |
| 13286500 | Printer/Paper | Printer Paper Out | Floor Attendant | Slot Technician | Beverage Server |
| 13288800 | Printer/Paper | Printer Carriage Jam | Floor Attendant | Slot Technician | Slot Technician Supervisor |

TABLE 1-continued

| CALL CODE | CALL TYPE | CALL NAME | PRIMARY RESPONDER | SUBSTITUTE RESPONDER | ESCALATION RESPONDERS |
|---|---|---|---|---|---|
| 13288500 | Printer/Paper | Printer Off | Floor Attendant | Slot Technician | Slot Manager |
| | | | | | Slot Supervisor |
| 13280000 | General Tilts | General Tilt | Floor Attendant | Slot Technician | Slot Technician |
| | | | | | Beverage Server |
| | | | | | Slot Technician Supervisor |
| | | | | | Slot Manager |
| | | | | | Slot Supervisor |
| 13283200 | General Tilts | Reel Tilt | Floor Attendant | Slot Technician | Slot Technician |
| 13283300 | General Tilts | Reel Tilt 1 | Floor Attendant | Slot Technician | Beverage Server |
| 13283400 | General Tilts | Reel Tilt 2 | Floor Attendant | Slot Technician | Slot Technician Supervisor |
| 13283500 | General Tilts | Reel Tilt 3 | Floor Attendant | Slot Technician | Slot Manager |
| 13283600 | General Tilts | Reel Tilt 4 | Floor Attendant | Slot Technician | Slot Supervisor |
| 13283700 | General Tilts | Reel Tilt 5 | Floor Attendant | Slot Technician | |
| 13280800 | General Tilts | Bill Acceptor Jam | Floor Attendant | Slot Technician | Slot Technician |
| | | | | | Beverage Server |
| | | | | | Slot Technician Supervisor |
| | | | | | Slot Manager |
| | | | | | Slot Supervisor |

Figure 5:
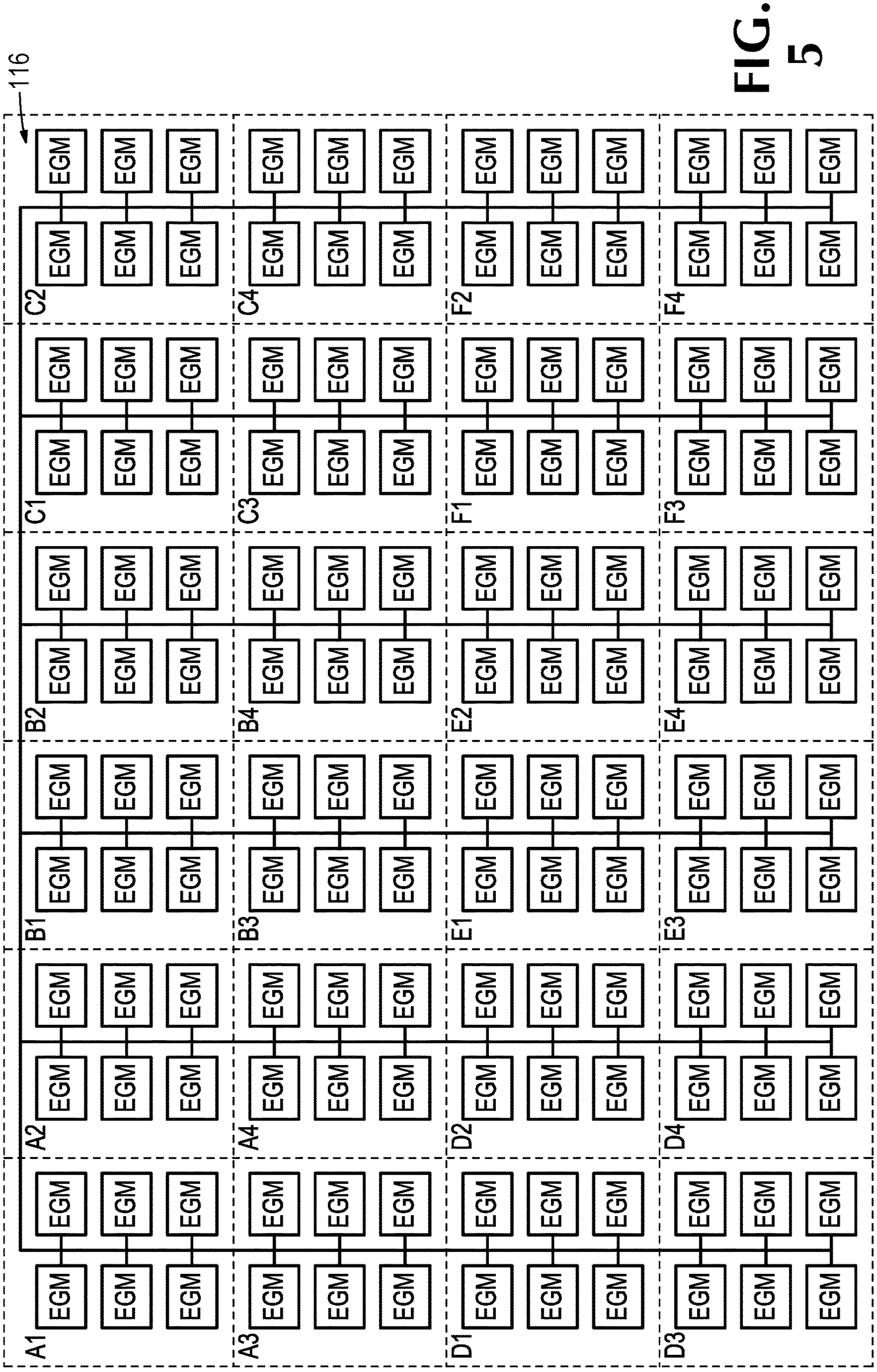
FIG. 5 is a highly schematic diagram illustrating a plan view of how a casino floor is divided into sections in accordance with an implementation of the present invention.

Turning now to FIG. 5, indicated generally at 116 is a highly schematic diagram depicting electronic gaming machines that are included on network 50 in FIG. 3. Also included are rectangles shown in dashed lines indicating different floor areas where subsets of the gaming machines are located. In the upper left hand corner of each rectangle is a unique identifier for that particular floor area and the subset of machines contained therein. Although each area is depicted as having the same number of machines, the areas could be designated to have any number, and the numbers from one area to another could also be different. FIG. 5, however, is sufficient to illustrate the general concept.

Another table, not shown herein, is stored on database server 98 along with Table 1. The additional table includes a list of each of the floor areas, A1, A2, A3, A4, B1, . . . etc. Associated with each floor area is a unique machine number that identifies each machine within each area. As will be seen, this enables system 92 to dispatch assistance to the location and machine that requires service.

Table 2, shown below shows adjoining areas that are associated with each of sections, like section A, which includes A1, A2, A3, and A4. Each of the other sections is listed with its respective associated adjoining areas. As will be seen, when a service provider is not available or one is but requires assistance in his or her section, service providers may be drawn from adjoining areas. This table defines the areas from which sections may draw support if needed. As with other data stored on the network implemented via router 61, it may be entered via an iPad computer by a user who has sufficient permissions to do so.

TABLE 2

| Section Assignment | Section Association |
|---|---|
| A | B1, B3, E1, D1, D2 |
| B | A2, A4, D2, E1, E2, F1, C1, C3 |
| C | B2, B4, E2, F1, F2 |
| D | A3, A4, B3, E1, E3 |
| E | D4, D2, A4, B3, B4, C3, F1, F3 |
| F | E4, E2, B4, C3, C4 |

The following Table 3 is a list of job positions and associated departments. Persons holding these jobs are qualified and eligible to respond to defined service requests, as will be further described. This table is also entered in database 98 and may be entered and altered in the same fashion as described above.

TABLE 3

| Position | Department |
|---|---|
| Floor Attendant | Slots |
| Slot Manager | Slots |
| Slot Supervisor | Slots |
| Slot Technician | Slots |
| Slot Technician Supervisor | Slots |
| Security Officer | Security |
| Security Manager | Security |
| Security Supervisor | Security |
| Beverage Server | Beverage |
| Beverage Manager | Beverage |
| Beverage Supervisor | Beverage |
| Host | Marketing |
| Executive Host | Marketing |
| Club Manager | Marketing |
| Club Supervisor | Marketing |

The casino may set goal times within which it is desirable to resolve different kinds of service needs. Table 4 depicts some exemplary goal times, which may be varied by casino personnel, via one of the iPad computers, with sufficient permissions to do so. Also included is a commute goal time, which is the time necessary for a service provider to travel to the gaming machine in need of service after accepting a call. This too may be set or changed by the casino.

TABLE 4

| Call Type | Timer | Goal Time |
|---|---|---|
| Commute | Commute | 2 minutes |
| Completion | Completion | 10 minutes |
| Jackpots | Completion | 12 minutes |
| Manual | Completion | 5 minutes |
| General Tilts | Completion | 10 minutes |
| Printer/Paper | Completion | 10 minutes |
| Hand/Short Pay | Completion | 12 minutes |

Some types of responses require further categorization of employees who may respond, even for the same type of event. For example, some jackpots are so large that the machine does not pay them out. Different casinos may have different policies regarding what jackpot amounts must be hand paid, how many people need to be present, and the job position(s) of the person or persons who are required to be present, depending on the jackpot size. The following Table 5 provides an example of one casino's requirements. The information in this table is also stored on database 98. As is known in the art when a call code for a jackpot appears on the event list, the amount of the jackpot and the machine number are both associated therewith. This call code is the fourth row in Table 1.

TABLE 5

| Jackpot Levels | Amounts | Primary Responders | Substitute Responder |
|---|---|---|---|
| 1 | $.01-$2,499.99 | Floor Attendant | Slot Supervisor |
| | | Floor Attendant | Slot Supervisor |
| 2 | $2,500.00-$9,999.99 | Floor Attendant | Slot Supervisor |
| | | Slot Supervisor | Slot Manager |
| 3 | $10,000.00-$24,999.99 | Floor Attendant | Slot Supervisor |
| | | Slot Supervisor | Slot Manager |
| | | Security Supervisor | Security Manager |
| 4 | $25,000 and Up | Floor Attendant | Slot Supervisor |
| | | Slot Supervisor | Slot Manager |
| | | Security Supervisor | Security Manager |

Additional consideration will now be given to the manner in which system 92 operates. When an employee arrives for a shift, he or she logs in. As mentioned above, supervisors and managers typically use an iPad computer, which provides additional functionality over the iPod touch, device which the front line employees, such as floor attendant, slot technician, or beverage server typically use. Any employee, however, could use either device.

When a user arrives for work and logs in, he or she is first brought to an assignment screen where they indicate whether they are reporting to work under the primary or secondary positions. Each employee has a record that may entered via a supervisor iPad computer as described above. Employees are often trained and capable of performing more than one role. For example, a Floor Attendant might also be qualified to serve as a Slot Supervisor. In any event, employees whose record indicates both a primary and secondary position are required to indicate in which of those capacities they are reporting at the start of a shift. An employee with only one role is automatically assigned to that role.

Figure 6:
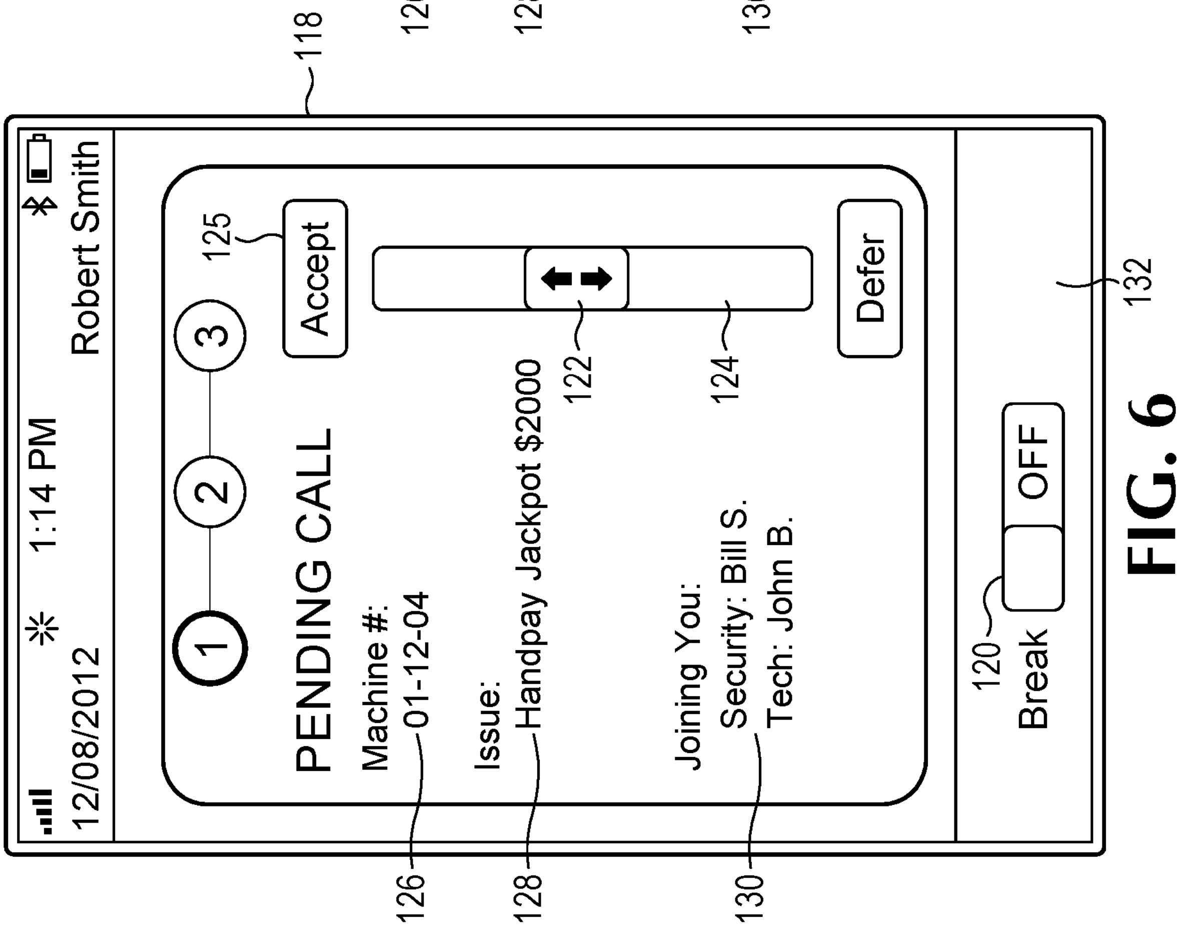
FIGS. 6-13 are images of iPod touch screens upon which an embodiment is implemented.

Next, the employee indicates in which section, e.g., A, B, C. etc. of the casino floor they are assigned to work. Their screen then shows their position, the section, and the supervisor to whom they will be reporting for the shift. Turning now to FIG. 6, indicated generally at 118 is a screen of an iPod touch mobile computing device. The iPod touch device is wirelessly connected to router 61 and forms a part of that network. The date, time, and employee's name appear in the top bar. At the bottom of screen 118, a slider switch appears for the employee to indicate whether he or she is on break. The switch is turned on at the beginning of a break, which initiates a break timer, and turned off at the end, which stops the timer. Table 6 below is a list of permissible break times by job position. A break touch-screen slider button 120 enables the system—and the employee's supervisor—to see when he or she is on break. The Table 6 break times permit the supervisor to receive a notification if the time is exceeded.

TABLE 6

| Breaks | | |
|---|---|---|
| Department | Position | Break Time in Minutes |
| Slots | Floor Attendant | 15 |
| Slots | Slot Manager | 15 |
| Slots | Slot Supervisor | 15 |
| Slots | Slot Technician | 15 |
| Slots | Slot Technician Supervisor | 15 |
| Security | Security Officer | 30 |
| Security | Security Manager | 30 |
| Security | Security Supervisor | 30 |
| Beverage | Beverage Server | 20 |
| Beverage | Beverage Manager | 20 |
| Beverage | Beverage Supervisor | 20 |
| Marketing | Host | 25 |
| Marketing | Executive Host | 25 |

Because the number of workers logged in is known to the system, the system can review historical data and make determinations about the number of employees and their qualifications that should be logged in and on duty for a particular shift. For example, the numbers and qualifications can vary significantly from a Sunday morning, to Monday evening, to Saturday night, etc. As a result, the system can automatically create and publish via the Internet or otherwise, work schedules, showing total employees, by area, by job type, by supervisor, etc. And it can notify each individual about the times for which they have been scheduled to work. Of course, each employee will be associated with historical data showing hours and times worked as well as shifts or times that the employee is not eligible to work. As a result, the system will not overschedule or schedule during times when the employee has not agreed to work.

There are 5 call status screens that may be presented to a user who is logged in on one of the iPod touch device. First, is a No Call screen (not shown). This screen indicates that there are no calls waiting, and presents a "Give me a Task" button to the user. Tasks are different types of service, such as routine maintenance, that can be performed at any time. The manner of accepting, performing and completing a Task is described in more detail below.

When a call is received by a person who is logged in to his or her iPod touch device, the Pending Call screen is presented as shown in FIG. 6. Before discussing the various ways in which the employee can respond to a pending call, consideration will first be given to how the pending call comes to be presented on the iPod touch screen as shown in FIG. 6.

First, it will be recalled that a table showing the area (as shown in FIG. 5) in which each uniquely numbered machine resides is stored on the network. When a call of the type shown in Table 1 is generated by the event list for an identified gaming machine, the stored table is used to identify the FIG. 5 designated area where the problem arises, e.g., bill acceptor full on machine 782 in area A3. System 92 next consults the information regarding the individuals who are logged in, their job assignment, and the FIG. 5 area section in which they are working.

If a person qualified to take the task is logged in, assigned to the section in question, and not on break, that call is automatically directed via the wireless network to his or her iPod touch device thus generating the Pending Call screen in FIG. 6. If there is no such person, system 92 begins searching for qualified people who are logged in, not on break, and in an area associated with the section in which the call arose, as shown in Table 2. If no such person exists there, the system automatically returns its search again to the section in which the call arose and looks for a substitute responder, as shown in Table 1. In the present example, there are several primary responders for a full bill acceptor. If none are available in section A, persons with those job titles are searched for in the areas associated with section A in Table 2. If those aren't available, the search returns to section A for a substitute responder, as shown in Table 1. Finally, if none of those are available, the search again returns to the areas associated with section A, as shown in Table 2, and available substitute responders are looked for there. System 92 thus initiates a potentially four-part process: primary responder in section, primary responder in associated section, substitute responder in section, and substitute responder in associated section. As this process proceeds, whoever is first encountered who is available to take the call will be presented with an audible notification and the Pending Call screen shown in FIG. 6. In this manner, the most person most qualified and closest to the machine requiring service will be notified via the Pending Call screen.

Once that person receives the audible notification and is presented with the FIG. 6 screen, he or she can accept or defer the call by sliding a touch-screen switch 122 on bar 124. Alternatively, this notification might comprise a vibration of the communication device, a visual indication, or any other type of indication sufficient to alert the person that a call is pending. When moved to the uppermost position, the user can depress a touch-screen accept button 125, thus indicating to the system that he or she has accepted the call and is on the way to the machine number displayed in field 126. Depressing button 125 initiates two timers, a commute timer, which tracks the time from acceptance until arrival the machine indicated on the iPod touch device, and a completion timer, which tracks the total time it takes to commute to the machine and complete the required service.

Also appearing on the screen is a description of the service that will be provided, in this case hand pay of a jackpot in the amount of $2000, shown in field 128. In this case, because multiple employees have been notified about this service requirement, the names of the other employees who have accepted the call appear in field 130.

Although not visible in the drawings, a bar 132 on which break touch-screen slider button 120 is located, can appear as one of three colors: green, yellow, or red, which provides an indication of the call level. The colors are based on a calculation made by system 92. Every 15 minutes the system looks for the number of dispatched users, i.e., those who have accepted a call. It will then compare the total number of users logged in, for each department shown in FIG. 3, with those who are currently on calls in progress. If, e.g., only 40% are on calls, bar 132 will appear as green, if 41-65% are on calls, the bar is yellow and if over 65%, red. In addition, the audible tone that notifies a user of a call changes from a peaceful slow tone when green, to a more forceful patterned tone when yellow, and to an urgent, high-intensity tone when red.

Doing so informs the employee of the speed at which commuting and service work should be conducted and the level of attention the employee can give to a player who may be at the machine where service is requested. If the floor is relatively slow, it is desirable for the employee to talk with the player and interact as much as the player might want. If more busy, such interaction needs to be more limited and if in the red zone, such interaction might need to be minimal to keep up with the service calls.

Figure 7:
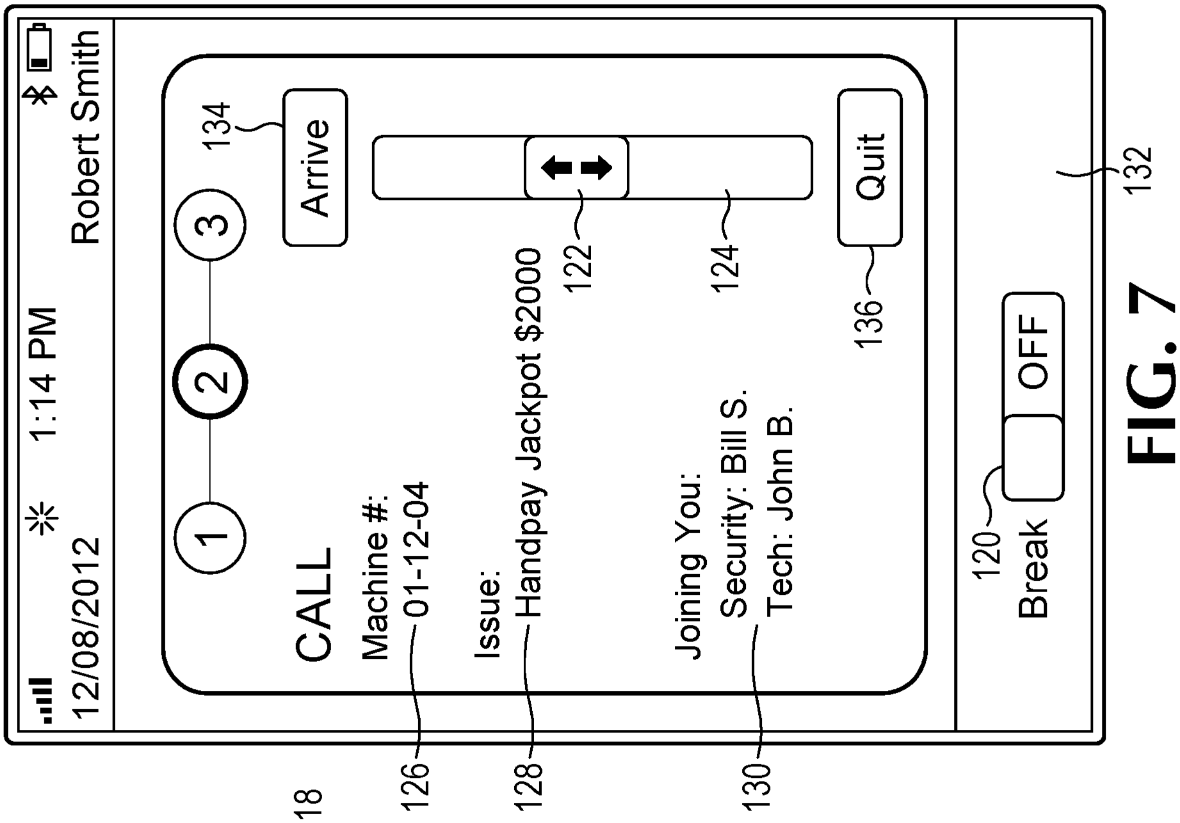

When button 122 is moved up and Accept button 125 is depressed, the next screen appears as shown in FIG. 7, namely the Call screen. This is an indication that the employee has accepted the call and is traveling to the machine needing service. For this screen, the buttons at the top and bottom of slider switch 122 change from Accept and Defer to Arrive button 134 and Quit button 136, respectively. When the employee arrives at the machine identified on the screen, he or she can move slider 122 to its upper position and press Arrive button 134. This notifies the system that the employee is at the machine and ready to begin the requested service. It also stops the commute timer and stores that time with the employee's record on the network.

Alternatively, at any time prior to pressing Arrive button 134, the employee can move switch 122 down and press Quit button 136. This removes the employee from the job, and the system initiates the process for locating and dispatching another employee as described above.

Figure 8:
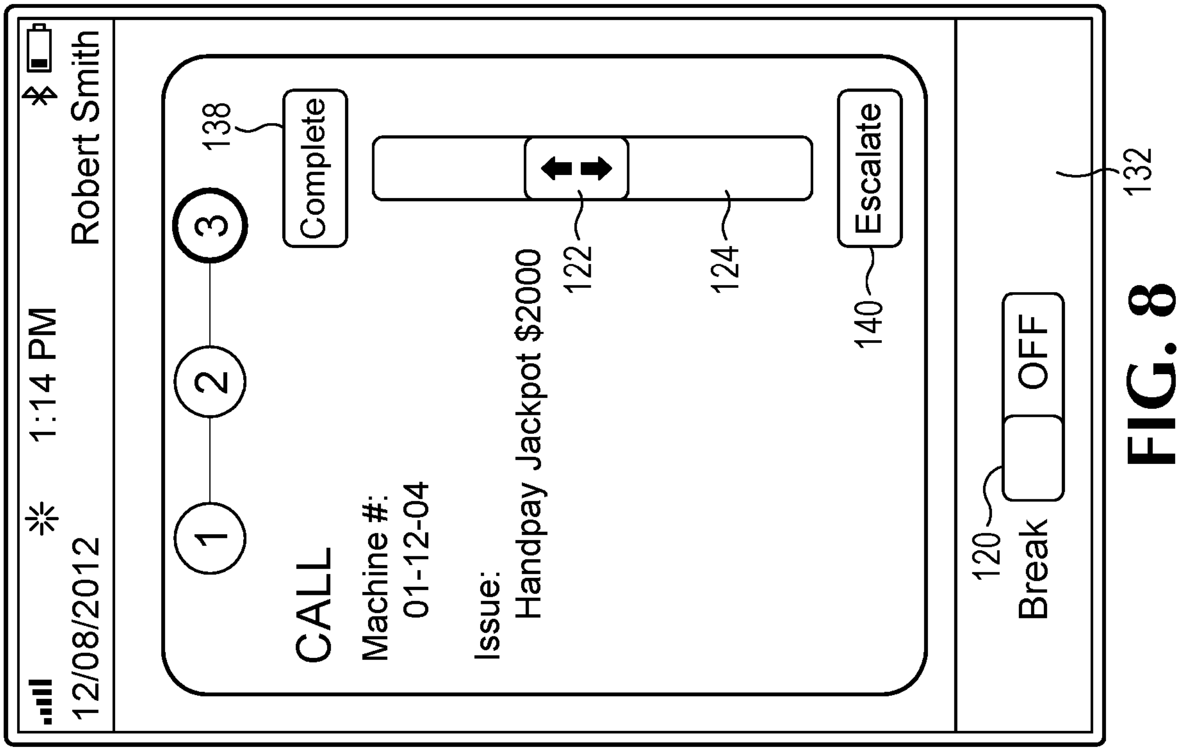

But if the employee presses Arrive button 134, the screen shown in FIG. 8 is presented with new buttons at the top and bottom of slider switch 122 appearing. These are Complete button 138, which replaces Arrive button 134, and Escalate button 140, which replaces Quit button 136. Once at the machine, if the employee successfully completes the job, he or she slides switch 122 to the top and presses Complete button 138. This stops the completion timer with that time being stored with the employee's record.

Figure 9:
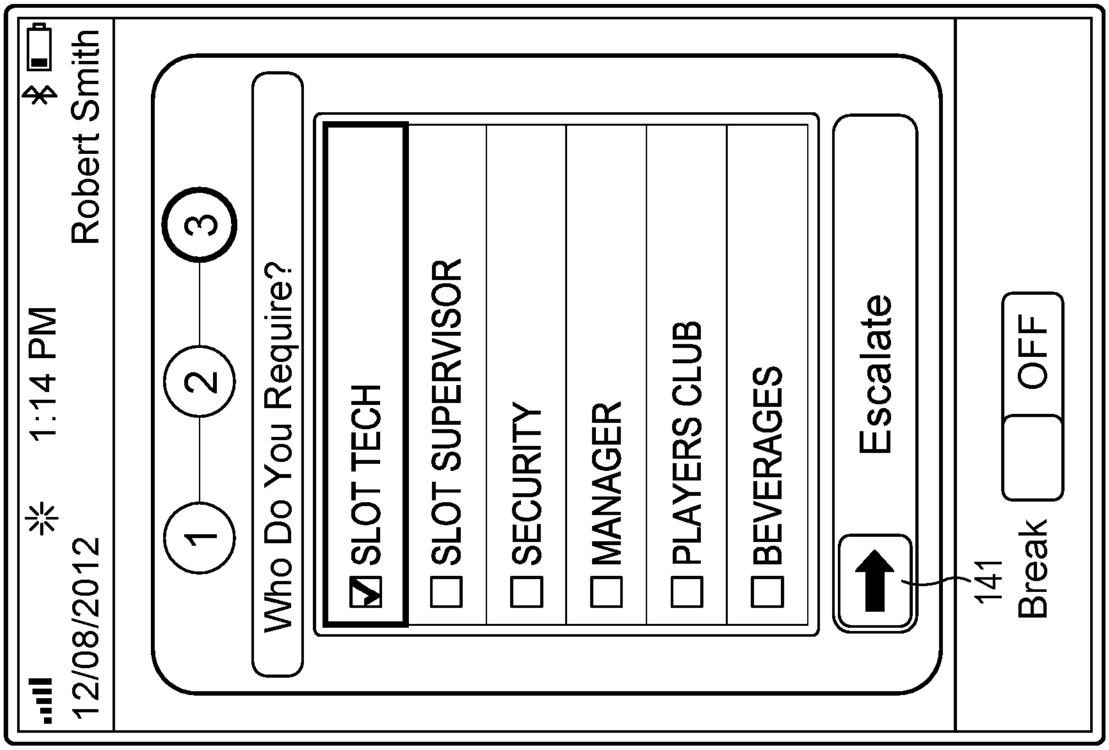

But if Escalate button 140 is depressed, the screen in FIG. 9 appears. This permits the employee to notify, via system 92, that the problem cannot be resolved without further assistance from someone who has a different job description or higher authority than the employee who escalated the call. In the FIG. 9 screen, the employee can check the box by one or more of the identified job types. Alternatively, an employee to whom the call is escalated may be selected automatically based on qualifications, experience, rating (by players or the casino), etc. Once so selected, the system notifies the employee to whom the call is escalated in a manner similar to notification for a pending call. In the present embodiment, calls are escalated to those with the job types shown in Table 1 under Escalation Responders. In other words, each type of call in Table 1 has predefined job categories who respond to requests to escalate a call. FIG. 9 lists each of the job categories listed under Escalation Responders in Table 1. An escalate slider button 141 is swept to the right to effect the call.

Once the employee selects one or more of the service providers in FIG. 9 and swipes button 141, a final screen appears (not shown). The Escalate button 140 appears again, though this time at the top of bar 124, as well as a Reassignment button 142 at the bottom of bar 124. Thus, the employee can escalate yet again by summoning further service providers (as a result of sliding button 122 upwardly), or can reassign (by sliding button 122 down), i.e., bow out of further service on this call, leaving it to those who appeared with him, or those who responded to the escalation call or calls.

Figure 10:
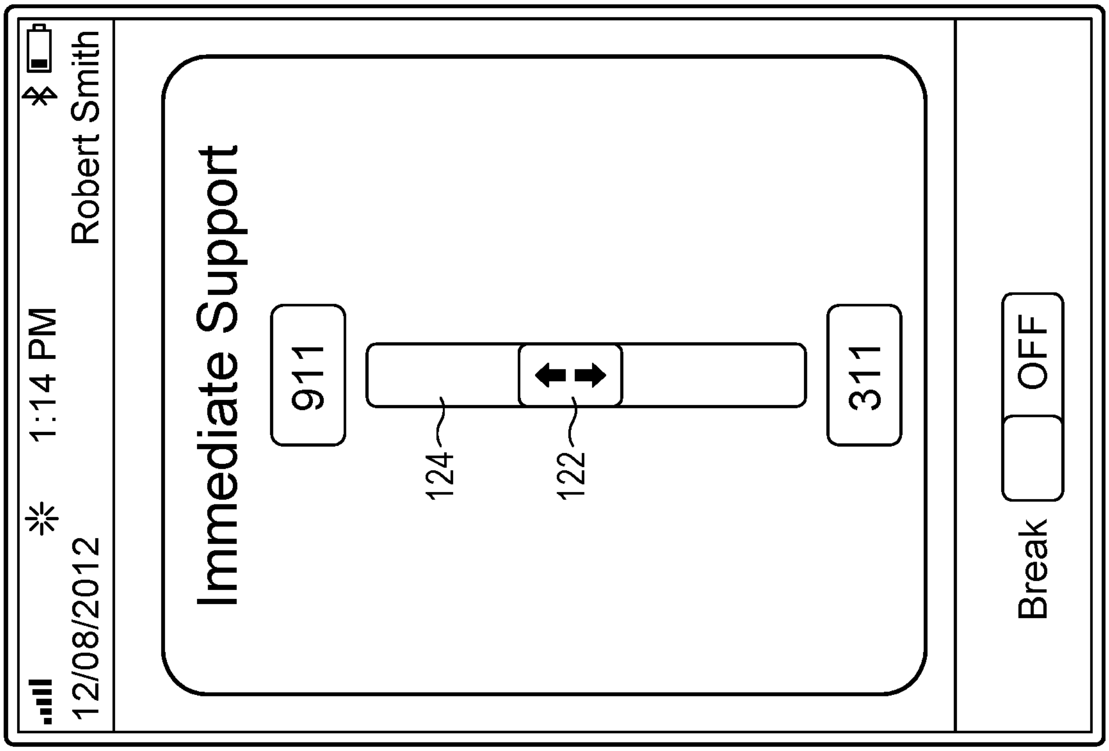
Figure 11:
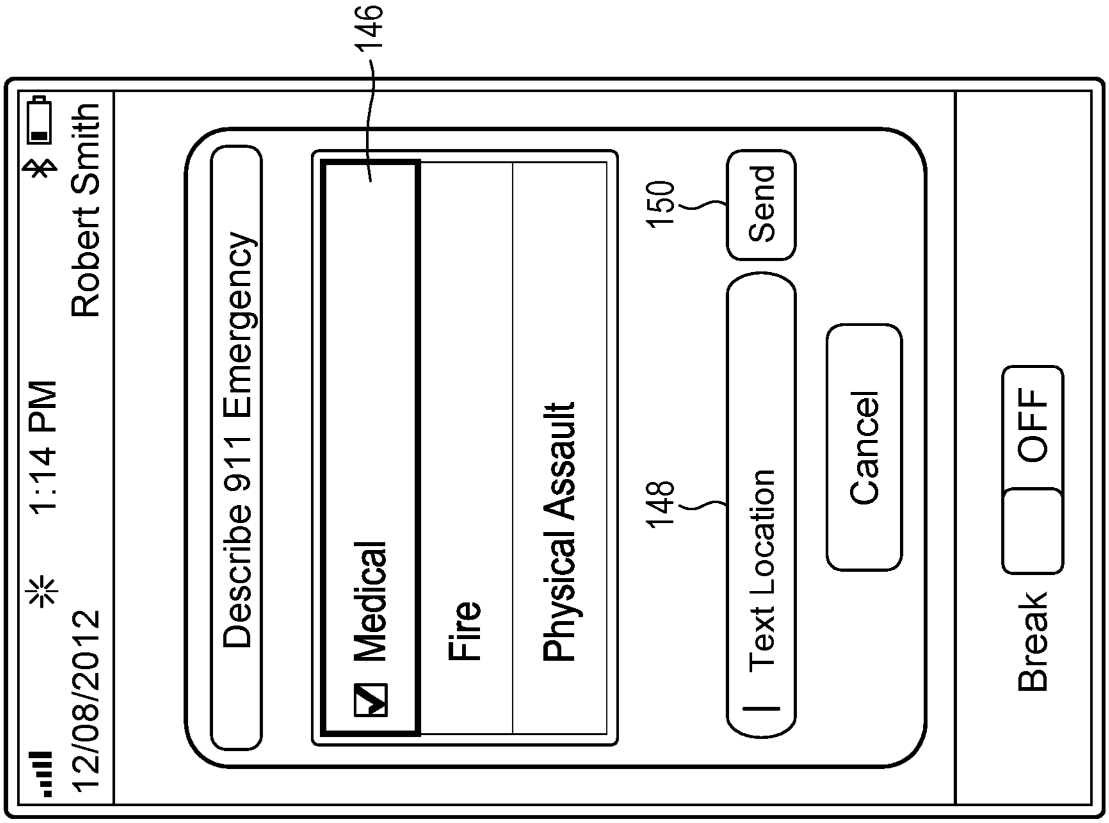
Figure 12:
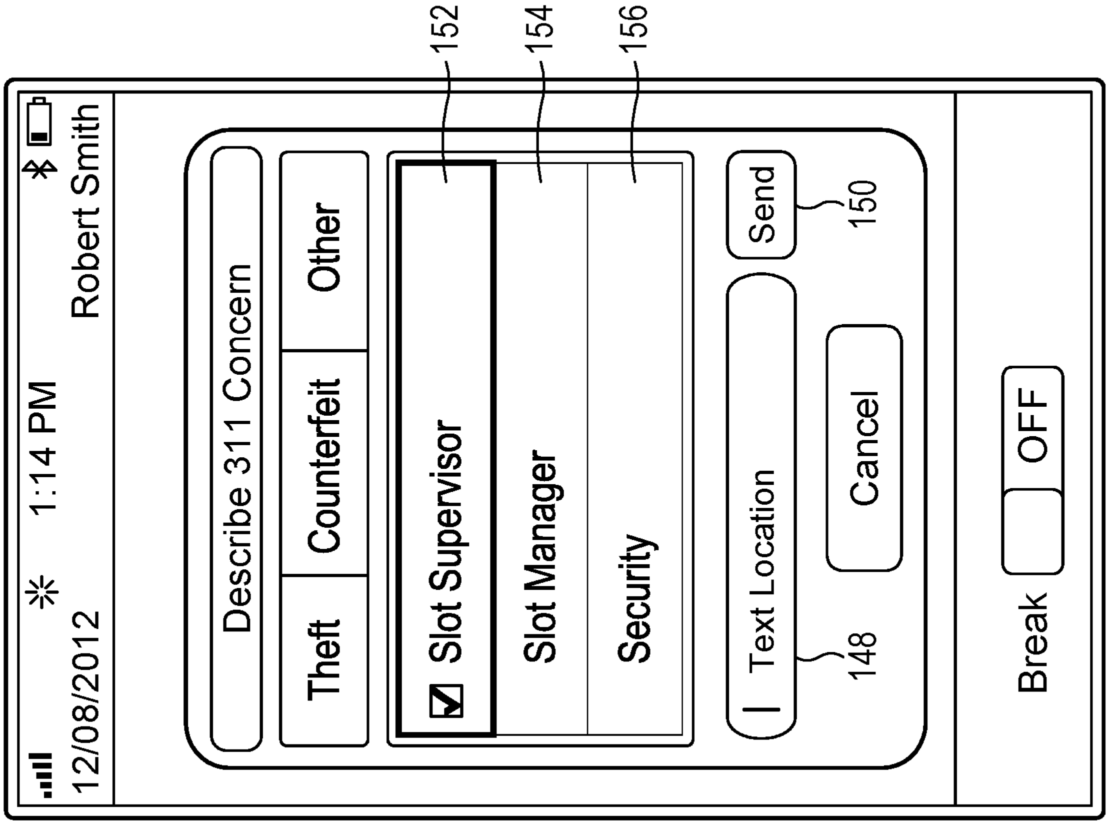

FIGS. 10-12 detail screens that are available for an employee carrying the iPod touch device to summon help when he or she comes upon a situation that requires skills or a job qualification that the employee does not have. In FIG. 10 slider switch 122 on bar 124 may be moved to one of two positions—up to 911 or down to 311. After so moving, as with the other switch options, the button to which switch 122 is moved must be depressed to call up the next screen. When the switch is moved to its uppermost position and the 911 button is pressed, the screen in FIG. 11 appears. When the switch is moved to its lowermost position and the 311 button is pressed, the screen in FIG. 12 appears.

Considering first the 911 screen in FIG. 11, the employee is presented with a plurality of possible life-threatening emergencies. In FIG. 11, the employee has touched a box 146, which appears by the term Medical. The box is selected and so indicates by displaying a check mark therein. Next, the employee uses the iPod touch text feature to write a location in a text box 148. This is implemented using a touchscreen keypad that operates in a fashion similar to those found on smartphones. After so entering the location in text box 148, the employee hits a send button 150, which transmits the nature of the 911 emergency and the location via wireless network implemented by router 61 to offsite location 96. There it is processed and sent, also via the wireless network, to the person best able to respond depending on the nature of the emergency and its location.

If in FIG. 10, slider switch 122 is moved down to the 311 button, and that button is then depressed, the screen in FIG. 12 appears. This screen also permits the user to select the nature of emergency by touching one of three buttons 152, 154, 156. Unlike the 911 panel in FIG. 11, the user may also select responders, such as those listed in touch panels beneath buttons 152, 154, 156. Here, the user has selected button 152 and checked the box adjacent the Slot Supervisor to indicate the appropriate responder. As with FIG. 11, the user can specify the location of the concern in text box 148 and then press send button 150. As a result, the system notifies the best position and most qualified person to respond.

Figure 13:
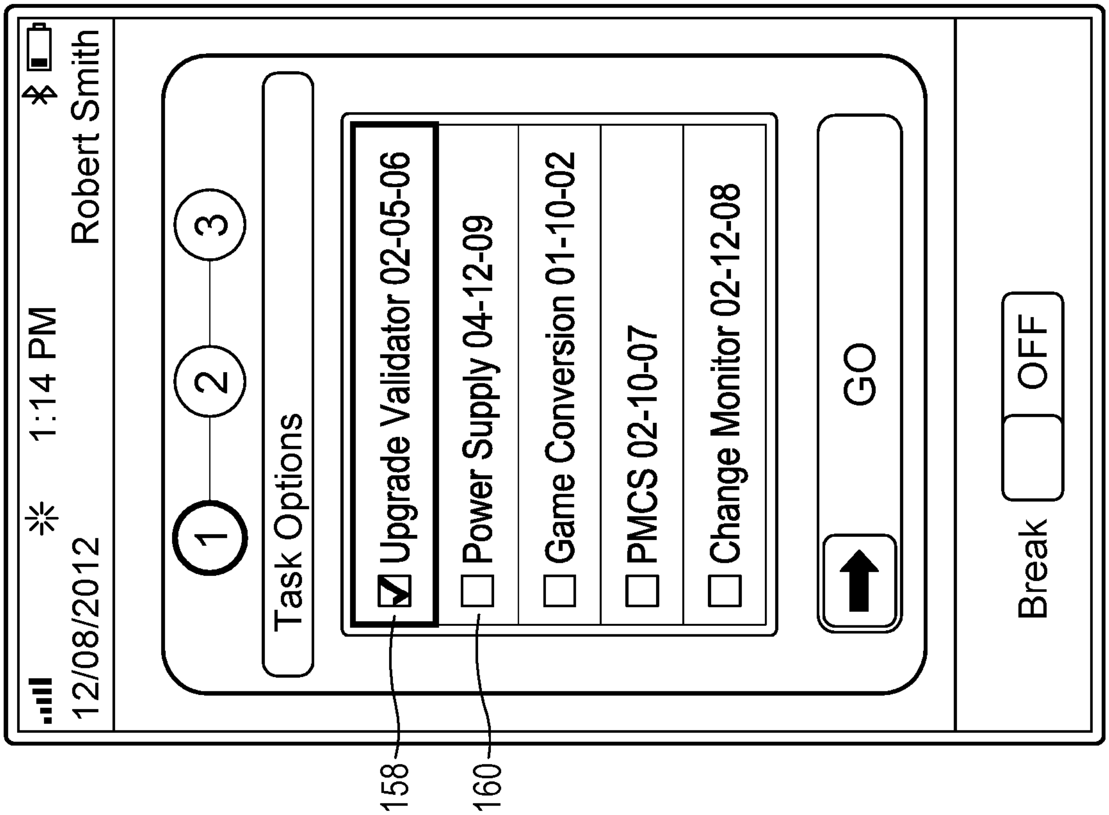

Of course, there are times in a casino that are slow or where there may be more employees than required to handle calls as described above. During these times, an employee who does not have any pending calls, as in FIG. 6, can request to be assigned to a task. A task is a job that can be done in a relatively large window, such as preventative maintenance of a game or replacement of a monitor. As previously mentioned, the "No Call" screen (not shown) appears when the employee is not being called to one of service jobs set forth in Table 1. As also discussed, the "No Call" screen includes a "Give me a Task" button, which, when pressed, displays a screen like that shown in FIG. 13. The employee may check one of the boxes shown opposite the listed tasks such as tasks 158, 160, etc. Here the employee has checked the box by "Upgrade Validator 02-05-06," the 6-digit number being a machine number that identifies the gaming machine where the work is to be done. Once selected, a screen similar to FIG. 7 appears which permits the employee to indicate his or her arrival at the machine or to quit the job, as described above in connection with responding to calls. Thereafter, a screen similar to FIG. 8 appears, allowing the employee to indicate the task is complete or to escalate it, also as described in connection with calls above.

Tasks can be scheduled automatically by examining the frequency with which calls are generated on specific machines or for specific issues on a machine. Because the system stores and analyzes data from all calls and other communications, it can be reviewed to spot a particular issues. For example, if bills jam frequently on the same machine, that bill acceptor can automatically be scheduled for preventative maintenance to determine if it needs servicing beyond clearing the jam.

Figure 14:
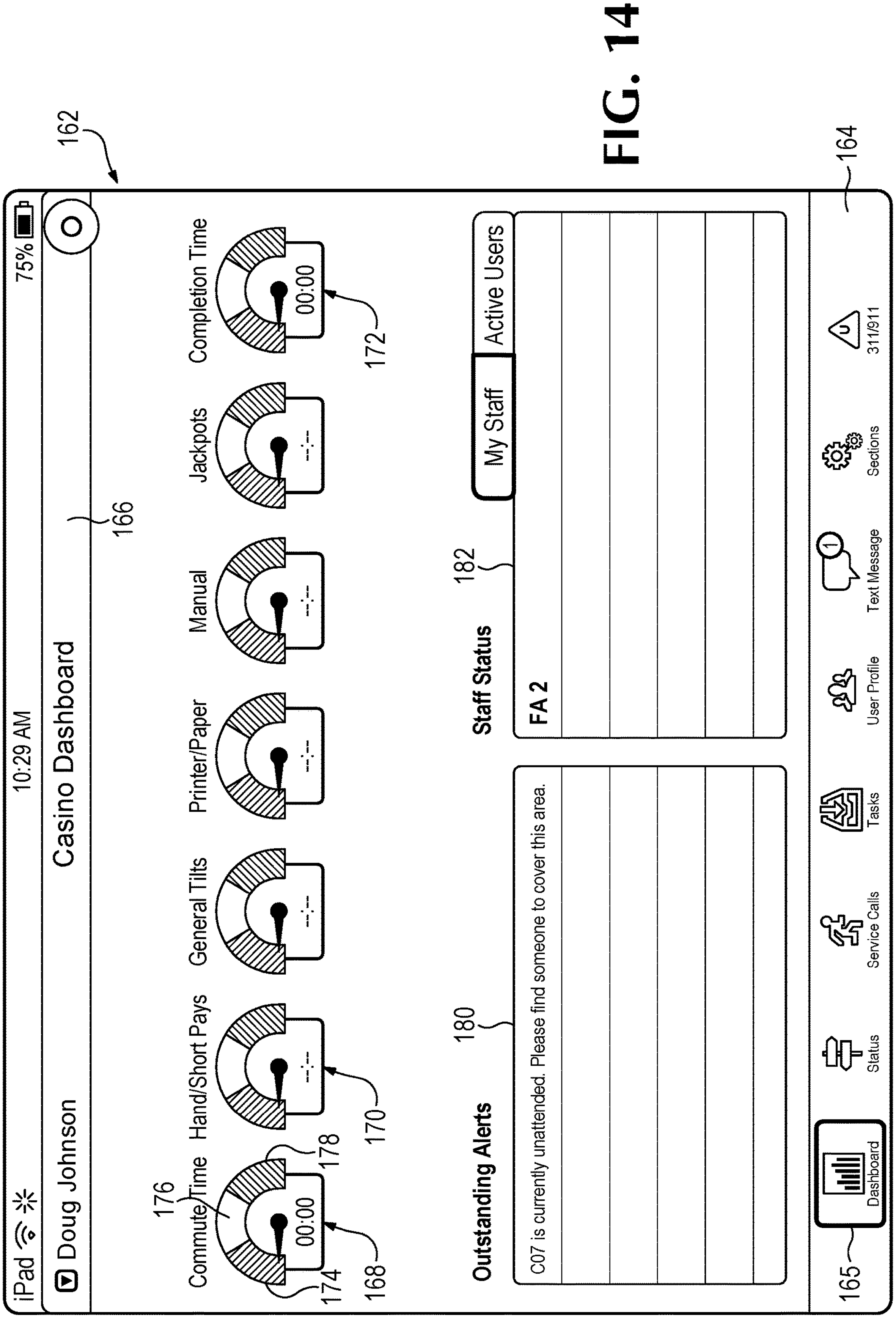
FIGS. 14-22 are images of iPad computer screens upon which an embodiment is implemented.

Turning now to FIG. 14, indicated generally at 162 is an image of an iPad screen on one of iPad computers 102, 194 in FIG. 4. Like the iPod touch screens, the iPad screen is a touch screen that permits a user to actuate buttons and make selections by touching the screen. Like the iPod touch devices, a user may log in to an iPad computer using his or her user identification and password. When logged in, the Casino Dashboard screen in FIG. 14 is first presented. As mentioned above, the iPad computers are typically used by an employee to whom other employees on the floor report to. As will be seen, the functionality provided by the iPad computer permits the user to monitor status of employees, calls, and tasks, and to change assignments when necessary or desirable.

A navigation bar 164 appears along the lower portion of screen 162. The icons in the bar permit the user to select different screens as labeled beneath each icon. A rectangle 165 indicates that the Dashboard screen is currently selected.

As with the iPod touches, a bar 166 changes between green, yellow, and red to indicate how busy the floor is by department. In other words, bar 166 reflects how busy the user's area of responsibility is. If logged in as a floor attendant, the bar will reflect the volume in the slot department; if logged in as a beverage, server, it will reflect the volume there.

A plurality of gages, like gages 168, 170, 172 are each color coded green, yellow, and red. For example, gage 168 has a green arc 174, a yellow arc 176, and a red arc 178. Gage 168 indicates the average commute time to a call, and gage 172 indicates the average completion time for a call. The gages in between gages 168, 172 indicate the average time to complete each of the 5 categories of calls in Table 1. The casino can set goal completion times within the system, e.g., jackpots in 15 minutes. If the average is, e.g., 11 minutes, the needle is in the green zone; if 12-15 minutes, in the yellow zone; and above 15 minutes in the red zone. At a glance, the supervisor can tell how well the staff is responding to calls by type relative to the casino goals.

An alerts section 180 displays notices including supervised staff who have exceeded break times, calls dispatched where no one has accepted the call after a predefined time, and changes in a staff status screen 182.

Staff status screen 182 can show only the supervisor's staff, in response to touching the "My Staff" tab on screen 182 or all staff logged in at the casino, in response to touching the "Active Users" tab on screen 182. The supervisor can touch a name on the "My Staff" page, which causes a dialog box to appear that permits the user to edit the employee profile, send a text message to the employee, or force a logout (which would be desired if the employee lost his or her iPod touch device). When an employee name is selected under the "Active Users" tab, the user of screen 162 may send text messages to that employee.

Figure 15:
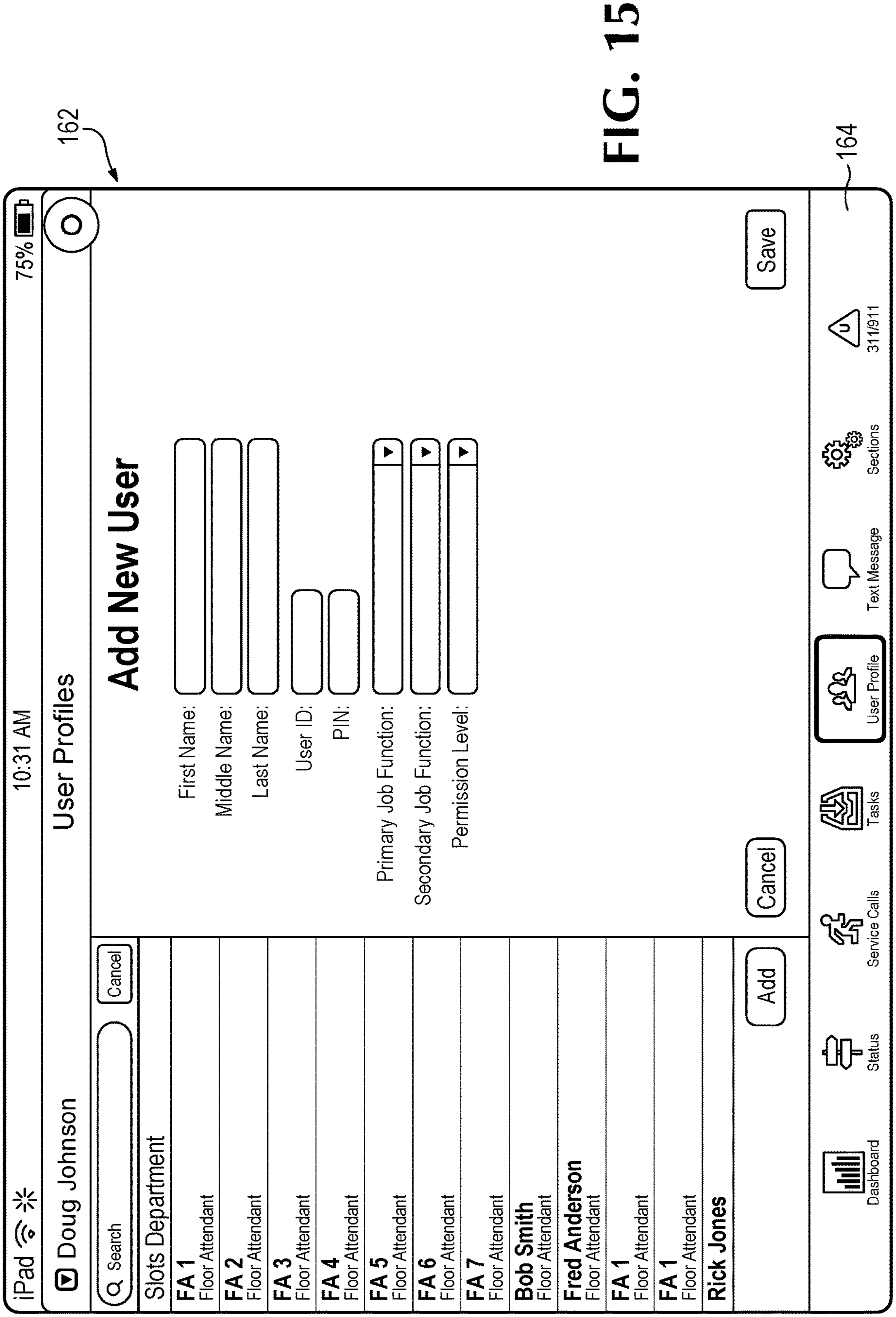

FIG. 15 indicates the "User Profile" selection in navigation bar 164. Using this screen, the supervisor can add a new user to his or her department, including the information indicated on the screen. The person so added is then available to appear on the "My Staff" list when logged in.

Figure 16:
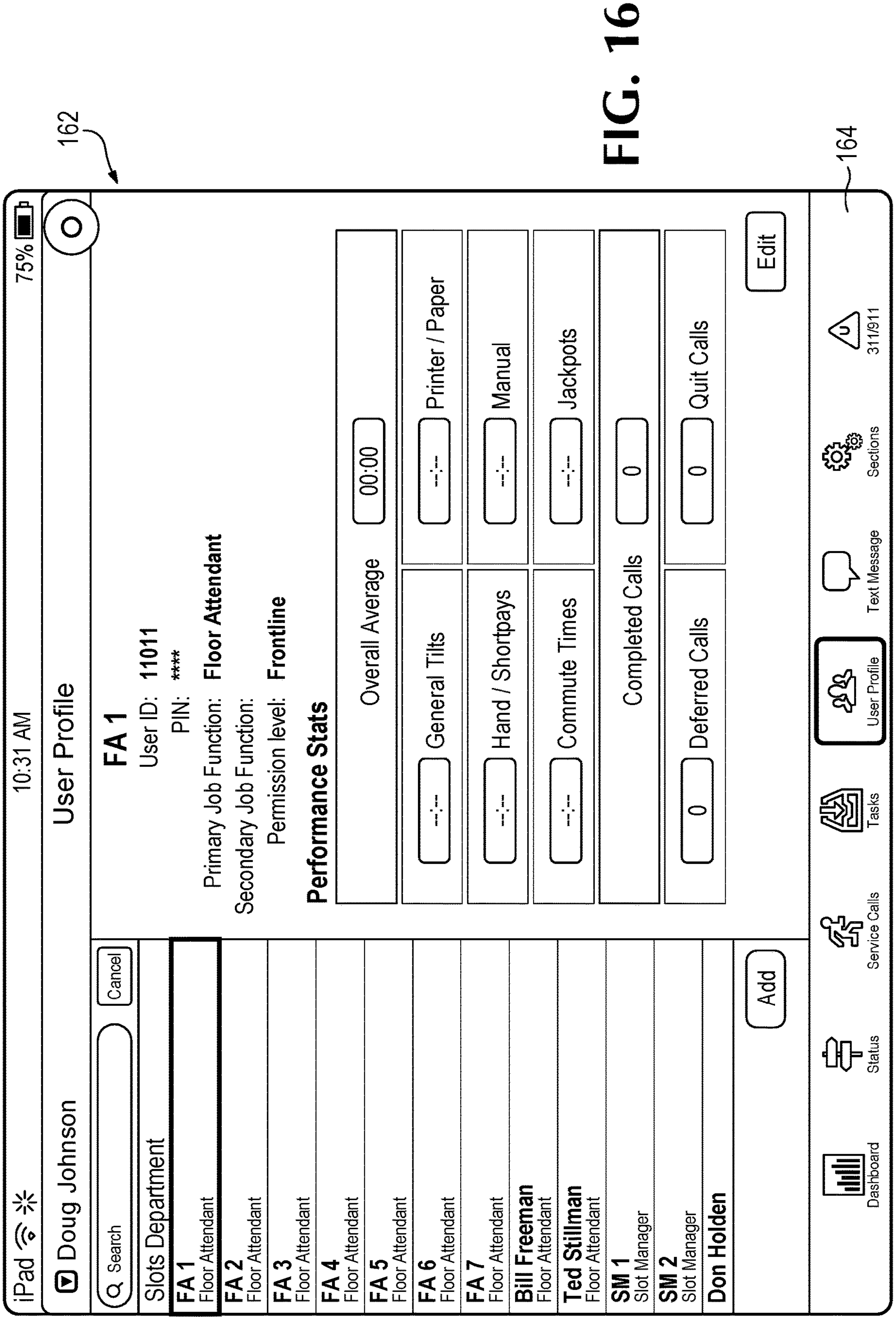

FIG. 16 is an example of the data that is associated with each user supervised. When a name is selected from the list on the left, the average times appear on the right along with the number of calls deferred, quit, and completed.

Figure 17:
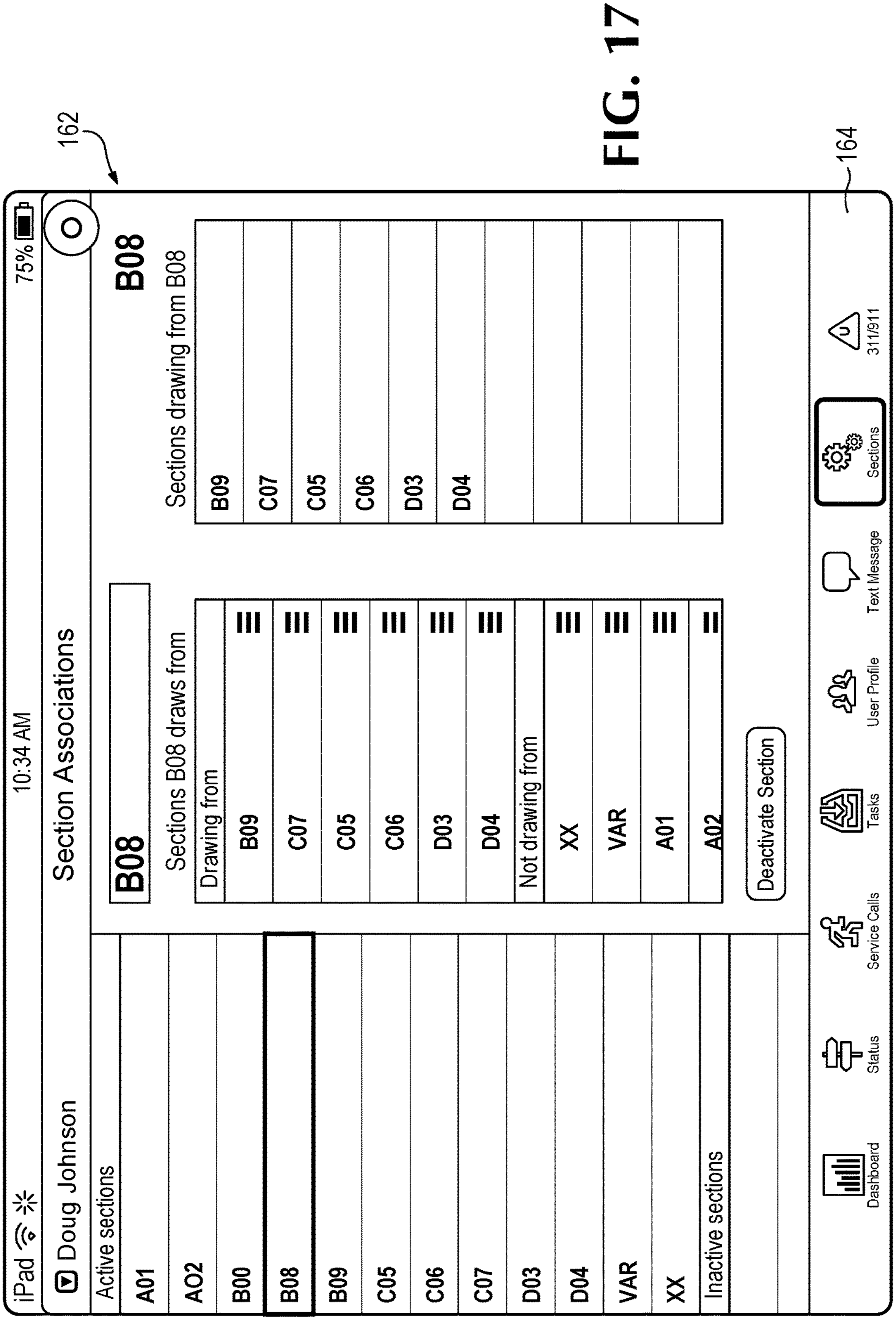

In FIG. 17, the Sections button is selected in navigation bar 164. This is the page on which section associations are entered as described in connection with Table 2. FIG. 17 depicts a different floor from that described in Table 2 above. This permits a supervisor with the required permissions to associate different sections of the casino with one another to permit staff to be drawn from adjacent sections to answer a call. In FIG. 17, staff can be drawn from the sections listed in the "Drawing from" list to respond to calls in section B08 when there is no responder in B08 as described above. Sections can be dragged between the "Drawing from" and "Not drawing from" list to reconfigure the associated sections from which staff may be drawn. The sections to which responders in B08 may be called are listed under "Sections drawing from B08."

Figure 18:
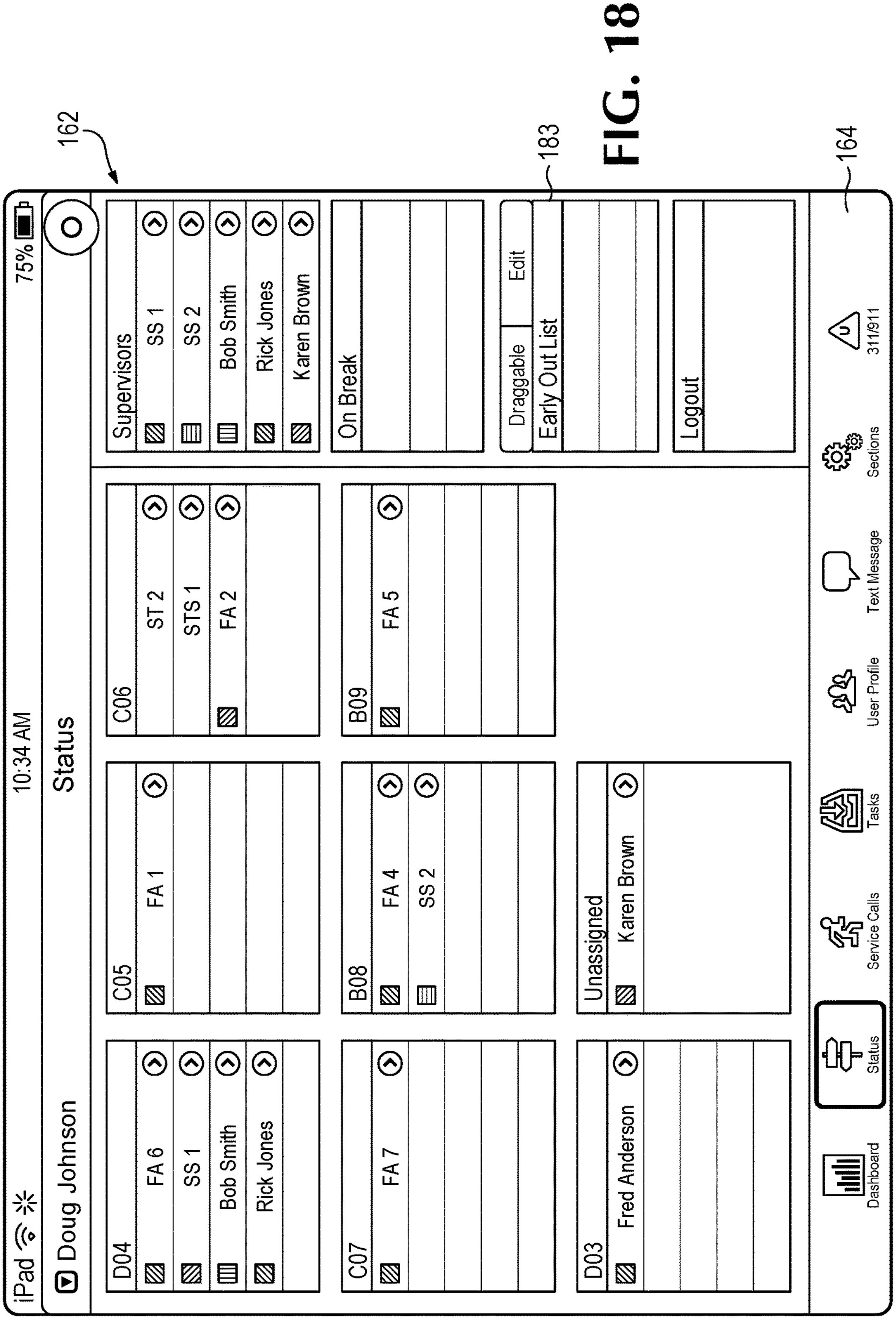

In FIG. 18, the Status box is selected in navigation bar 164. It breaks down all users by section and permits the iPad user to perform a variety of functions. For example, employees may ask to be on an Early Out List 183, shown on the screen in FIG. 18. If the floor is adequately staffed the status screen can be used to select an individual's name on the list and drag it to the logout box below. This sends a notice via the wireless network to his or her iPod touch indicating that the employee may log out and leave. If, on the other hand, one section is quite busy, the user can touch an employee's name and drag it to another section. A push notification is sent to the employee notifying him or her of the reassignment. When an employee is on break, his or her name is grayed out indicating they are unavailable. The supervisor may also call the employee while on break to return to work when, e.g., the floor becomes busy. When an employee logs out, his or her name disappears from the Status screen. A user of the Status screen can also send notices to each employee instructing him or her to go on break.

Figure 19:
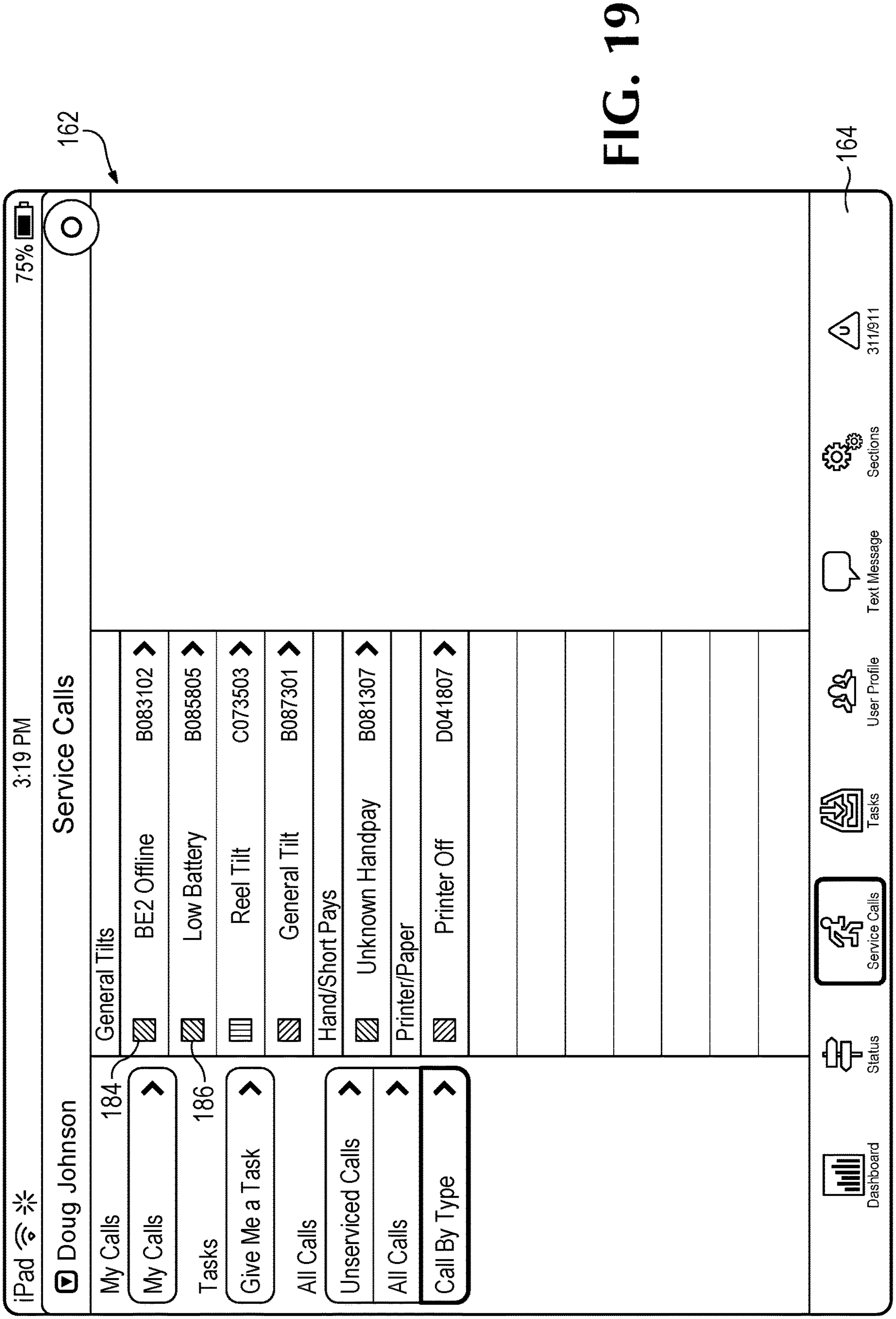

In FIG. 19, the Service Calls icon is selected in navigation bar 164. In the left hand column, the "My Calls" panel can be selected (but is not in FIG. 19) to provide the iPad user with his or her current calls. This has the same functionality as described in connection with the iPad touch devices above. Supervisors may need to respond to calls, such as for large jackpots or when a call that is normally handled by someone with a lower qualification is escalated. The supervisor monitors calls and accepts, arrives, defers, completes, and escalates in a manner similar to that described above.

Next down in the left hand column is "Tasks." The supervisor may accept tasks that are appropriate for his or her level and deal with them in the same manner as described above for tasks on the iPod touch device. The Give Me a Task panel is not selected in FIG. 19.

The next section in the left hand column displays "All Calls." In this section, a user can view all calls within the system in one of these categories: Unserviced Calls, All Calls, and Calls by Type. In FIG. 19, Calls by Type is selected. This lists all open calls by one of the five categories of call types in Table 1. In FIG. 19, there are 4 calls in the General Tilt category, one in the Hand/Short Pays category, and one in the Printer/Paper category. Each call is displayed with an indicator, like indicators 184, 186, which is colored green, yellow, or red according to the color scheme described above to indicate how long the call has been pending.

Figure 20:
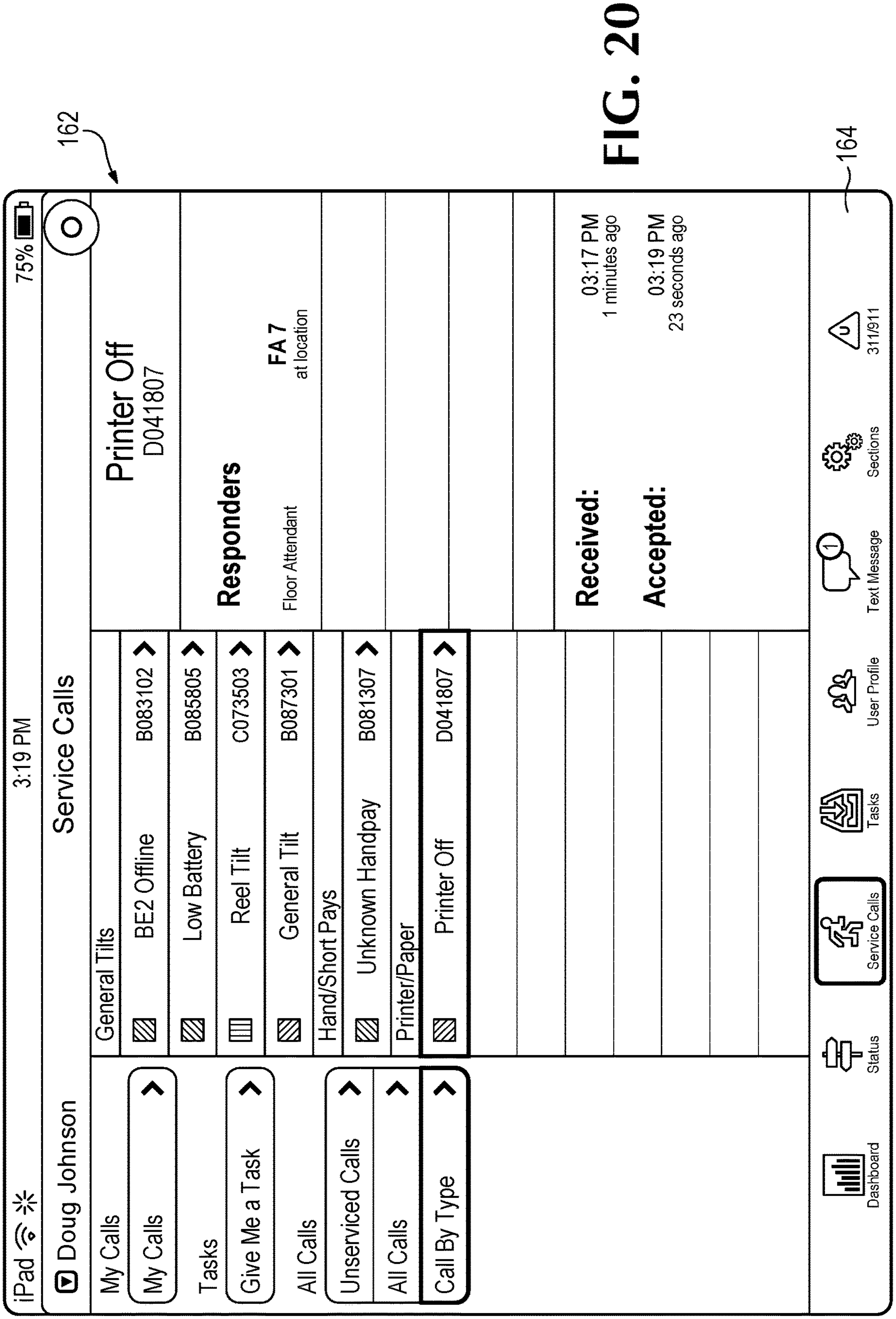

In FIG. 20, the last call in the second column, Printer Off, is selected. This provides detail in the third column about the call including who is responding and what the current status of the call is, e.g., accepted, arrived, escalated, etc.

Figure 21:
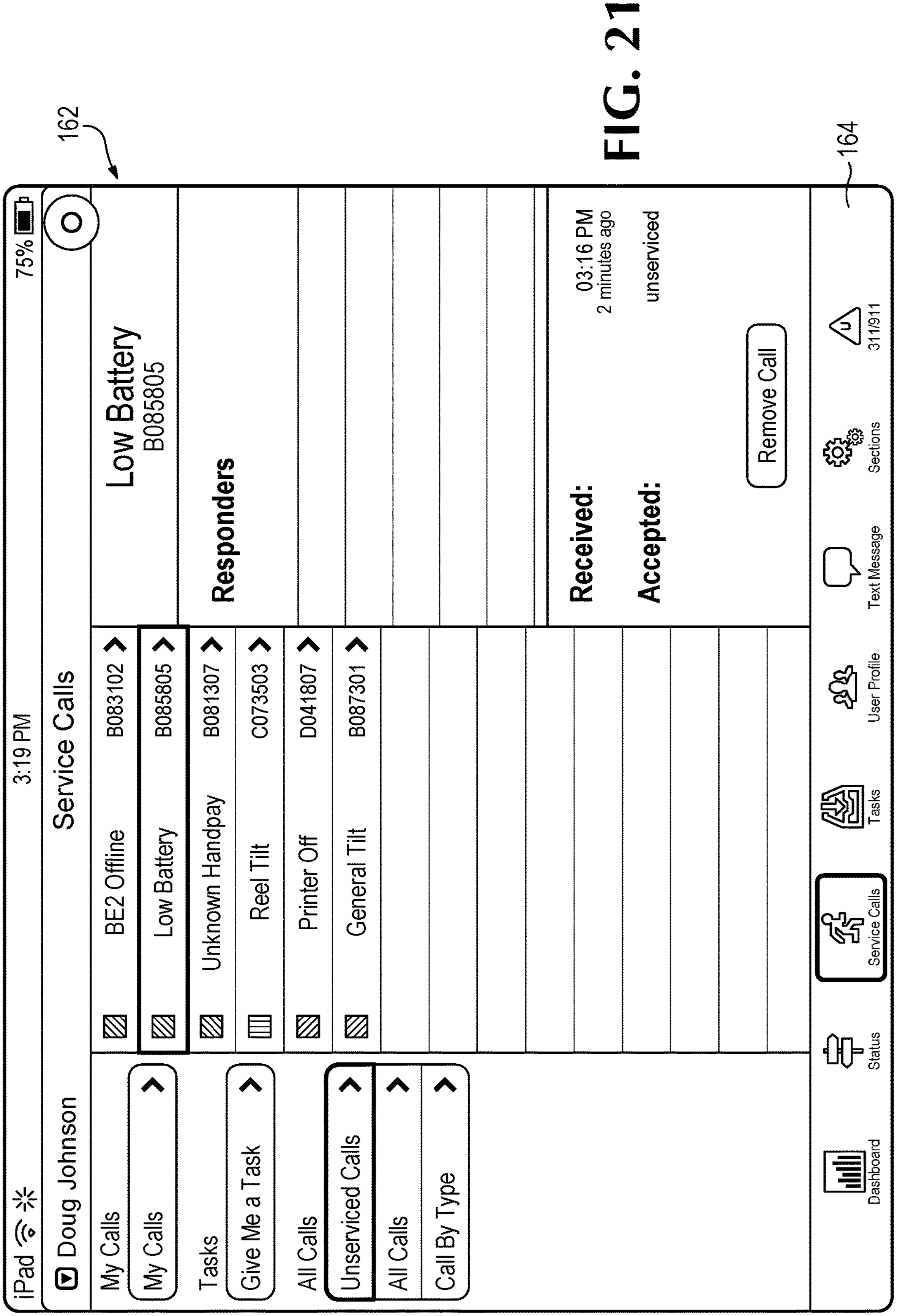

In FIG. 21, the Unserviced Calls panel is selected in the first column. This displays a list of all pending calls that have not been accepted in the second column. As with each of the categories under the All Calls heading, selecting one of the calls in the second column displays call details and status in the third column, as shown in FIG. 21 where the Low Battery call is selected in the second column.

Figure 22:
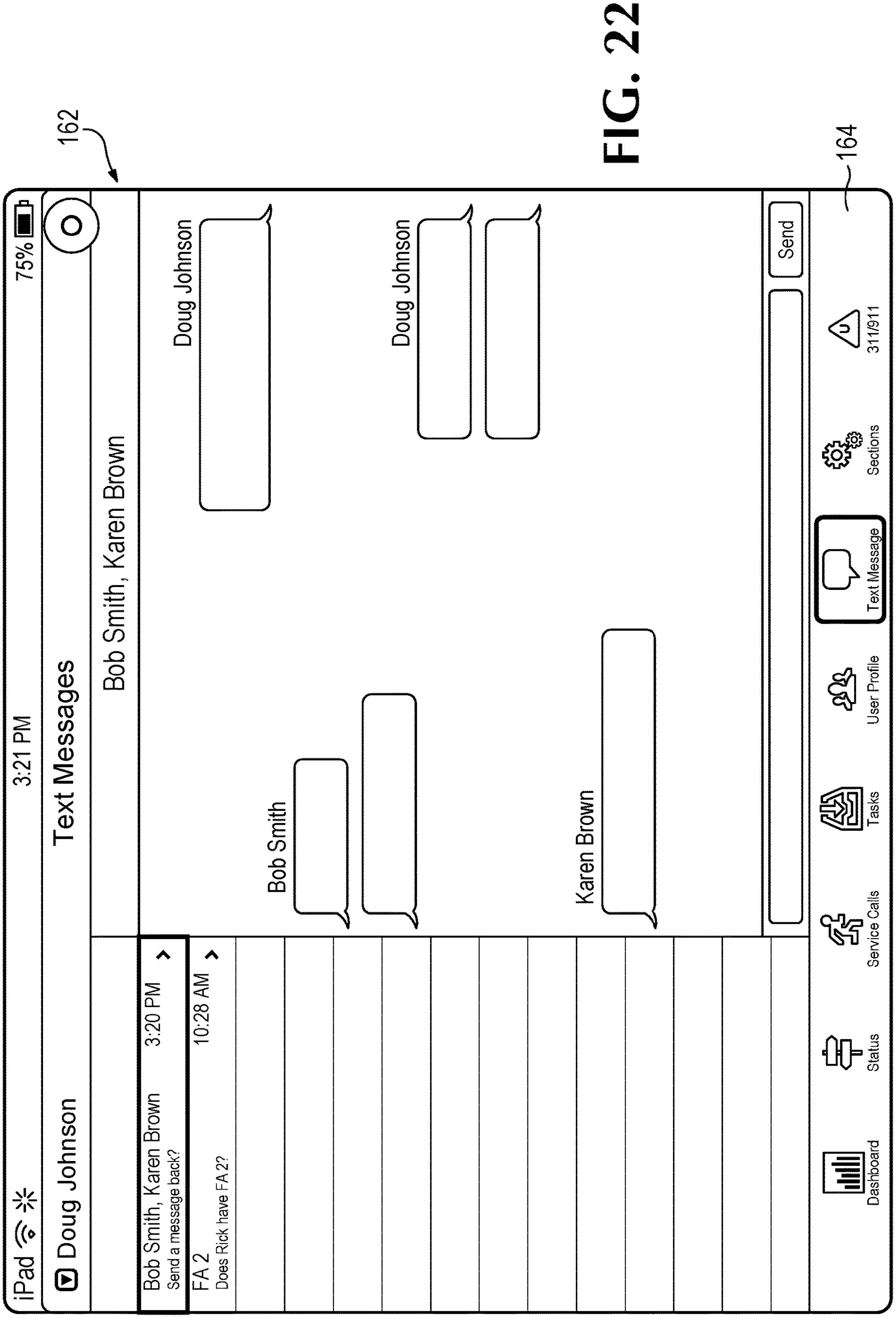

In FIG. 22, the Text Message icon is selected in navigation bar 164. This screen works much like the text messaging on most smartphones. Any user logged in, whether on an iPad computer or an iPod touch device can send messages to and receive messages from one another. The arrival of new messages triggers an audible tone. A number indicator (not appearing) on the Text Message icon displays the number of unread messages. To send a text, the name of any of the logged in users, which appear in the first column, is touched. This creates a text balloon as shown with the recipient's name on the to field at the top. The user then touches the balloon, a keyboard appears on the touch screen, and the message is typed and sent by depressing a send button, which also appears on the keyboard. Such texting utilizes essentially the same features and has similar functionality to SMS or MMS messaging in mobile phones.

Figure 23:
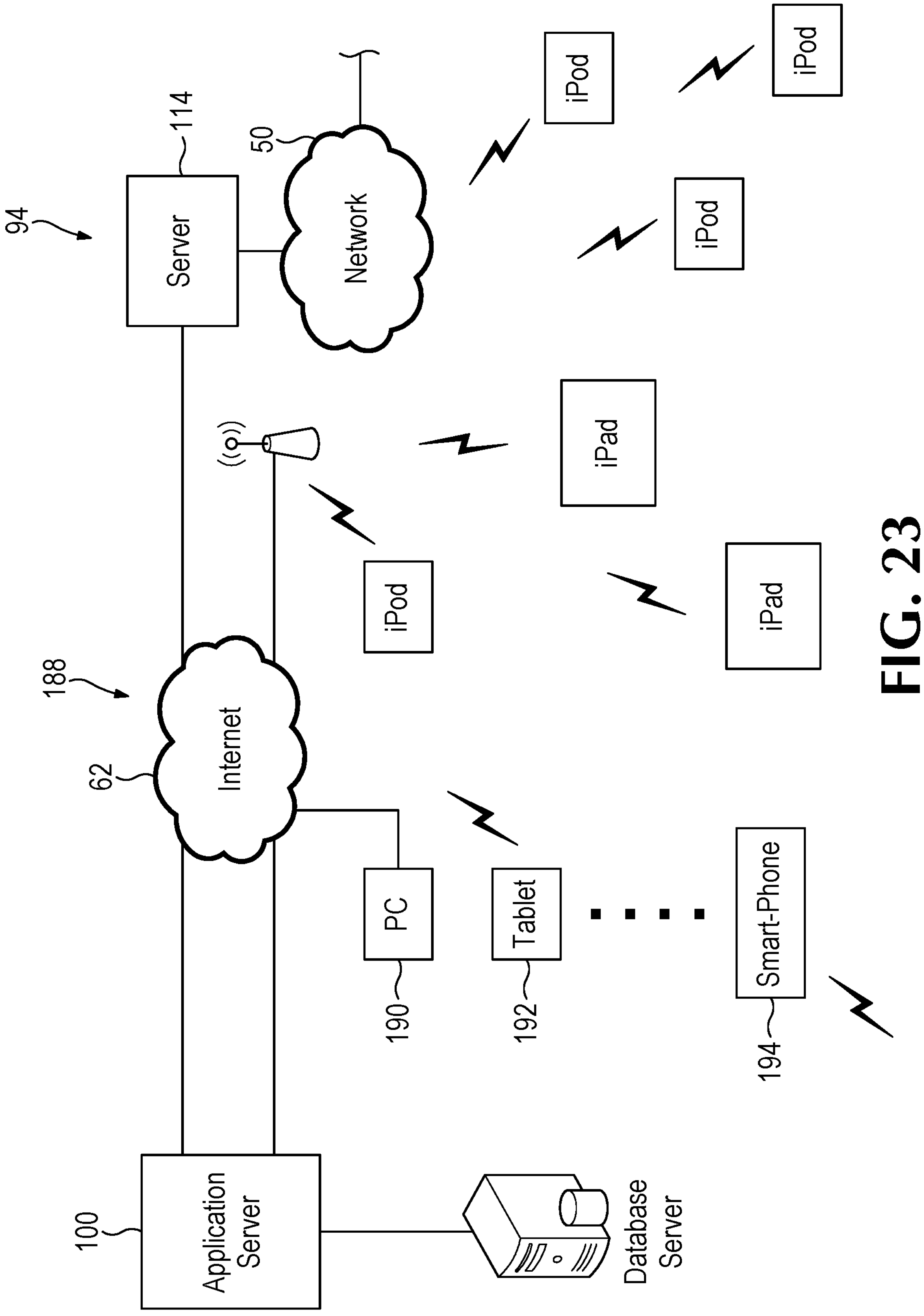
FIG. 23 is a schematic diagram similar to FIG. 4 illustrating another embodiment.

Turning now to FIG. 23, indicated generally at 188 is another embodiment of the system of the present invention. Structure that generally corresponds to that previously identified in system 92 in FIG. 4 retains the same numeral. As will be seen, system 188 includes additional functionality that for the most part may be implemented via software accessible by the system.

In addition to the structure described in FIG. 4, system 188 includes a plurality of gaming devices 190, 192, 194 connected to the Internet 62. Such devices may also include, e.g., a video gaming device like the Xbox™ device made by Microsoft. They may be connected from homes, commercial establishments, or any place that the computing devices could operate. These gaming devices can comprise many different kinds of computing devices. For example, gaming device 190 is a personal computer, gaming device 192 is a tablet computer, and gaming device 194 is a smartphone. Smartphone 194 could be connected to Internet 62 via a wireless or cellular connection.

Games may be implemented on any of these devices via a dedicated application. Alternatively, game software may be provided on server 100, which executes and runs the software thereon. In such cases, the software generates a game interface on the computing devices with which a player interacts, typically via a web browser. Wagering may be effected via deposit accounts opened using the computing device and interacting with application server 100.

Obviously many of the events in Table 1 would not require or trigger a response from a casino agent for computing devices 190, 129, 194. But some kinds of gaming activity on these gaming devices could trigger a response from the operator of system 188. For example, deviations in wagering patterns on the gaming device might trigger a text message, automated or otherwise, from system 188 that could appear in a dialog box on the computing device or be provided to the player's cell phone if that number is known.

The duration of play or deviations from duration of play could trigger such a communication. Awards won or a sequence of losses could be used to initiate a message. Essentially any event or series of events on computing devices 190, 129, 194 that can be tracked by system 188 could be used to trigger messages from the operator of system 188.

As another alternative embodiment, system 188 could be implemented without that portion in casino 94, i.e., it could be operating only computing devices connected via Internet 62 from wherever they might be.

Another aspect that can be incorporated into either system 92 or system 188 relates to assimilating personal data for the players. As mentioned above, network 50 may include a player tracking system. Such systems often maintain a modest set of demographic information about each player. This information may be used directly to personalize a message (for example, to identify the player's name for use in conversation during the event resolution). Player tracking information may also contain a photo of the player, which is useful for identification. When an identified player is playing at a machine that triggers a call as a result of an event, such as one of those in Table 1 or a beverage order, any such demographic data may be routed via the system to the responder's iPod computer or iTouch device, thus enabling the responder to quickly identify the patron who may be affected by the event that produced the call and to address him or her by name.

In addition, the player can be directly notified that help is on the way when he or she has summoned assistance or when a call is generated as a result of an issue with the player's gaming device. This message could be sent immediately after a problem is detected using information in the player's player-tracking record (or another source), such as a mobile phone number, for text or voice communication, instant message, an email address, an address on a social media network, etc. This communication might read or be heard as follows: "Hi Diane. We've detected a bill jam on your game and apologize for the interruption in your play. A slot technician, Dan Stevens, has been dispatched to resolve the problem and should arrive within the next 3 minutes." As a result, the dispatched employee may know the name of the patron, among other information, and the patron knows the name of the person who is on their way to help or otherwise provide service.

The message could be displayed on the player tracking screen, on the game screen, or both. This could be instead of or in addition to communication to the player's cell phone or other mobile device.

The demographic information is also useful as a key with which to obtain additional information about the player. For example, if the player's address is within her player tracking record, that address could be compared to property records to determine whether the property is owned or rented and its approximate value, which is then useful in gauging the player's potential worth as a customer. By accessing other external databases, such as those for credit cards, shopping habits, magazine subscriptions, automobile records, etc., a player's likely personality, affinities, likes and dislikes can be discerned.

This information may be gathered during the response to the call or when the player first signs up for a player tracking membership. In a preferred embodiment, the information is gathered at time of signup and updated regularly thereafter.

The player tracking system also holds records on the player's historical activities within the casino, including game preferences, wagering habits, whether the player is winning or losing, how long they have been visiting the casino, how long they have been at the casino on this visit, and a wide range of other data.

In another embodiment, the player is asked to respond to a survey indicating the level of satisfaction with respect to how the call was resolved. This could be as basic as asking a short yes/no question inquiring whether they would want the responder to provide the same service another time if it was again required. The survey could be delivered via the player tracking system, the player's cell phone—via text, email, or call—or manually.

In a preferred embodiment, an additional database is created to store every event involving each player, how the event was resolved, who the agents were that handled the event and the survey results of the player after each event to determine satisfaction.

It is important to strive to provide every customer with a satisfying experience but casino resources are finite and, in busy times, it is impossible to provide the maximum level of service to all consumers.

When more events occur than a casino's resources can handle, it is commercially important to satisfy the most important customers first. Players who frequently visit the casino and wager in high volumes, of course, are important. These players are identifiable through the player tracking database.

Also important are consumers who do not currently wager at high volume but who have the capacity to do so in the future. The likelihood of a given consumer to become a valuable player is predictable to an important degree. Predictions of potential worth may be made by agent evaluations, recommendations by other players or by application or commitment of the consumer.

Another important means of predicting importance is by comparing personal attributes of the unknown consumer against attributes of known valuable players. For example, a consumer without a history of wagering at a casino provides personal data showing he is a 48-year-old male living at zip code 89135.

Through the personal data assimilation described earlier, it is learned the consumer also belongs to a private country club, drives a luxury car and is a frequent flier. From its database on known players, the casino determines many high-value players share these characteristics. Therefore, this new player is accorded a high level of importance.

Alternatively, any player newly signed to the player's club may be considered of extra importance, regardless of whether any information about him or her is known. Studies have shown that a player's initial experience in a casino will weigh heavily on whether that player returns and the extent to which the player gambles there. As a result, any new player may be granted a higher priority.

Furthermore, even a player that is not enrolled in a player tracking system may warrant higher priority attention. For example, an uncarded player who has been wagering $4 per game for 4 hours would warrant a higher level of attention than a player who had been playing penny games for 10 minutes. The system can note the frequency of play and amounts of wagers and infer that the same, albeit unidentified, player is playing a game.

Another embodiment of this invention utilizes standard geo-location services, such as GPS, cellular triangulation, and WiFi access point mapping to determine location of casino agents. Interior location services based upon WiFi and other methods are available from a variety of vendors, such as Google's "Google Maps 6.0," Apple's mobile location service, or products from Meridian, http://www.meridianapps.com/, of Portland Oregon. Any of these could be used to locate casino agents. In such a case, the section associations shown in Table 2 and described above may not be necessary, i.e., dispatch of employees is based on location (and of course qualification to do the job) as determined by the geo-location service instead of Table 2.

While agent selection based upon the agent's technical qualifications and physical location is technically efficient, it does not significantly improve the likelihood of consumer satisfaction or even the long-term efficiency of casino operations. As discussed above, when an agent arrives to work, she logs into the system through her iPod device, iPad computer or other equivalent communication device, which tells the system that she is available to handle events. At the end of the shift, the agent logs off, telling the system she is no longer available.

From login until logoff, when not on break, the system monitors and records the Agent's movements and actions. Many casinos are so large, multiple supervisors control a single agent, each overseeing an area of the casino. In such cases, the system is configured with each supervisor's identity, areas of responsibility and agents assigned to the supervisor.

When the agent logs in, the communicator informs her of which supervisor she reports to, her area of assignment and other details the supervisor wishes her to know. As also discussed above, she is also given an indication of how busy the casino is at any given time. All such information is constantly updated throughout the shift.

At this point, the system has a list of events within the casino that require service and a list of all available agents and their qualifications. It also possesses knowledge of priorities and the area and tasks to which each agent is assigned.

When a new event occurs, the system prioritizes it based upon player identity and how busy agents currently are at serving other events. The first priority is consumer satisfaction. If there are multiple agents qualified to handle the event and the player has had favorable interactions with one of the available agents in the past, that agent is assigned the task. The system includes a database of all casino employees, their qualifications, training, and history of performance in resolving prior events. This database can be consulted to determine priority by seeing how well the employee has resolved such calls in general, whether the employee has resolved a call for this player in the past, and, if so, how well he or she resolved the call and what, if any, survey response was made.

The communication device informs the agent of where the problem is and, optionally, the player's identity. The agent may also be reminded of the date and circumstances of her last interaction with the player and be given information about that player's preferences and desires.

If the player's importance is very high, an agent favored by the player may be called off of a current assignment to serve the new event. In that case, the system will dispatch a substitute agent to finish the task the diverted agent was working on.

If the event involves a lower-priority player, or if the player has no prior relationship with another agent, and if the casino is not busy with too many other events, the new event may be assigned to the agent with the least experience at that particular kind of event, in order to improve the agent's competence.

For example, Mary is a new agent, with little experience clearing bill acceptor jams. A bill jam event comes in from the EGM at location B-47, which is in Mary's area of responsibility. The system determines the player at that EGM has no need or desire for service from a specific agent and so assigns the event to Mary, so she can become more proficient. If the supervisor desires and personnel are available, an additional agent, or supervisor, might be dispatched to the same location in order to provide additional training for Mary or to evaluate her performance.

If the casino is busy, or the player is sensitive to delays but has no preferred agent, the task is assigned to the most experienced available agent.

Every agent's activities are monitored, recorded and evaluated. For example, Tim is a moderately experienced agent assigned to a technical malfunction event that is historically tricky to remedy. The customer at the involved EGM is a very high-value player, who is known to be demanding.

The system initiates a timer when the event occurs, as described above. In this example, presume the system is configured to allow a maximum of five minutes to resolve the problem within the player's expectations. The event is assigned to Tim, and accepted by him 30 seconds after event occurrence. Tim's supervisor is informed that a critical event service is in progress. From Tim's current location, it should take a maximum of two minutes to reach the location.

If Tim does not reach the location within two minutes, his supervisor is alerted, so that another agent may be sent to help. In this case though, Tim does arrive within the allowed time. The system knows that Tim has arrived when either (a) Tim so informs system through his communication device and/or (b) the door to the game is opened (most systems report EGM door openings and the door must be opened to fix the problem).

Tim should be able to fix the problem within three minutes after opening the door. If Tim does not declare the job finished within the allotted time, and/or the door is not properly closed within that time, the supervisor is again so informed.

In this way, the system evaluates agent performance in comparison to player worth, demands, and expectations in light of how busy the casino is at that time. The system works to preemptively inform supervisors of problems so additional resources can be dispatched. Alternatively, the system can dispatch additional agents automatically, instead of simply informing the supervisor.

These are simply two examples of event situations and not an exhaustive description of the system's full capabilities. One of skill in the art of casino management will recognize there are many ways to improve customer satisfaction within a finite budget by comparing agent qualifications, experience and availability, against customer importance, personality, history, and desires, while factoring in the nature of the event and the business of the casino to the time of the new event.

While the above examples describe the dispatch of a single agent to handle an event, it is anticipated that multiple agents may be dispatched simultaneously while other services are also provided. For example, when a player wins a jackpot of $1,200 or more the player is required to complete tax forms before payment is issued. For security reasons, witnesses are required to verify the player was given the money, security is needed to transport the money safely cross the casino floor, and paperwork is required for the cage to provide the cash.

The system can simultaneously, or in staged timing, issue notifications to the cage that cash is required, alert security to transport the funds, cause a casino host to greet the player, explain the process and get tax form signatures, and send witnesses to verify the transaction.

As set forth in applicant's co-pending '355 application, any of the messages described herein may be delivered by a virtual persona, as can any other communication that may occur on this system. The virtual persona messages may be via phone calls, text messages, e-mails, dialog boxes generated on screens, or any via any other telecommunications method. Further, such messages may be automatically generated or otherwise.

Figure 24:
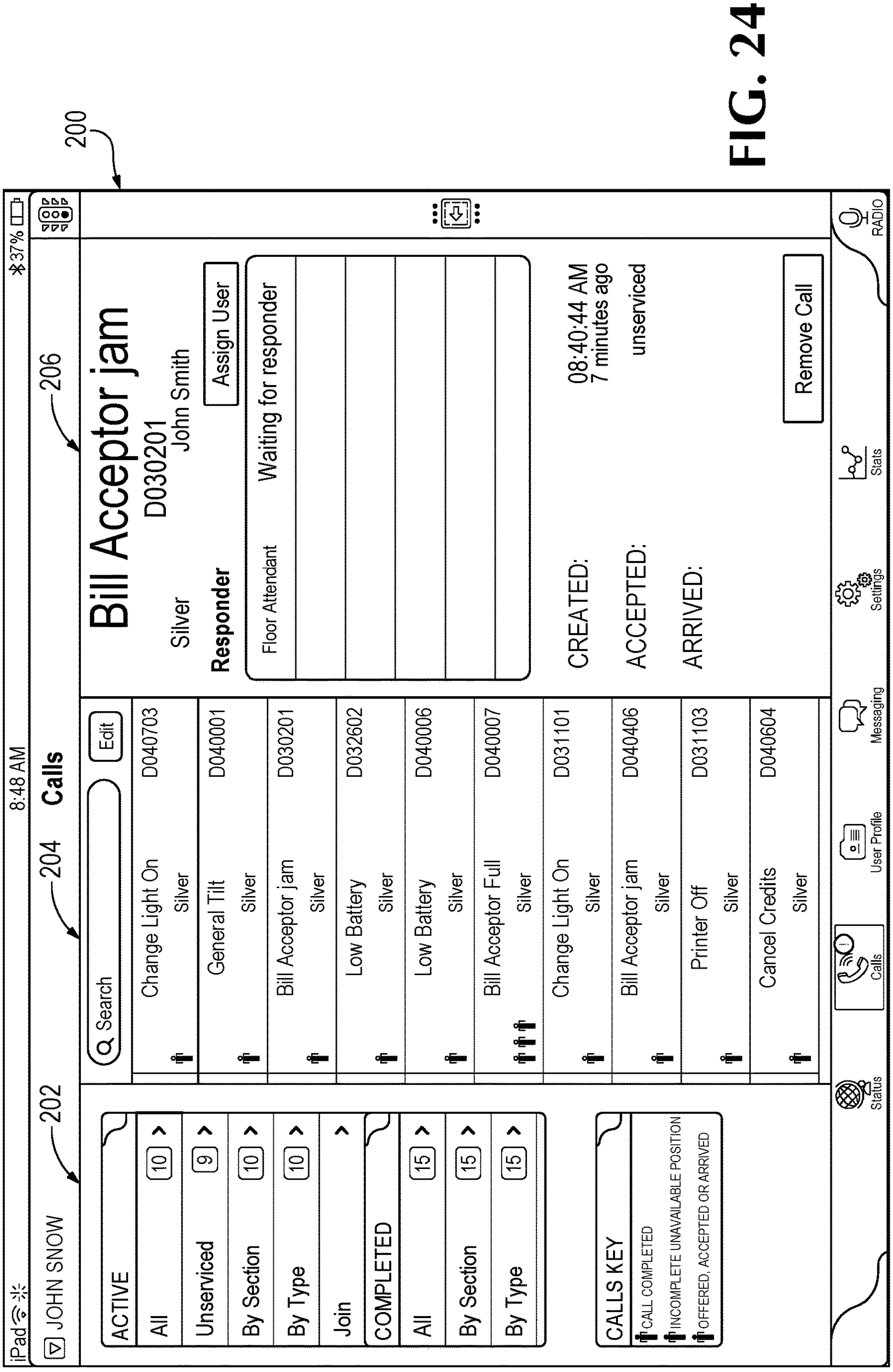
FIGS. 24-39, 41-53, 56, 59, and 62 are images of iPad touch screens upon which an embodiment is implemented.

Illustrated in FIG. 24 is a portion of another embodiment. As with the previously described embodiments, the FIG. 24 embodiment is implemented on an iPad™ device, and FIG. 24 is a view of one of the displayed screens on the device, which is indicated generally at 200. As with the first embodiment, there is a navigation bar at the bottom from which different screens can be selected. In FIG. 24, the Calls screen is selected and displayed. It includes three sections, a calls summary panel 202, a call list panel 204, and a call detail panel 206. As can be seen in panel 202, the number of active calls is listed by category: All, Unserviced, By Section, and By Type. Panel 202 includes a section listing Completed calls, also categorized: All, By Section, and By Type. There is also a Join selection, which permits a user of device 200 to join a call in progress as will be explained shortly. Device 200 is referred to as a supervisor device, although any user can log into any device. The permitted user role, however, may limit the action that a logged in employee may take. And the system will not permit an employee to log in under a role that is not associated with the employee in the system and therefore not a permitted role.

Each call listed in panel 204 includes at least one icon of a human figure, each of which correspond to a user who has been offered or accepted a call generated by the system—or to a role in the system for which there is currently no user. The color of each icon indicates whether the user has completed the call; whether the user has been offered or accepted the call, or has arrived at the location specified in the call; and whether there is no user associated with the role needed on the call.

Figure 28:
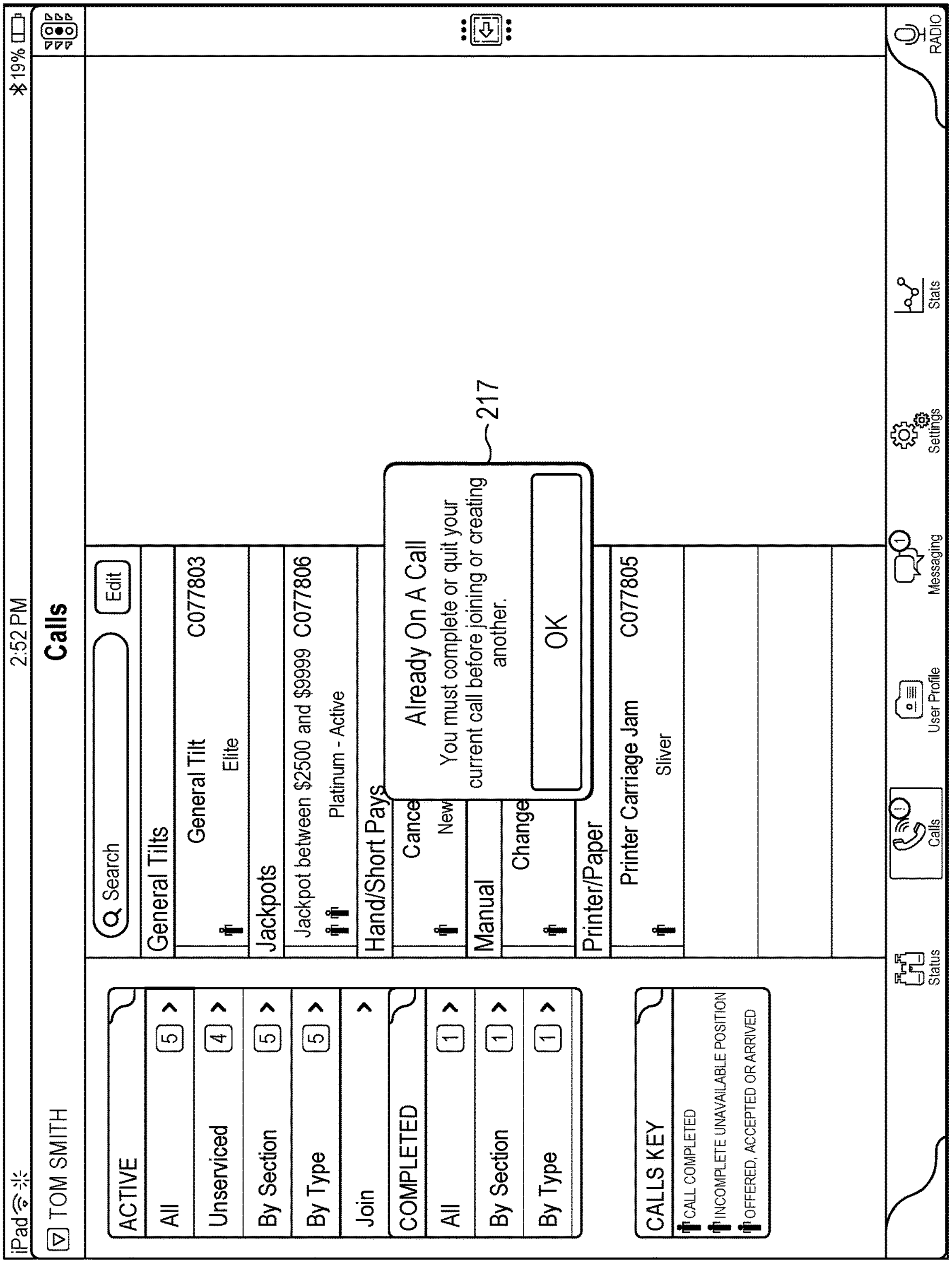

The supervisor device 200 can view any category of the calls by touching the name in panel 202. For example, All calls is selected in panel 202 of FIG. 24 and listed in panel 204. Unserviced calls, which is not selected in FIG. 24, lists all the calls that have not been accepted by a user. By Section lists all of the calls but sorted into subheadings by section on the floor. And By Type lists all of the calls but sorted into subheadings by type of call, e.g., Change Light On, General Tilt, Bill Acceptor jam, etc. (FIG. 28 depicts calls sorted into subheadings.) Completed calls may be similarly displayed except there is no Unserviced category because all completed calls have been serviced.

As can be seen in FIG. 24, when one of the calls in panel 204 is selected, the detail for that call appears in panel 206. It is possible for supervisor device 200 to assign a user to the call by touching the Assign User button, which will soon be described in more detail. The detail panel 206, includes the type of call, in this case Bill Acceptor jam, The floor section, D03, and the machine number 0201. Because the player of this particular machine is logged in to his player tracking account, his name, John Smith, also appears along with his status, Silver, in the player tracking system. In addition, the type of Responder, Floor Attendant, is listed as is status, Waiting for responder. Finally, Remove Call button in the lower right hand corner permits supervisor device 200 to cancel the call but only if it has not yet been accepted by the user to whom the call was offered.

Before describing further functionality, it should be noted that the drawings are populated with simulated data, including calls, machine locations, users, comments, etc., which depict how the system actually works on a gaming floor. There may be inconsistencies in the data from one drawing to another. Regardless, the drawings illustrate the views, panels, buttons, various user inputs, and device responses that produce the decreased call times, increased user satisfaction, report generation, and other benefits associated with these systems and methods.

Figure 25:
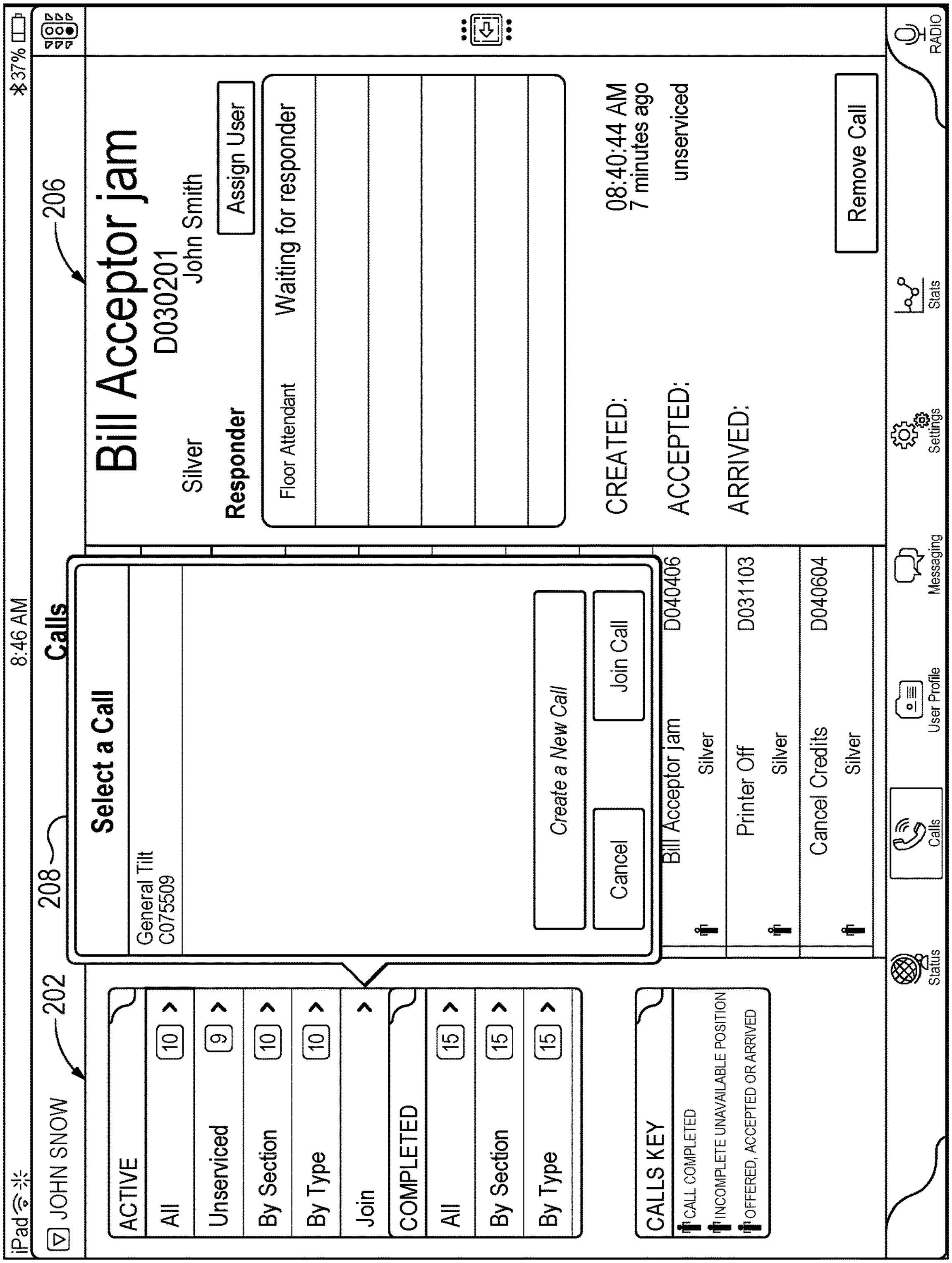

Turning now to FIG. 25, the Join button is selected in panel 202 thus generating a pop-up panel 208. Panel 208 included a scrollable list of all active calls, only one of which is viewable in FIG. 25. As can be seen in panel 206, there is a call to a floor attendant who has not yet responded by accepting or deferring the call. A user of device 200 may scroll the list in panel 208 and touch a call, e.g., General Tilt call. Thereafter if the Join Call button on the panel 208 is pressed, the user of device 200 is added to the call and may respond in the same fashion as if the call were automatically generated by the system.

Figure 26:
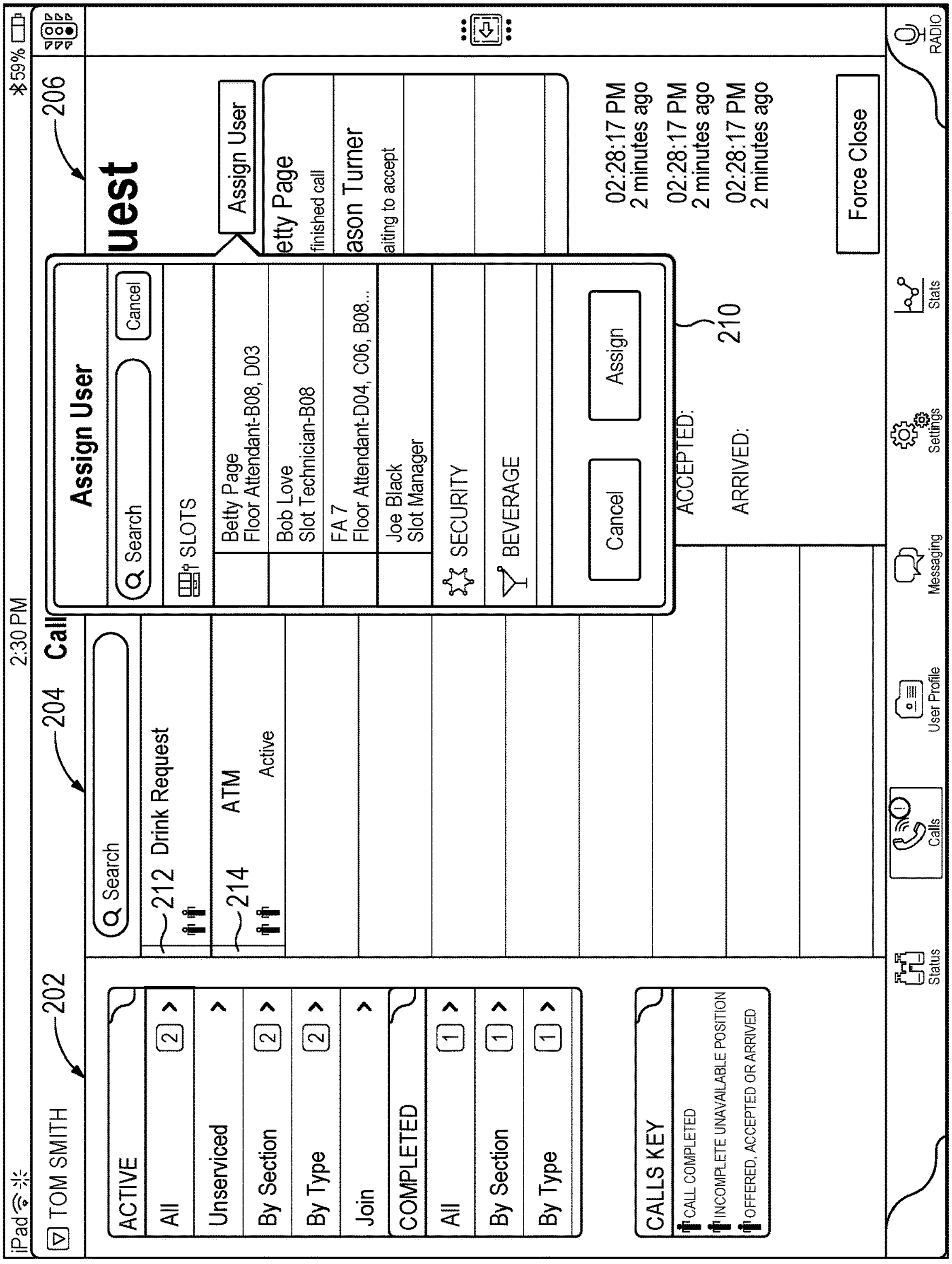

In FIG. 26, the user of device 200 has selected the Drink Request call in panel 204. As a result, the detail for that call is displayed in panel 206 (although partially obscured in this view). There is an Assign User button that appears in panel 206. When the Assign User button is touched, a pop-up panel 210 appears, which includes a scrollable list of all employees who are logged in. As can be seen in panel 210, each line includes an employee name, the role in which the employee is currently registered in the system, and the section or section where he or she is serving. The employees are sorted by work area, e.g., Slots, Security, and Beverage. Touching on one of those headers conceals the list under the other headers and displays only the employees for the selected area, as show for slots in FIG. 26.

The Assign User button might be used when a user of device 200 selects the Unserviced Calls in panel 202 and sees a particularly old unserviced call. Alternatively, the Assign User button may be used to assign a user to any active call, even if another user has accepted it. The Unserviced calls include a color-coded stripe, like stripes 212, 214 at the left side of each call in panel 204. Each color provides the supervisor device 200 with a quick indication of how long the call has been open. For example, a green stripe would indicate a recently opened call, e.g., less than 3 minutes, a yellow stripe 3-5 minutes, and a red stripe, over 6 minutes. For unserviced calls, yellow and red stripes might inform the user of device 200 that the call needs to be assigned using the Assign User button as described. Different types of calls might require different times for their respective stripe colors to appear. And these could be different at different casinos, depending upon the targets for responding to calls.

In each call detail of panel 206, which can be better seen in FIGS. 24-26, there is an indication at the bottom of the panel of when the call was created, either by the system or manually, when a user accepted the call, and when it was completed. Current status and elapsed time is also displayed. As a result, a user of device 200 may quickly be informed about which calls may need to have a user or another user assigned via panel 210.

Figure 27:
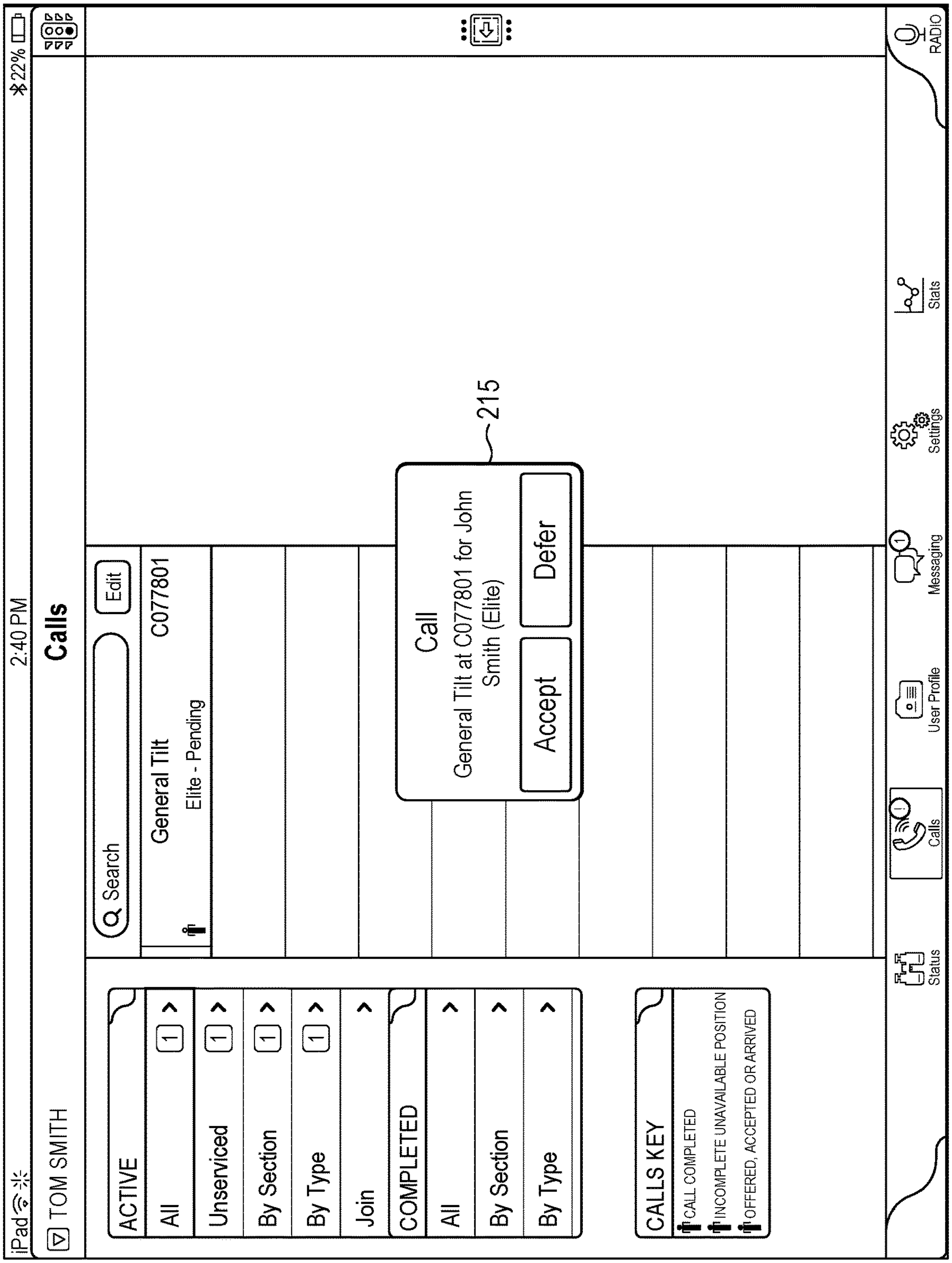

FIG. 27 illustrates how device 200 is notified that the system has offered him or her a call. An audible alert occurs and a pop-up panel 215 notifies the user of the call type, and the location, including the section number and machine number. In addition, if the player at the machine requiring service is a carded player, i.e., logged into the player tracking system, his or her name and status appears on panel 215. Also appearing is the player's status, i.e., typically an indication of how much tracked wagering the player does. As a result, the user of device 200 can provide service commensurate with the level of significance associated with the player in the player tracking system.

If the user of device 200 presses the defer button, the call is offered to another person on his or her device, panel 215 disappears, and the screen reverts back to its condition before panel 215 appeared. If the Accept button is depressed, panel 215 also disappears, and the call becomes the user's call on device 200. Because device 200 lists many calls in panel 204, including the call to which the user is assigned, an exclamation point appears over the Calls button in the navigation bar to remind the user that he or she is on a call that has been offered, accepted, or not yet complete.

FIG. 28 depicts a pop-up panel 217 that appears on the screen if the user tries to log out before completing an active call. The user depresses the OK button on panel 214, completes the call and can then log out.

Figure 29:
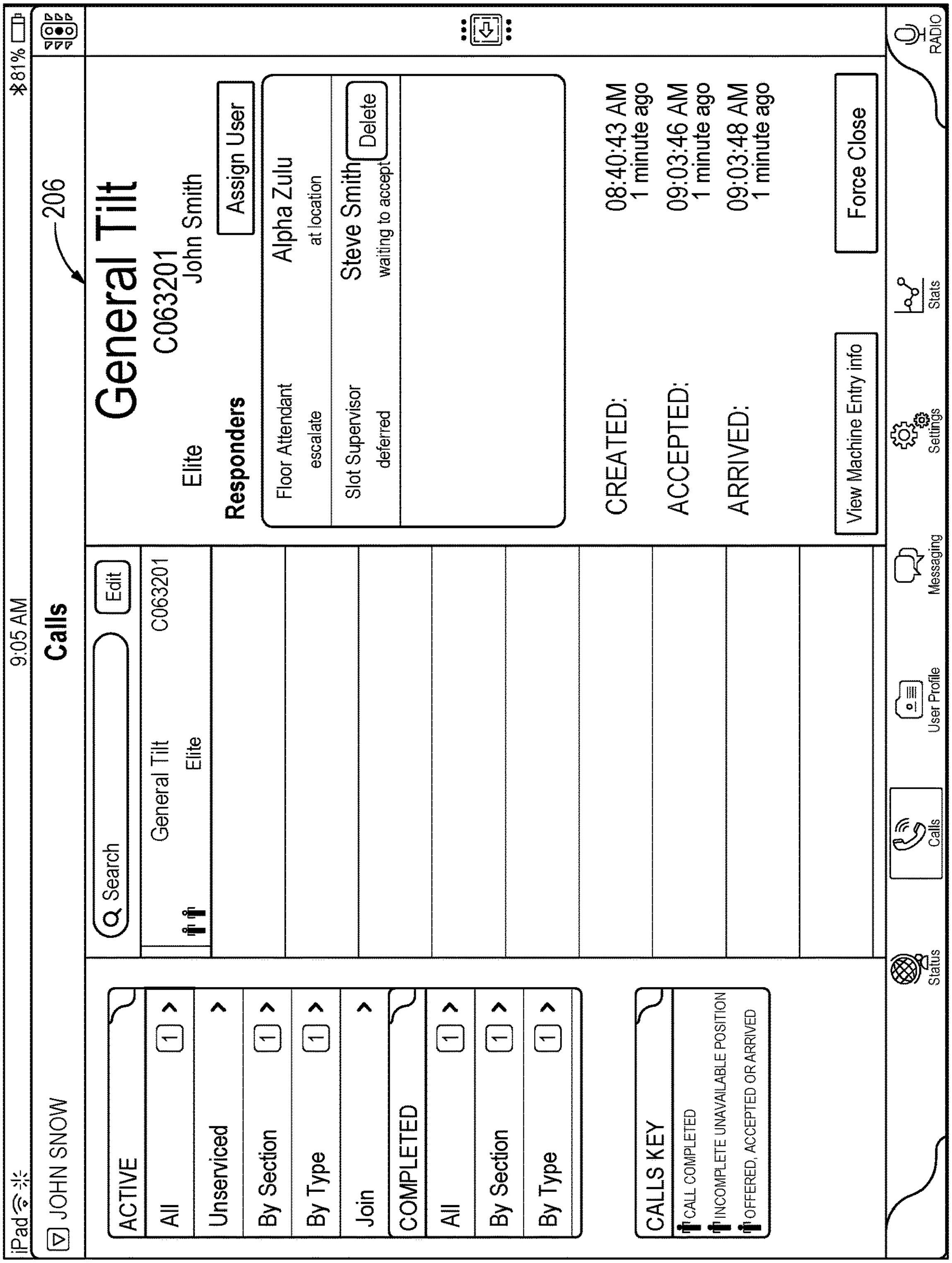

FIG. 29 depicts a feature in which a finger swipe across the name of a responder in panel 206 brings up a delete button as shown. When depressed, this role is deleted from the call. This feature may only be exercised before a responder has accepted the call; after that it does not work. But alternative embodiments permit deletion at any time.

Figure 30:
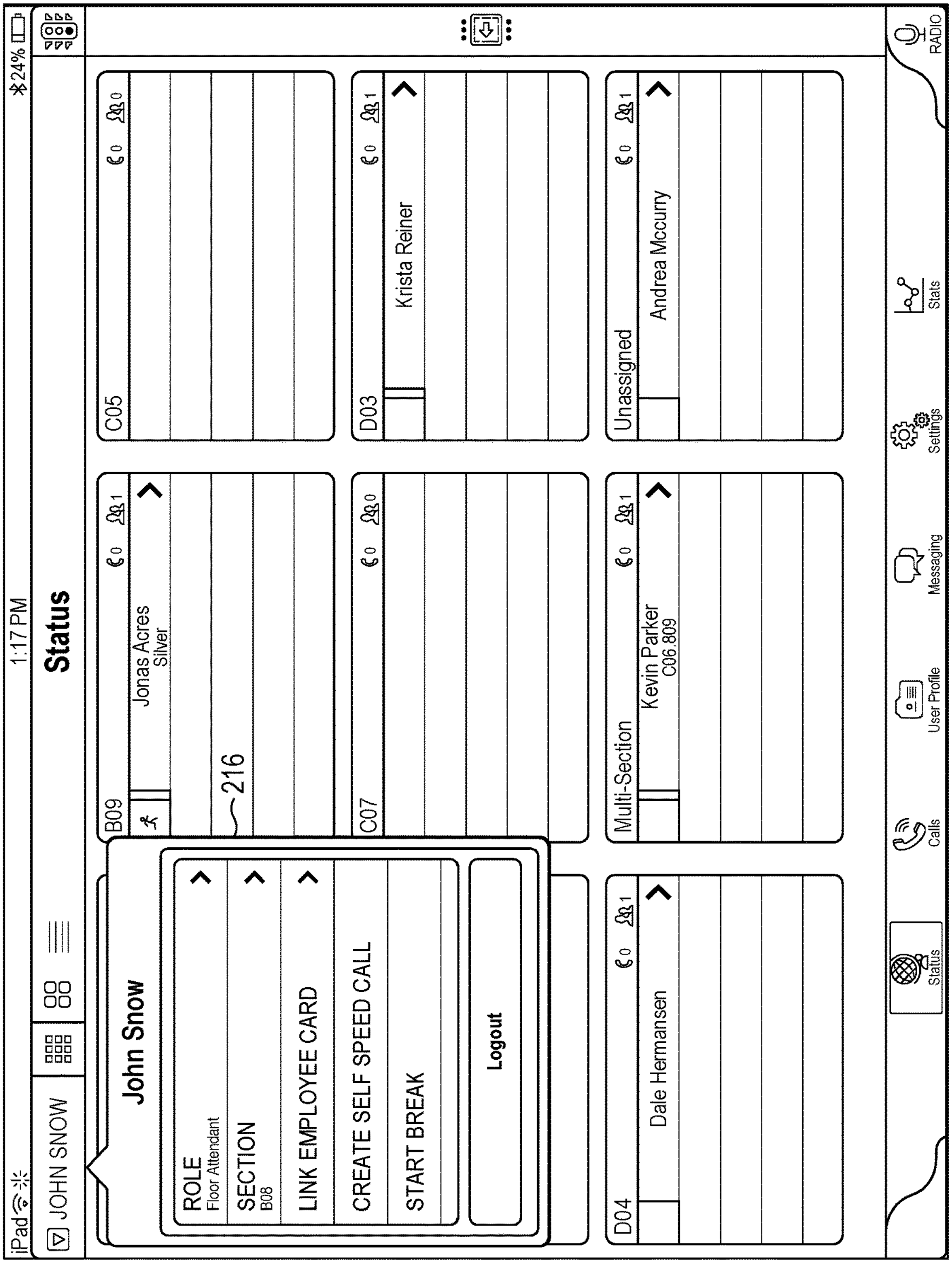

FIG. 30 shows an assignment pop-up menu 216, which may be accessed on any screen that is presented on device 200. In the upper left corner of the screen, the name of the employee logged in on device 200, John Smith, appears next to a downwardly directed arrow. Anytime the name is touched, menu 216 appears. When the entries on menu 216 are touched, additional screens (not shown) display. These additional screens permit the employee to identify which role or roles of his or her permissible roles the employee will be associated with during the current work period. The employee also designates the section or sections to which he or she will be as signed.

Each employee has a Machine Access Card that must be inserted into a slot in a card reader associated with each machine to obtain access to the machine. This is the same type of card and is inserted into the same slot as a player-tracking card. When the employee touches the Link Employee Card item on menu 216, he or she can insert the card into any card reader. The system then presents on a pop-up screen (not shown) the machine number associated with the card reader into which the card was inserted. When the employee touches the machine number the Machine Access Card and employee user profile are linked in the system. As will be seen, this facilitates automatic creation of a machine entry log and enables rapid supervisor response to an illegal entry.

Figure 31:
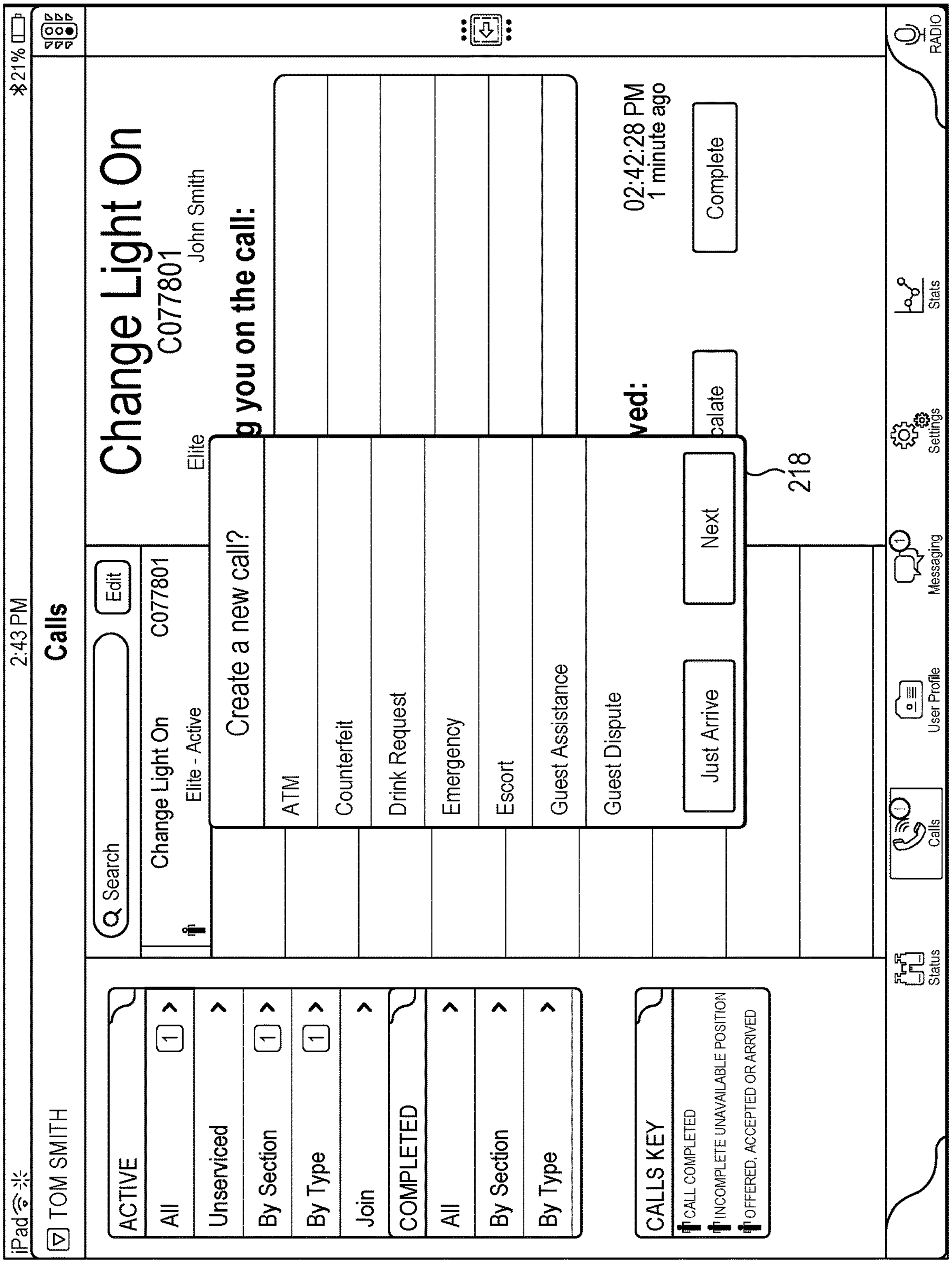

The next menu item is Create Self Speed Call, which produces a scrollable pop-up panel 218 as shown in FIG. 31, which is described shortly. The final menu item is Start Break, which produces a panel asking whether the employee wants to start his or her break. Two different buttons appear, one for 15 minutes and one for 30 minutes, which can vary depending on the employee's status or job. But of course any break time could be implemented. When one of the buttons is touched, break timers begin, and the employee's status in the system is indicated as being on break. As will be seen, a supervisor can be notified via one of the devices that an employee has exceeded the allocated break time.

Panel 218 permits the user of device 200 to manually generate a call that he or she is assigned to. Various reasons for such a call appear on panel 218 but different reasons could be used, or reasons that are entered manually via a keypad. This is the same panel that appears if the Create a New Call button is pressed on panel 208 in FIG. 25. In other words, there are different ways to access panel 218. In FIG. 31, the user has selected Counterfeit, although this selection is not shown. Although not visible in FIG. 31 when the list on panel 218 is scrolled the following additional types of creatable calls appear: Guest Dispute, Machine Entry, Medical, Restroom.

Figure 32:
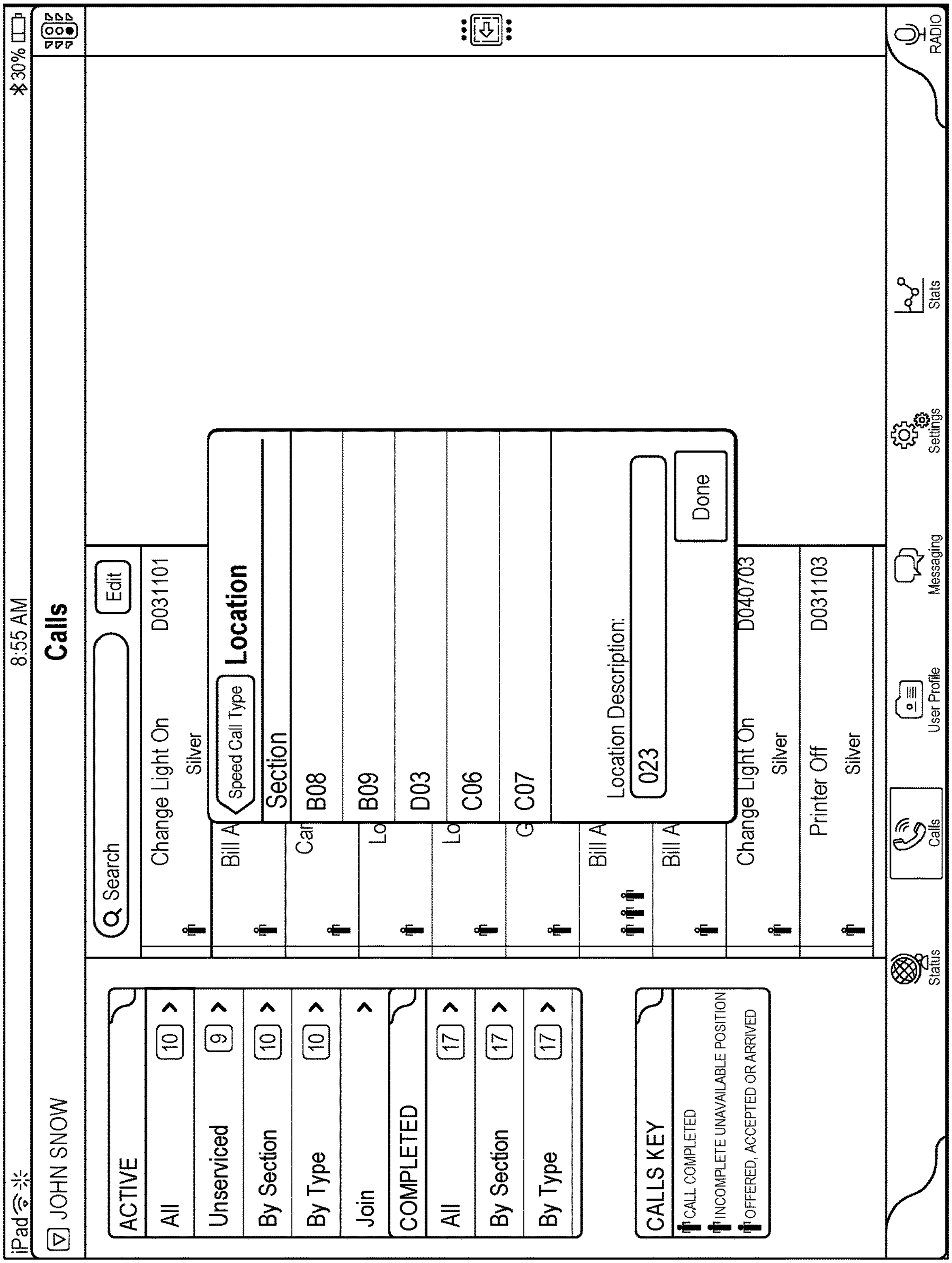

In FIG. 32 after selecting the type of call from the list on panel 218 (the counterfeit in this instance), the user is prompted to enter a location. The user touches one of the listed section locations and then enters, via a touch-screen keypad that appears when user touches the text entry box beneath "Location Description," a location. In this case it is a machine number, but it could be anything, such as the name of a restaurant, a cashier's cage, etc.

Figure 33:
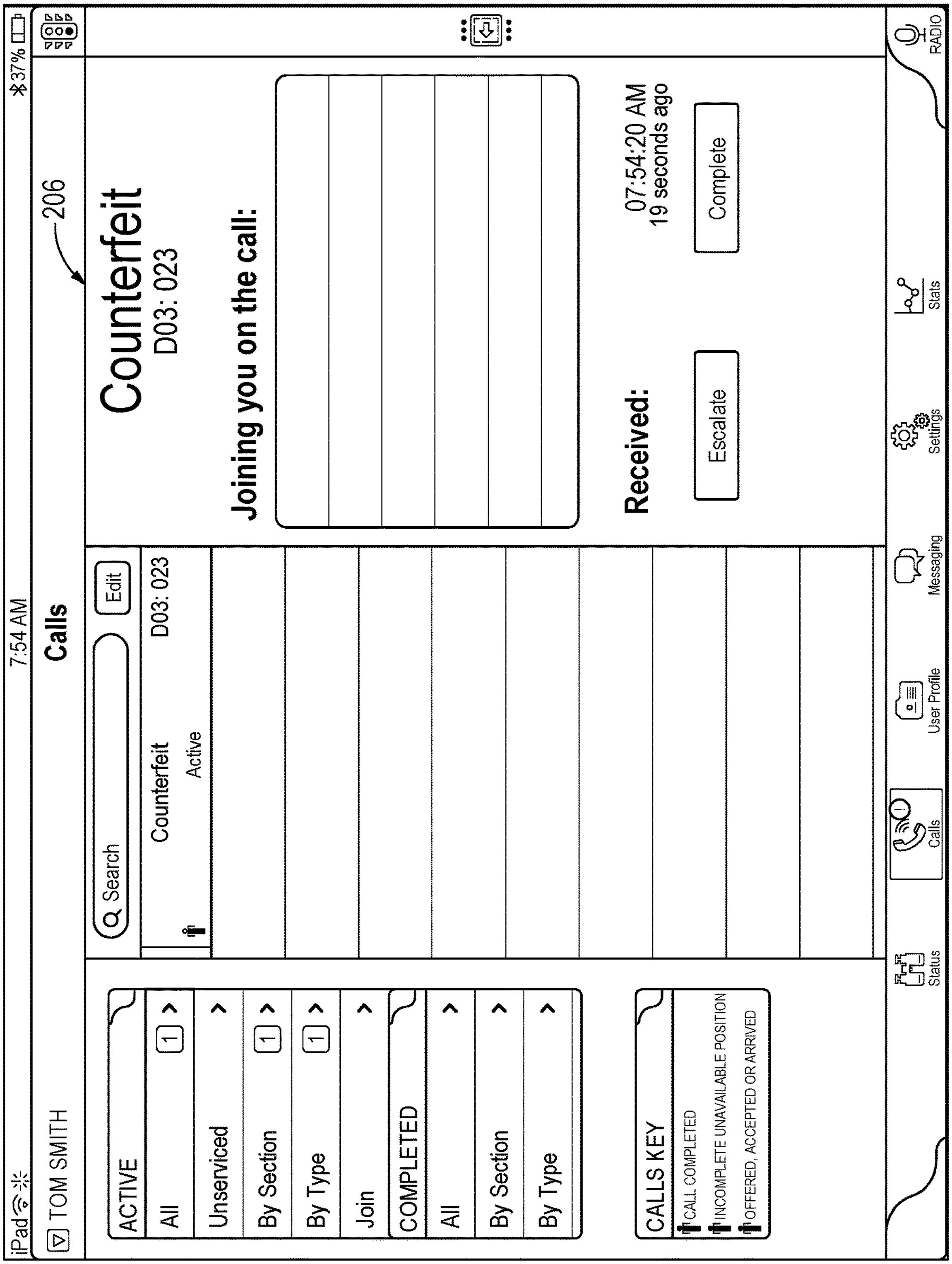

As can be seen in FIG. 33, the newly created call appears on the user's call detail panel, and an exclamation point appears over the Calls button in the navigation bar to indicate that the user is on an active call. The type of call just created by the user, Counterfeit, and the call location, also just created by the user, both appear in panel 206. This call, now being created in the system, also appears to other users who use devices like device 200 and have the appropriate permissions to view calls.

Figure 34:
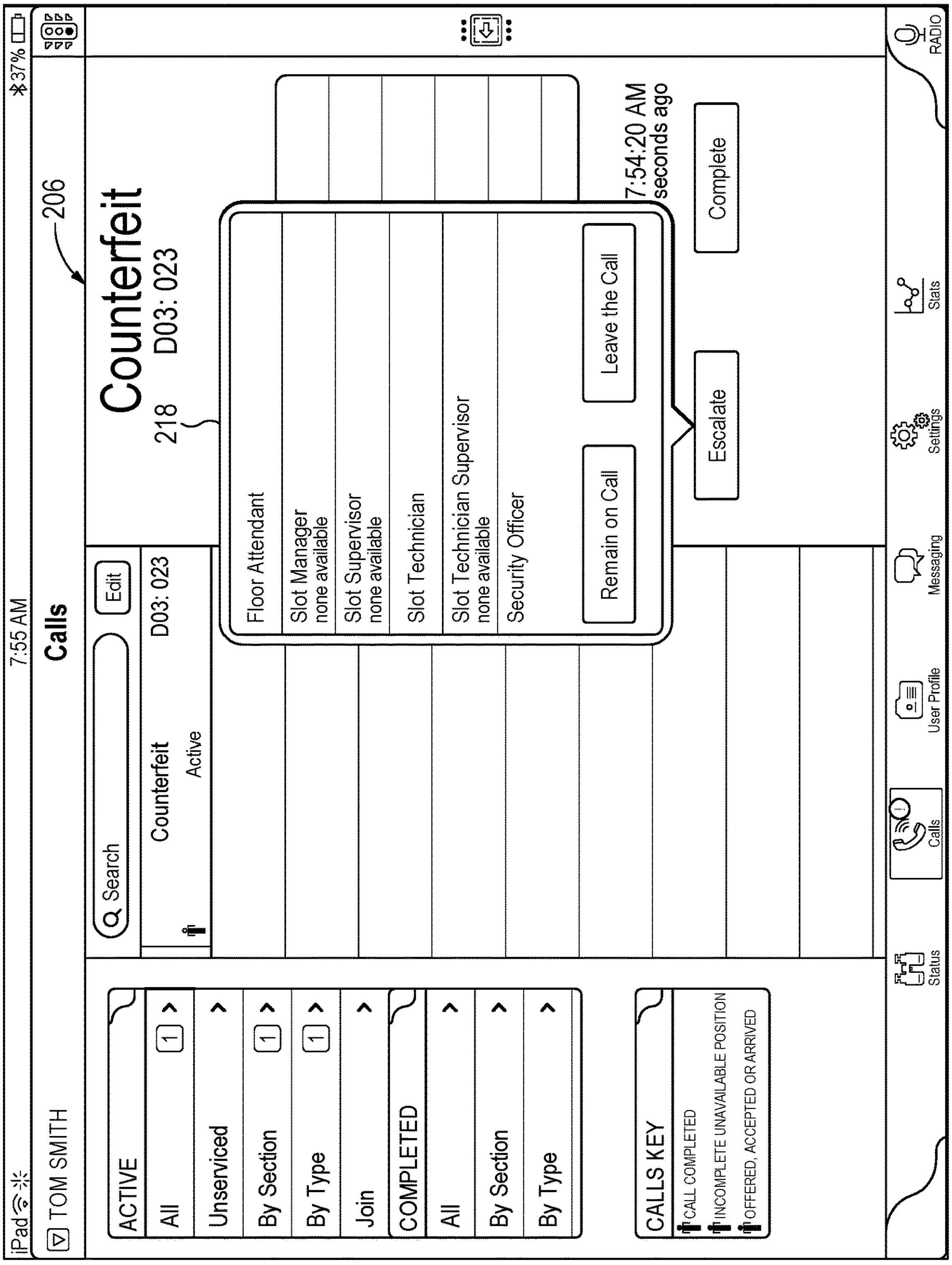

In FIG. 34, the user has pressed the escalate button in FIG. 33, perhaps after dealing with the situation for a while and determining that more assistance is required. This brings up a pop-up panel 218, which permits the user to specify the role of an additional responder who will receive an offer to join this call. In addition, the user of device 200 can press one of two buttons on panel 218: Remain on Call or Leave the Call. Thus he or she may be calling in reinforcement or turning the call over to another responder depending upon which button is pressed. The call detail panel 206 will either disappear, if the user is leaving the call, or will indicate status of offer to additional responder(s) if the user is staying on the call.

Figure 35:
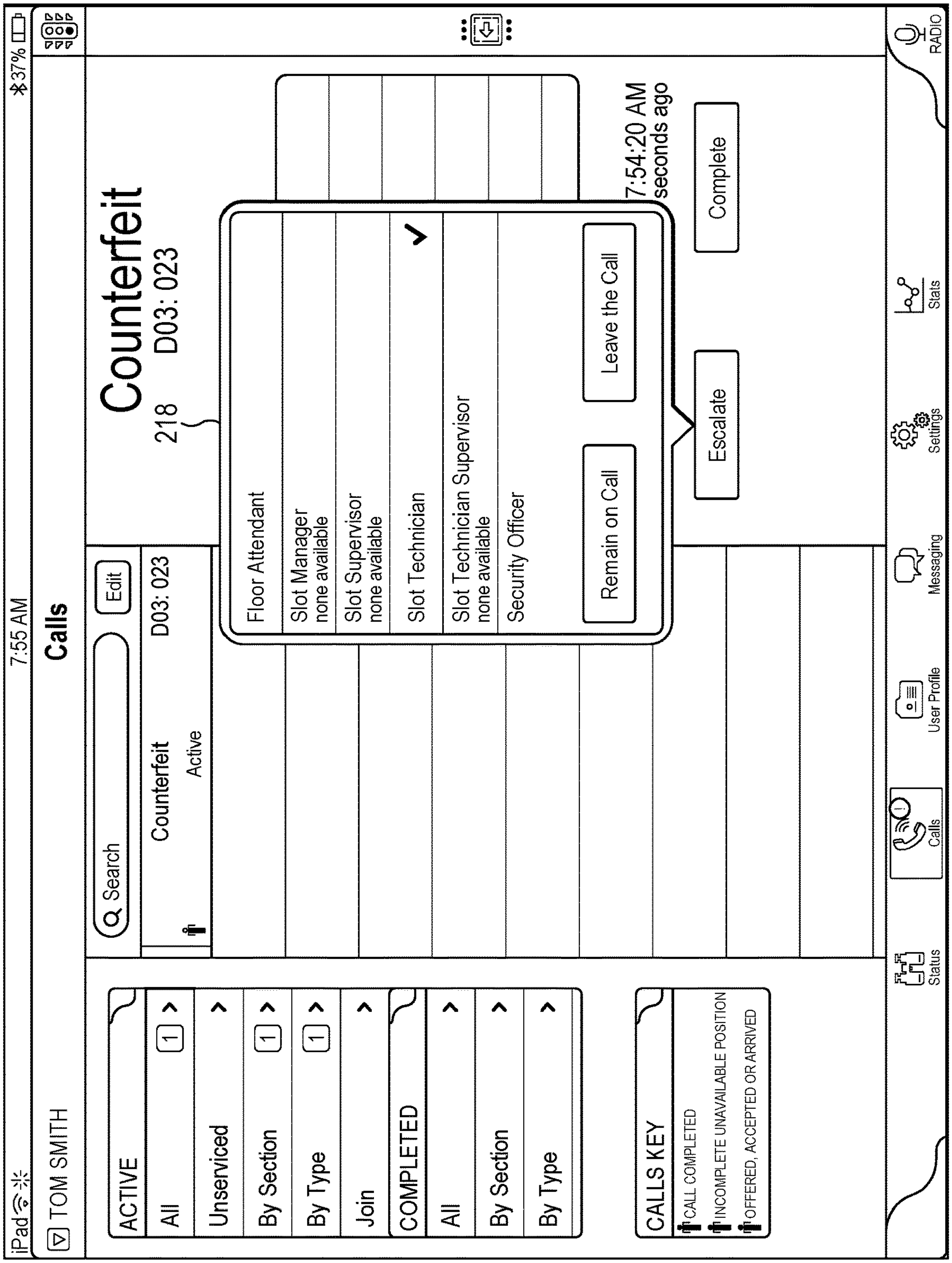

In FIG. 35, the user of device 200 has selected Slot Technician by touching that entry. A check mark appears to indicate it has been selected. Because in FIG. 35, the user selected the Remain on the Call button on panel 35, after selecting the Slot Technician, the screen assumes the condition of FIG. 36, indicating who was offered the call and the status of the offer.

Figure 36:
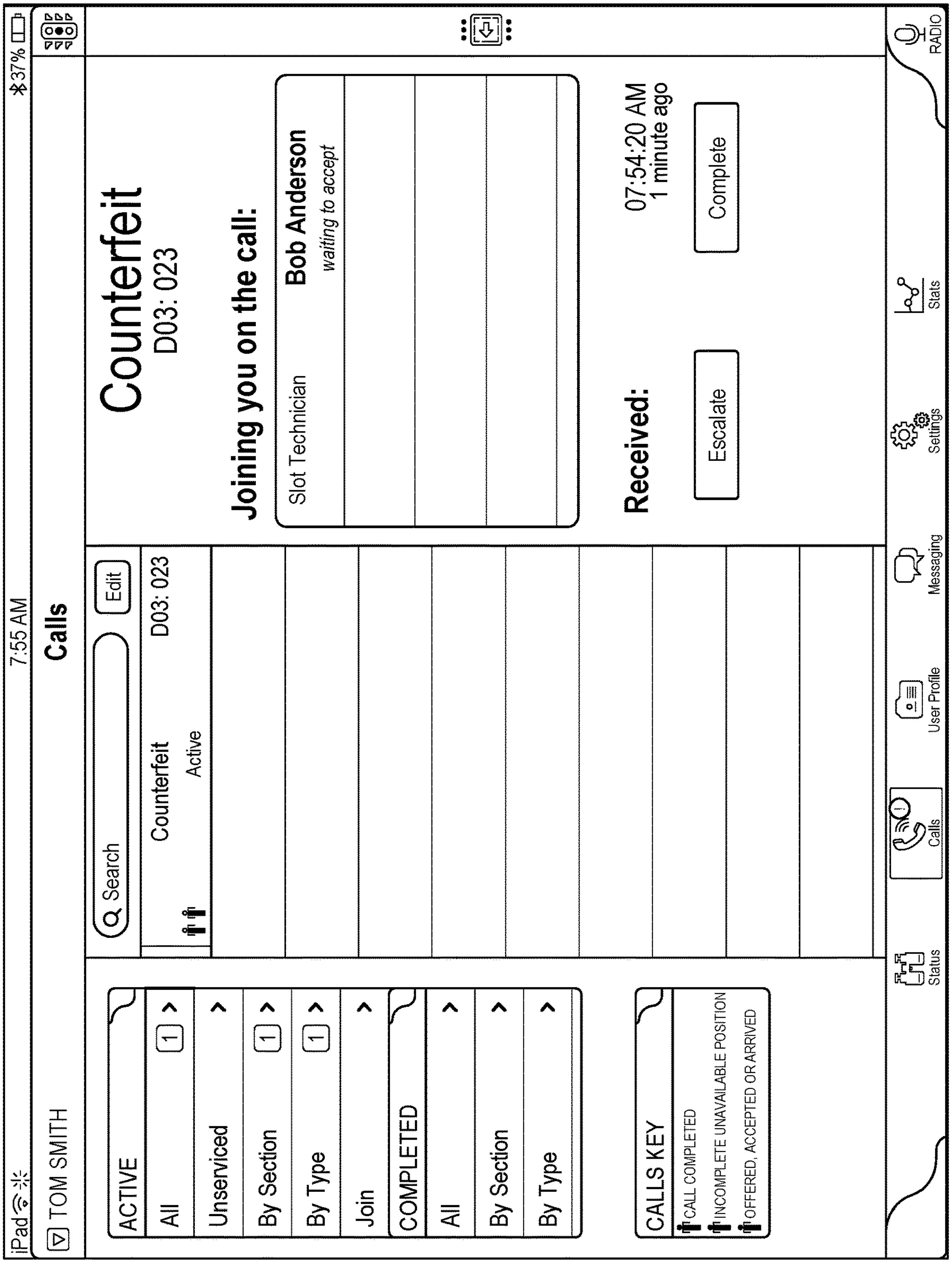
Figure 37:
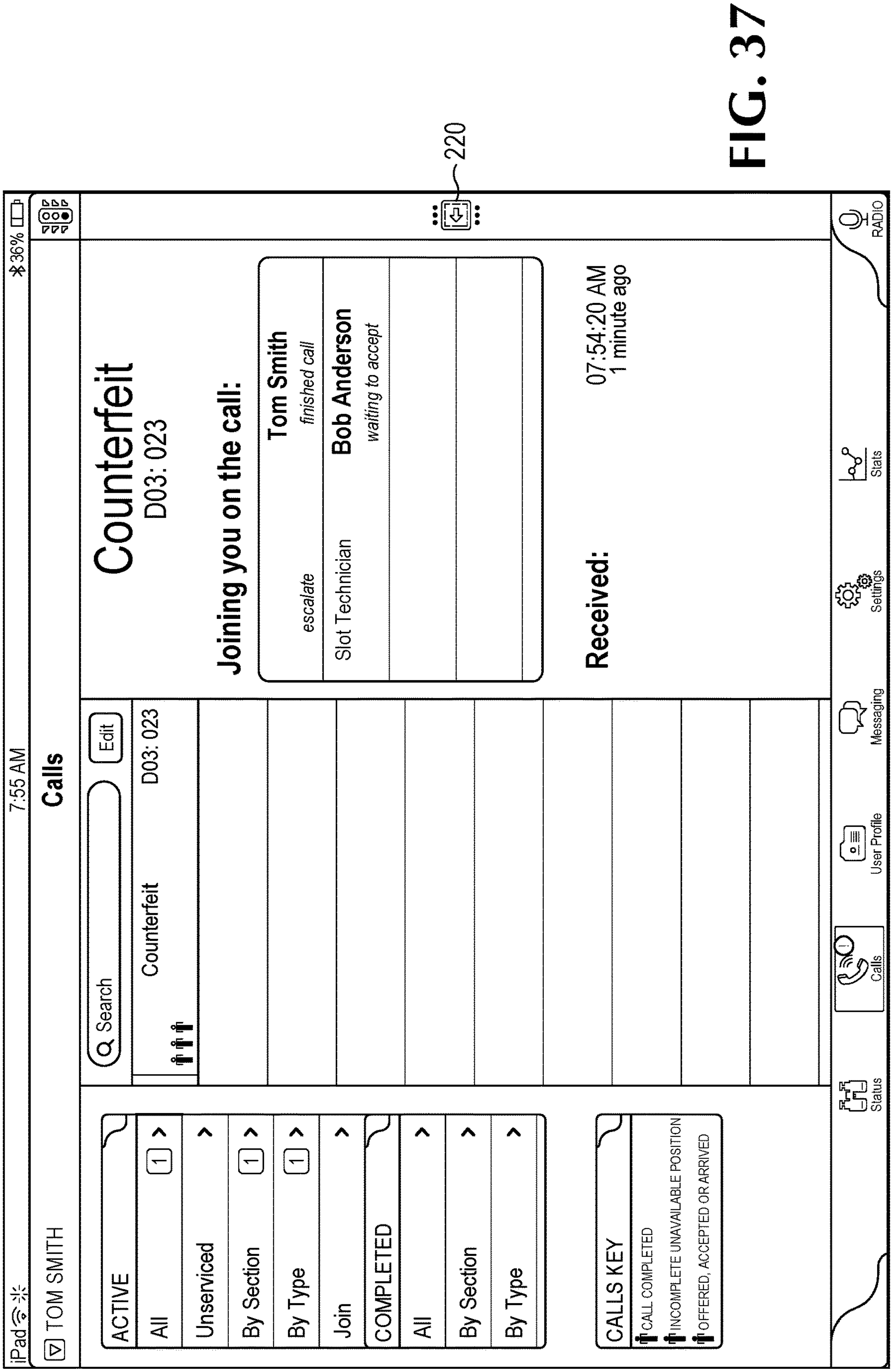

After the screen in FIG. 36 appears, the user of device 200, although initially selecting the Remain on Call button in FIG. 35 has determined that he or she has either done all that can be done, the role in which the user is serving cannot help, or there is another reason why the user should not remain on the call. So in FIG. 36, the user of device 200 depresses the Complete button, and the screen of FIG. 37 appears, indicating the call is still on offer to the Slot Technician, but that the user, Tom Smith, is no longer on the call.

Figure 38:
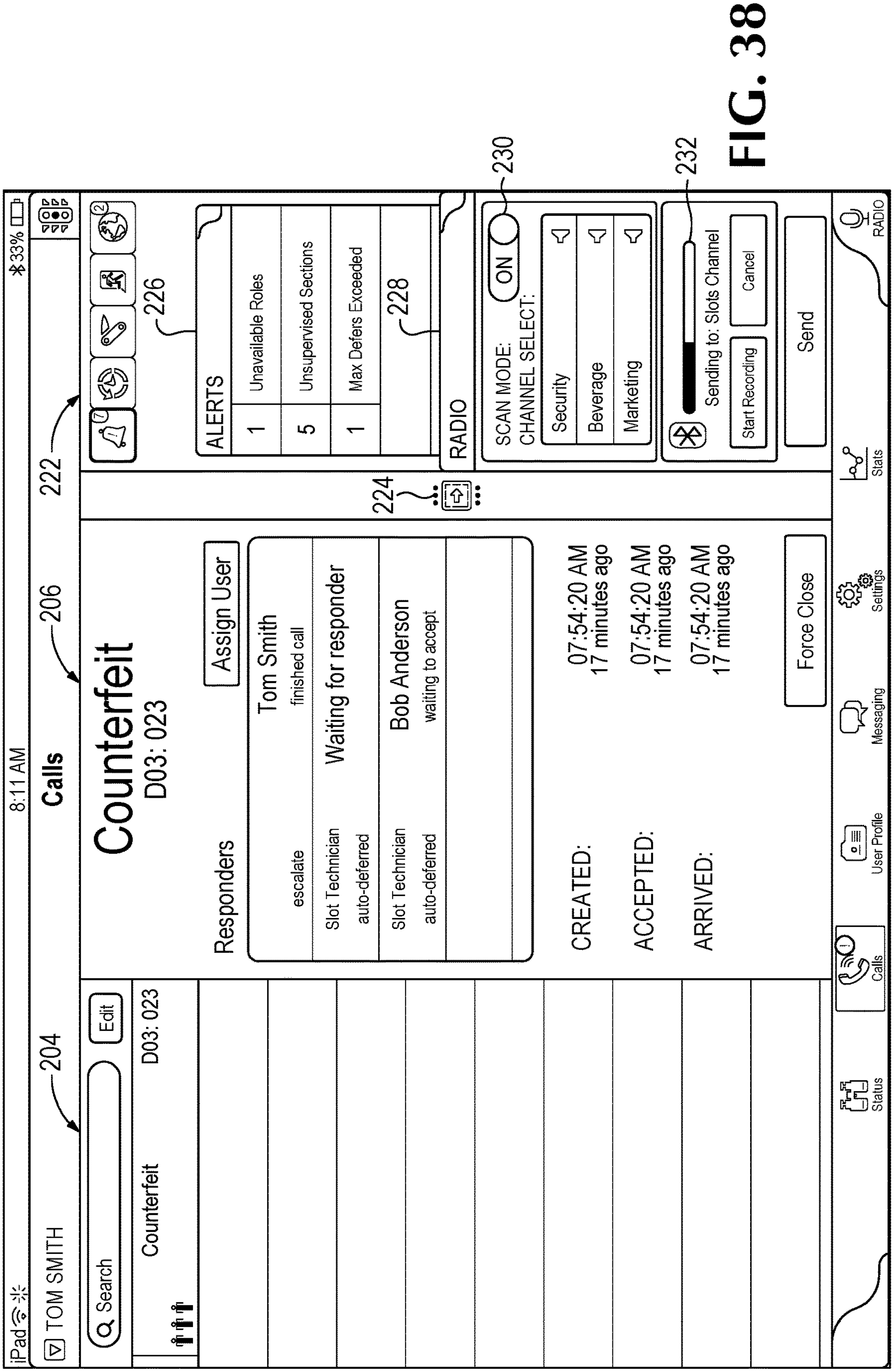

FIG. 38 illustrates further development of the Counterfeit call described in the previous figures and also indicates a modified view for the screen, which will now be described. Returning first briefly to FIG. 37, a left-facing arrow 220 when touched actuates a slide-out menu 222 to the position shown in FIG. 38. As can be seen, panel 202 disappears, panels 204, 206 shift to the left, and menu 222 appears in the former location of panel 206. In FIG. 38, left-facing arrow 220 is replaced with a right-facing arrow 224. When arrow 224 in FIG. 38 is touched, menu 222 disappears, and panels 202, 204, 206 return to the position shown in FIG. 37.

Menu 222 includes two portions, an upper Alerts panel 226 and a lower Radio panel 228. Radio panel may operate independently of menu 222. When panels 202, 204, 206 are in the position shown in FIG. 37 and the Radio icon at the right end of the navigation bar is touched, menu 222 moves to the position shown in FIG. 38. Each time the Radio icon is touched when the screen is as shown in FIG. 38, Radio panel 228 alternately appears and disappears. When it is not displayed, there is better visibility for the scrollable list on the Alerts panel 226, which will be described in more detail.

The controls in Radio panel 228 facilitate voice communication among all the current system users via their respective iPad or iPod touch devices. The Radio panel includes a Scan Mode switch 230, which is toggled on and off when it is touched. When on, a scrollable list of channels may be viewed, only three of which, Security, Beverage, and Marketing are visible in FIG. 38. When a user swipes the list vertically, the list scrolls to reveal three additional channels: Emergency, Auxiliary, and Security. When a user first logs in, the system automatically assigns him or her to the channel that corresponds to the role associated with the user. Each user is always assigned to one channel over which all users on the channel can both broadcast and hear voice messages. By selecting the Scan Mode, a user can scroll the channel list, touch a different channel, and switch to broadcasting and receiving over the new channel.

When a user of device 200 wishes to send a message over their current channel, he or she presses the Start Recording switch. After a short audible signal, the device begins recording a message spoken by the user, which can be a maximum of 12 seconds. The message is sent in one of two ways. First, the user can hit the send button as soon as the message is complete. Second, if the user has not hit the send button within 12 seconds after the message begins recording, the message is automatically sent. In addition, the message may be canceled at any time before sending by hitting the Cancel button. A recording bar 232 provides a visible indication of the 12-second maximum message recording time. It starts filling from left to right beginning with the start of message recording and ending at the end on the right just as the 12-second recording time elapses. The bar is part way between the beginning and ending of a message that is being recorded in FIG. 38. It indicates about 5 seconds of recording time has elapsed.

Each of the devices includes audio compression software that is helpful in two respects. First, the audio signal is digitized and compressed, thus reducing system bandwidth on the wireless network. Second, noise suppression is applied to remove the ambient casino noise that may be picked up by the device microphone when a voice message is recorded. Because the calls are recorded, they can be stored, either on the device or retrieved from the server, and then replayed on the device.

The microphone to used to record a user's verbal message is that built in to the device. And the speaker for replaying may be that built into the device—or the device may be paired with a Bluetooth earpiece and microphone, to enable hands-free use of the device.

When a message is sent, it goes first to the system server, which determines the current users on the channel to which the message should be sent. The server then sends the messages to all users on that channel. Next, an audible alert occurs at each device that is set to the channel of the message sender. Thereafter, the message plays. But if another message is currently being transmitted to or played on the channel, an audible alert informs the sender that the message was not sent and that he or she must create and send the message again. Alternatively, because the message is recorded at the device, it may be stored, either at the device or on the server, and thereafter sent in response to the user again touching the Send button. In a still further version, the server can stack all incoming messages in the order received and send them in sequence. In the present embodiment, each channel's message traffic is independent of the others. Put differently, messages may be sent and received on each channel as described without regard to traffic on other channels.

Figure 39:
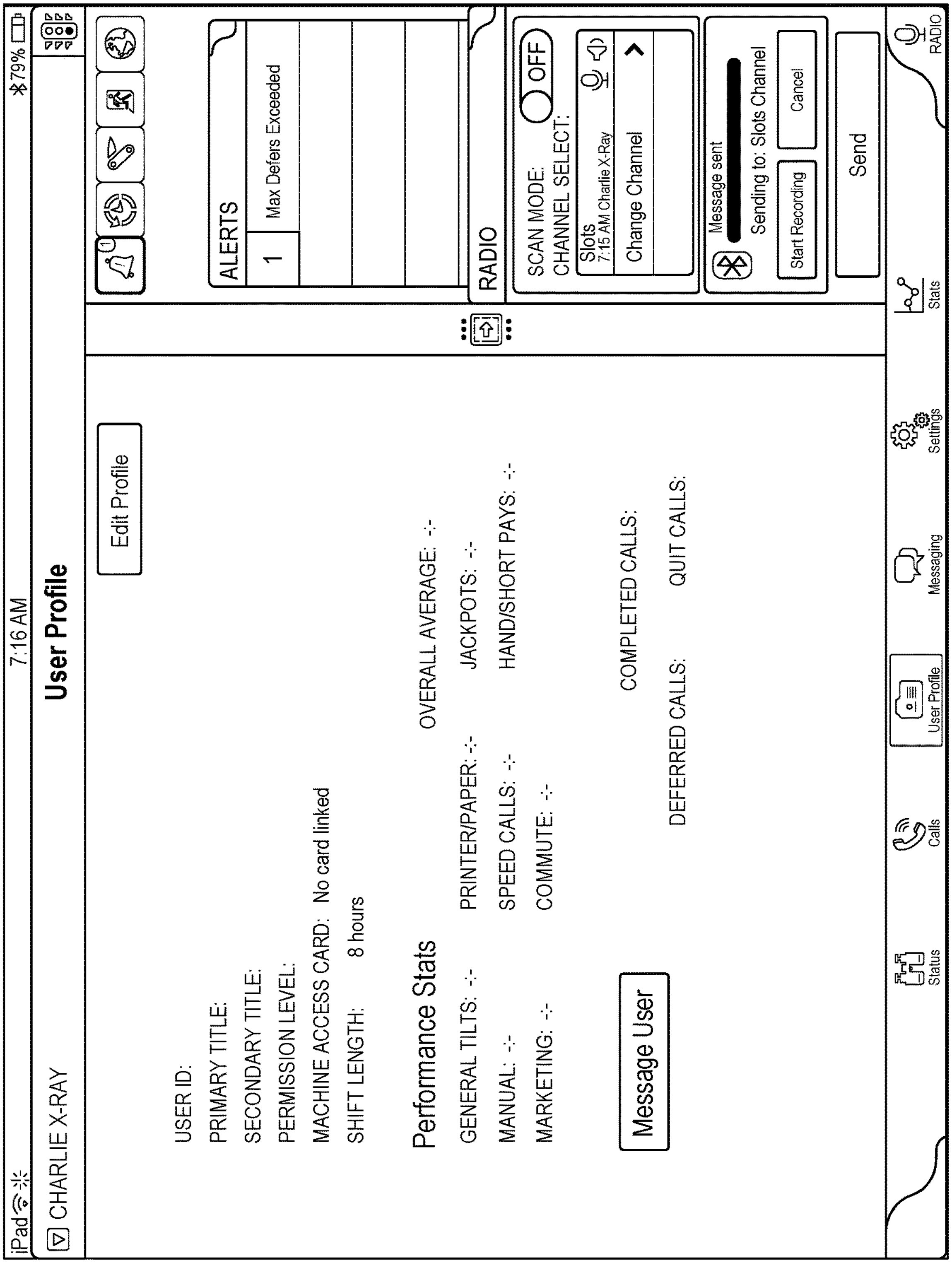

In FIG. 39, device 200 is shown while a message is playing. As can be seen, the sender's name, Charles X-Ray, and the time of the message are shown on the channel on which the message was sent in the channel list. In this case, the sender is also the user of device 200. The same notice of user name and time of message appears on all devices currently set on the channel on which the message is sent.

FIG. 39 also illustrates one of the screens that appears when the User Profile icon in the navigation is selected. It displays information fields that the system generates and displays to the user of device 200. By selecting the Edit Profile button, the user can change the information presented. The upper portion is primarily information that identifies the employee and includes a system-generated indication of whether he or she has linked a machine access card. The performance stats display the average times it takes the employee to complete different types of calls for this shift or for another time frame selected by the user. There are also totals for completed, deferred, and quit calls, which are also for the shift or for a different time frame.

Figure 40:
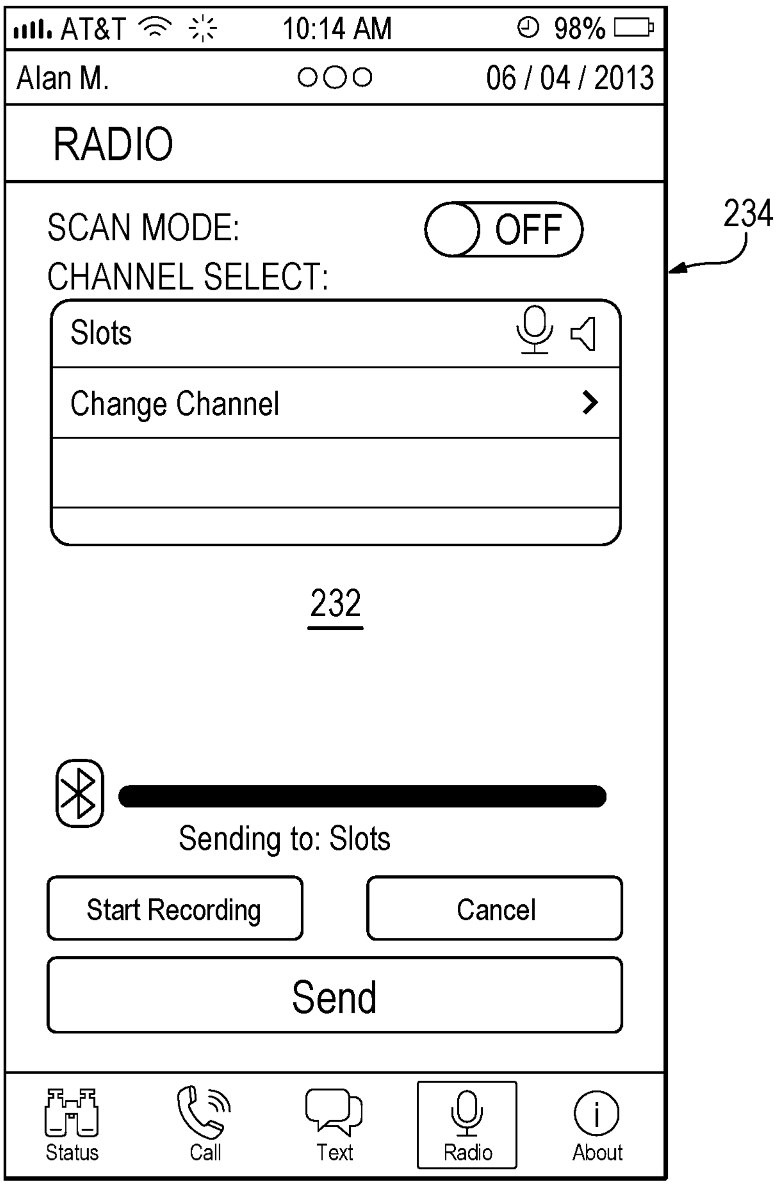
FIGS. 40, 54, 55, 57, 58, 60, and 61 are images of iPod touch screens upon which an embodiment is implemented.

Concluding now the description of the Radio feature, FIG. 40 is a view of a screen 232 of a device, indicated generally at 234, which is another embodiment of the invention. Device 234 is implemented on an iPod touch and operates with device 200 in a fashion similar to how the devices that display screens 118, 162 interact with the server and with one another. Like device 200, it includes a navigation bar, and also includes Status, Call, Text, Radio, and About icons in a navigation bar at the bottom of screen 232. When the Radio icon is touched, as shown in FIG. 40, the Radio screen appears. It includes the same controls as the Radio feature on device 200 and operates in essentially the same manner. It should be noted that in the views of FIGS. 39 and 40, Scan Mode is set to off. In FIG. 38, however, it is set to on. As discussed above, when it is on, the channel list is scrollable, which enables a user to change channels. In the views of FIGS. 39 and 40 each device is set to hear and receive messages on the slot channel. Changing the channel can be accomplished by using turning Scan Mode on or by touching the Change Channel entry, which presents a list of the channels from which the desired channel may be chosen.

One of the channels is the Emergency channel. Unlike the other channels, when a user broadcasts on this channel, all users who are logged in receive the message. The Auxiliary channel is available by subscription only. Users who are not subscribed on the system do not see the Auxiliary channel on the list of channels presented on their device screen. This provides a private channel for authorized users, typically higher-level supervisors, on which to communicate.

Implementing the radio feature in this manner provides several advantages. First, the messages may be stored, either on the devices or on the server, for later replay—by either the users or a supervisor of a user. In addition, because the messages are stored, a supervisor can create a message to one employee or to a group of employees in advance of its delivery. For example, a supervisor can create a message at the evening before a shift begins, and store it— either on the server or on is or her device. When the employee or employees to whom the message is directed logs in the next day, the radio message is delivered and heard by the employee.

Before moving on, a brief description will be provided of the functions served by the other icons on the navigation bar of device 234. The status screen (not shown) presents information to the user of device 234 indicating the section and role that is currently associated with the user, typically those selected when the user logged in. In addition, there is a break switch that presents the same 15-minute/30-minute option described above. This switch starts a break clock running for the user of the device. Finally, there is a logout button and an edit button, the latter permitting the device user to change his or her section or role. The Calls icon presents the screen on which service calls are offered to the user and which also indicates the current status of a call the user has been offered or is on. This feature will be described more fully with reference to additional drawings that detail call functionality. The Text icon presents a screen (not shown for this embodiment) of text conversations and is the screen from which a user sends and receives texts and reviews stored texts, essentially as previously described. Finally, the About icon can be used to present a screen (not shown) that presents system or device information, such as the version of the software operating the device, the site where the device is authorized to operate, etc. There are also buttons to Re-Link the Employee Card, in case the linking process described above needs to be repeated and a button to change the employee's PIN, which is used to log on.

Figure 41:
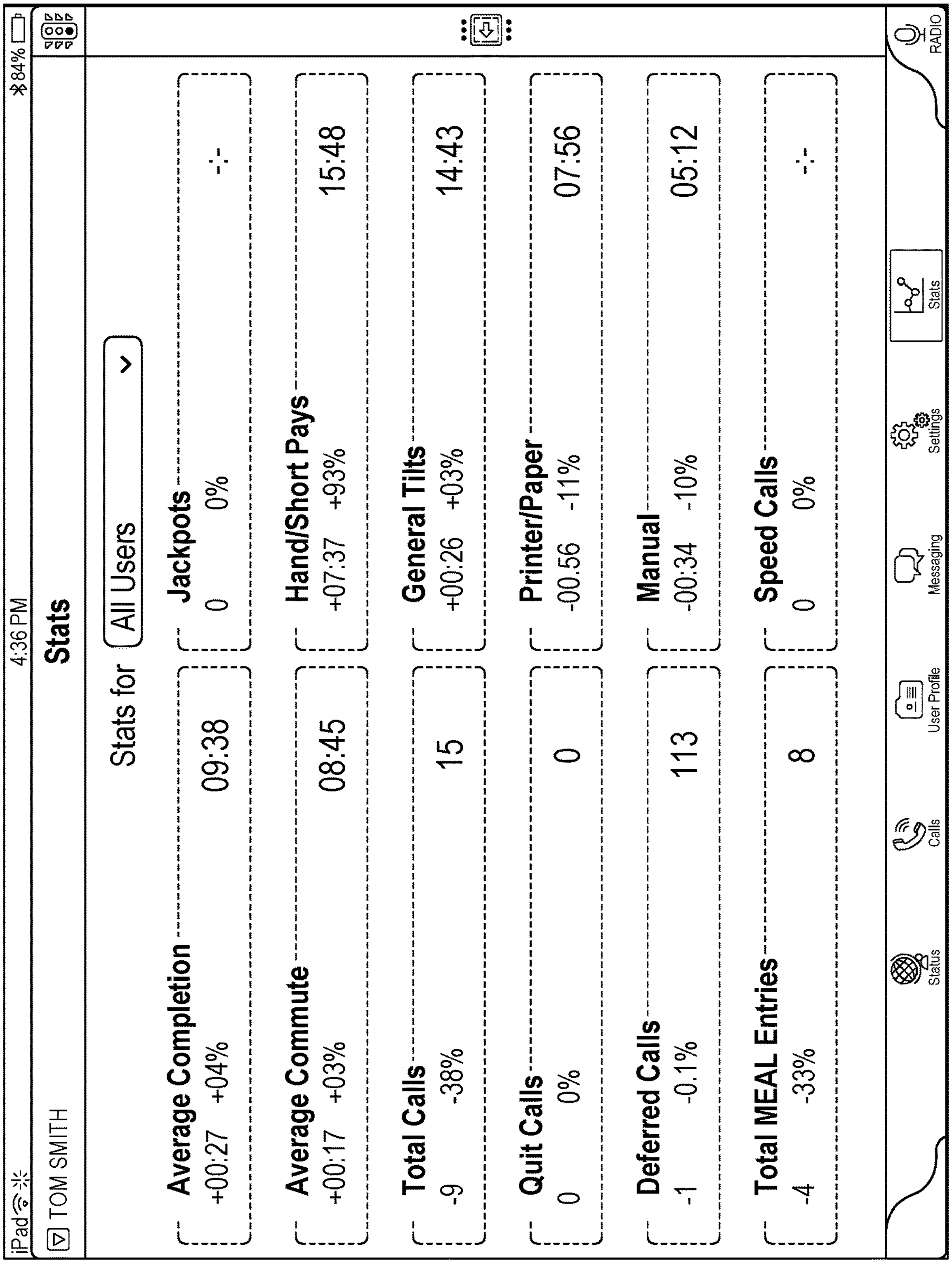

In FIG. 41, the Stats icon is selected on the navigation bar. The view in FIG. 41 shows the statistics for all users since the beginning of a current casino day, the time for which can be set in the system. They are categorized by event type because each type of event typically has a different expectation and goal for how much time is needed to resolve that event. The system automatically calculates average times by discarding outlying times, e.g., those under one minute and those over one hour, and then calculating an average event time for a predefined period, e.g. monthly, quarterly, annually, etc. These averages are automatically updated.

These averages may be used to set a goal time. For example, a current goal time for an event could be set to be 80% of the most recently calculated average for that event. Each event displayed in FIG. 41 shows, for each event, the average time to resolve the event for the current casino day thus far, the number of seconds over/under the most recently calculated average for that event, and the percentage over/under.

The average event time can also be used to expand the pool of responders. As will be recalled, if a primary responder does not accept a call within a first predefined time, the pool of responders is expanded to include secondary responders. If there is no response from the expanded pool within a second predefined time, the pool can again be expanded to include tertiary responders, and so forth. The time elapsed from the start of the event (and without acceptance) until the call is offered to a secondary responder could be 80% of goal time, and if the call is still not accepted, by one of the primary or secondary responders, within 100% of goal time, the call is now also offered to the tertiary responders.

These averages and goal times may also be used for the color coding, previously described, which visually indicates whether a call is currently being handled within time (green), approaching its goal time (yellow), or overtime (red).

In the view of FIG. 41, a drop-down menu at the top is used to select which statistics are shown. It is currently on all users, but the employees are also listed by name in the drop-down menu. As a result, the statistics by employee can also be displayed in the same manner.

Figure 42:
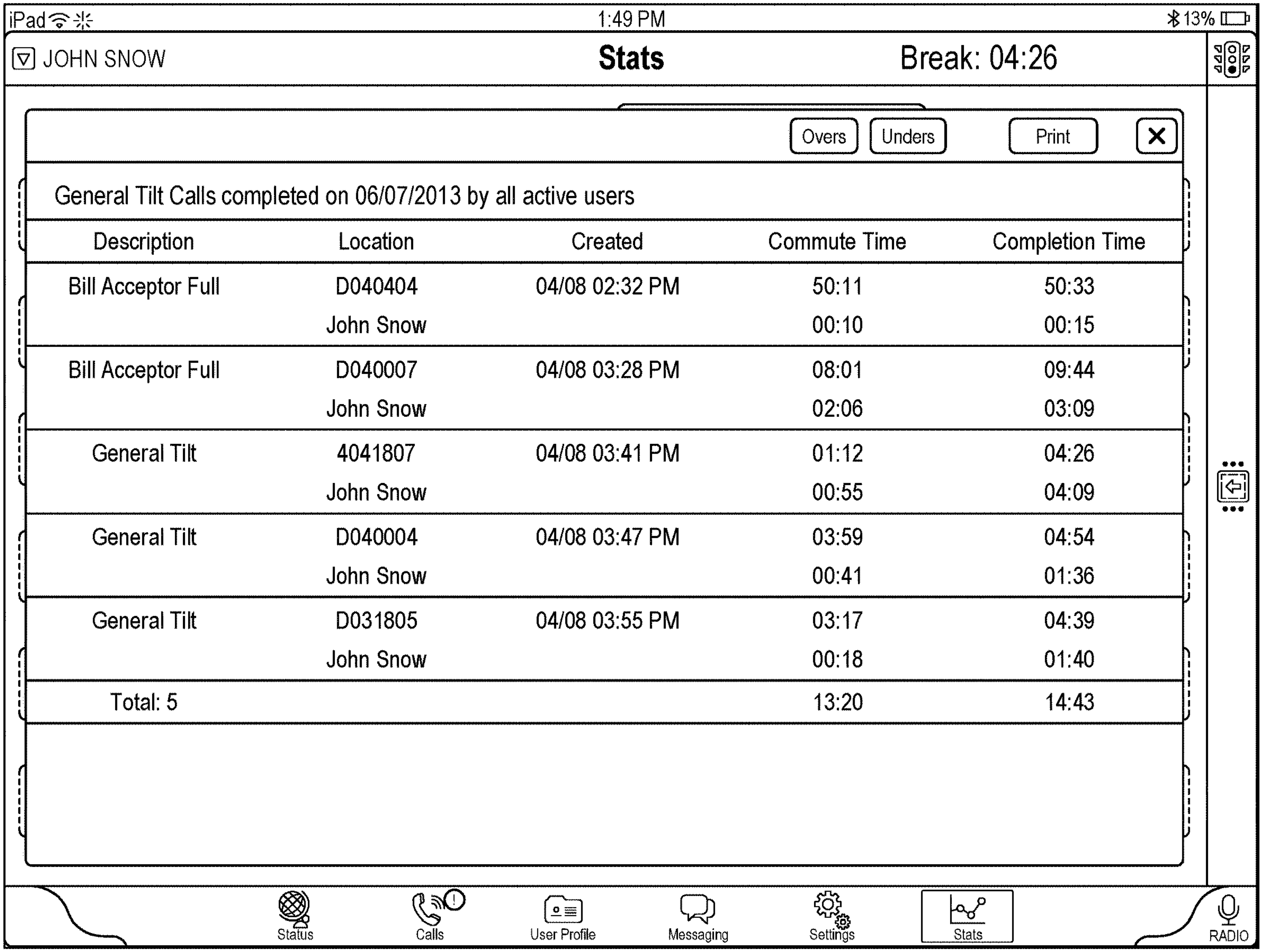

In FIG. 42, the user has touched the screen in FIG. 41 on the General Tilts statistics. This creates a pop-up screen shown in FIG. 42 of all of the General Tilt calls thus far in the current day. The user can again touch one of the calls to see all of the detail (not illustrated) associated with the call. Hitting the print button in the upper right corner prints the currently active screen.

Figure 43:
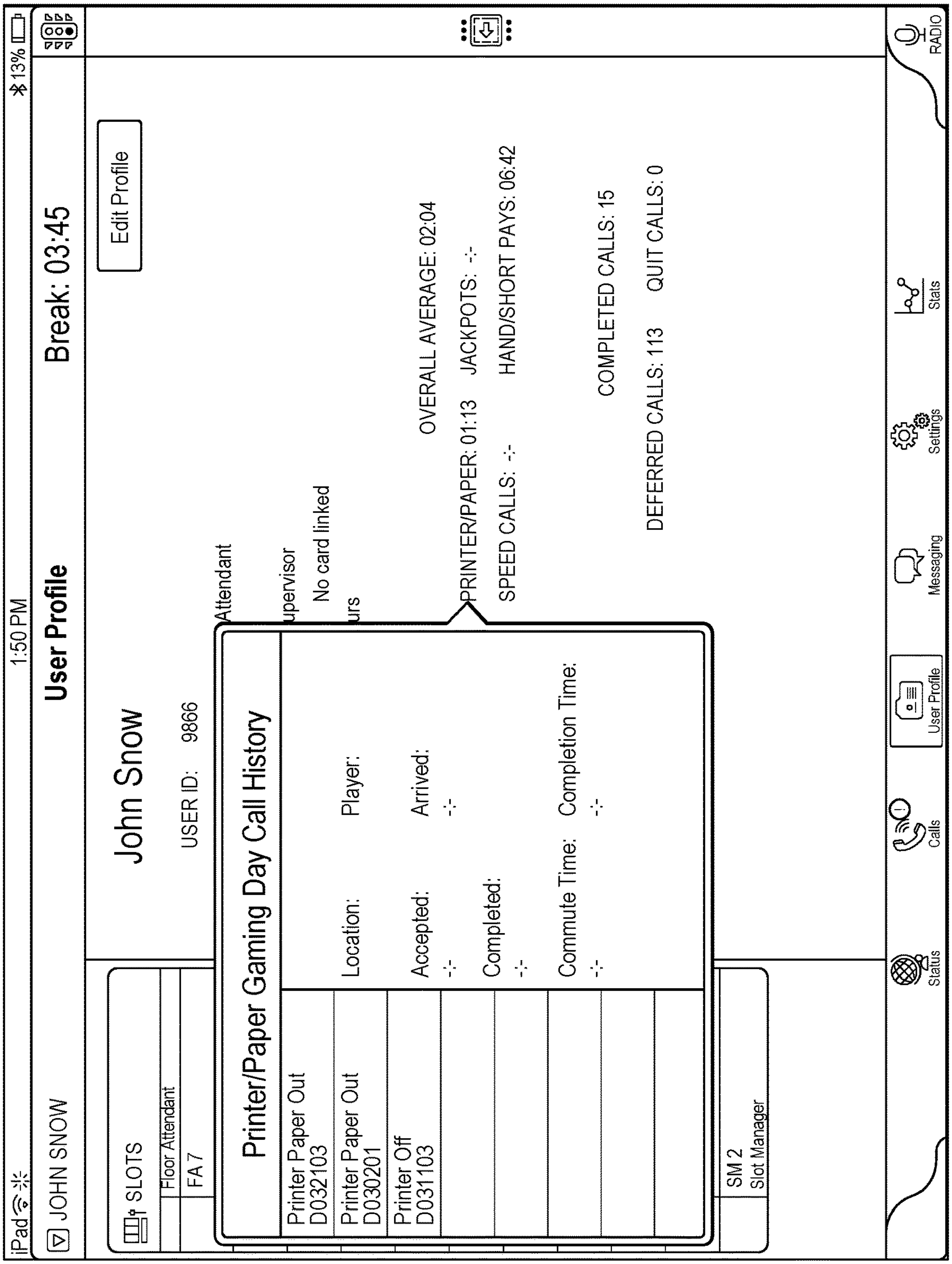

FIG. 43 illustrates another way to access statistics by employee. FIG. 43 shows a view of a screen when the User Profile icon is depressed, which was described in connection with FIG. 39. When one of the categories of calls is touched on screen 39, an expanded list of all of the calls for that category appears. In FIG. 43, the user has touched the Printer/Paper label, thereby producing the pop-up panel in FIG. 43 listing all of the Printer/Paper Gaming Day Call History events for John Snow. Each of the three events in the list on the left of the pop-up panel may be touched to produce the detail on the right of the panel. As a result of using the features on the User Profile screen or the Stats screen, rapid analysis and display of detail for any event or employee may be quickly located and determined.

Figure 44:
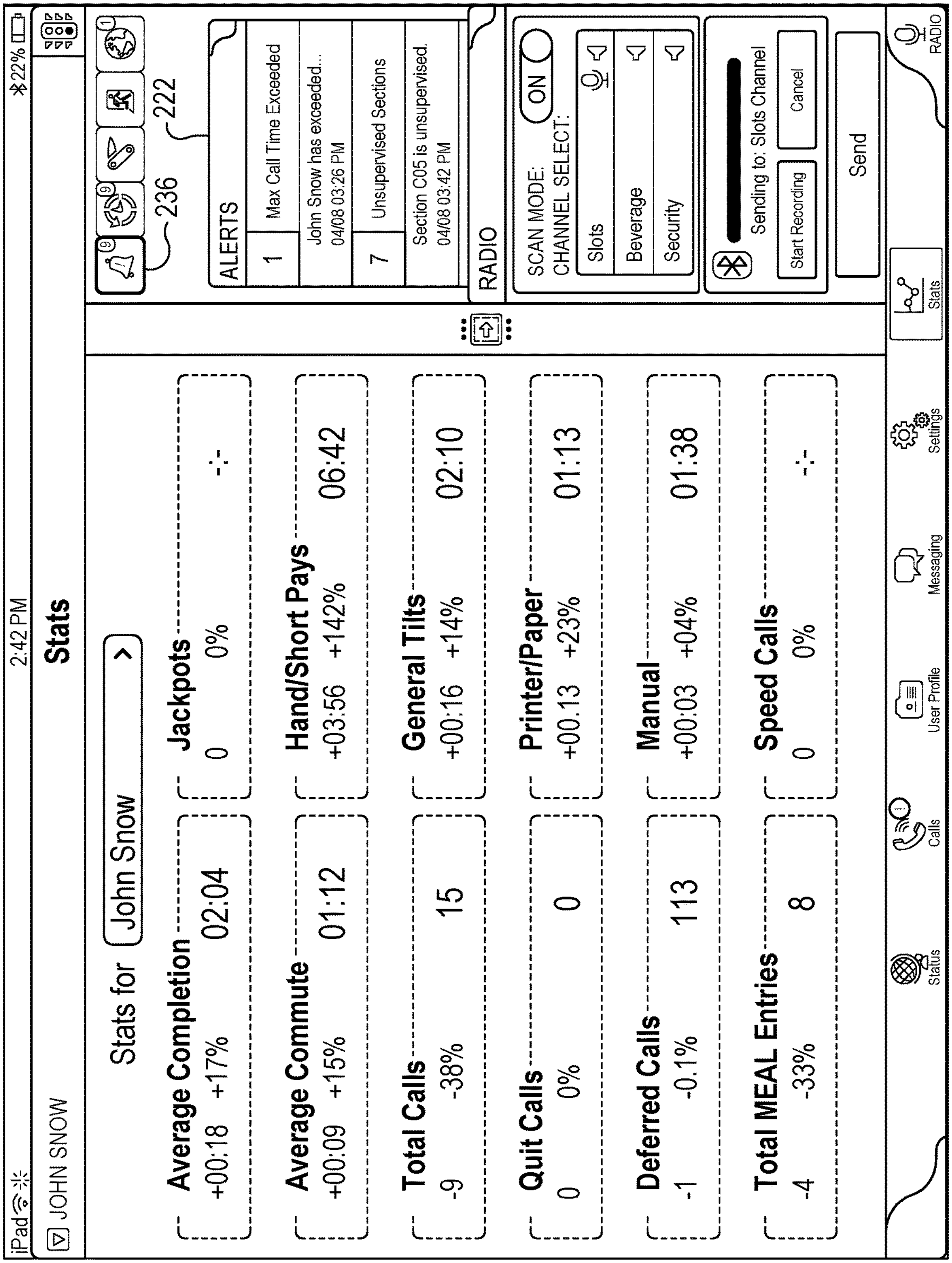

In FIG. 44, slide-out menu 222 is displayed. It includes 5 icons at the top, the first being a system alert icon 236. When it is selected as shown, a scrollable alerts list appears on the menu. It includes several categories, two of which are visible, namely Max Call Time Exceeded and Unsupervised sections. An additional category (not visible) is Illegal Machine Entry. The number on the left side of each label is the number of alerts currently in that category. When each category label is touched, the category expands, as shown in FIG. 44, to list each item that makes up the category. When the label is touched again, only the category label is shown along with the number of events.

When a maximum call time is exceeded, the alert appears in the Alerts list, and the supervisor may choose to act by texting or otherwise contacting the responder, by assigning another responder (as described above), or by taking some other action. The supervisor may also choose to assign or shift users to an unsupervised section. And of course an illegal machine entry requires immediate attention. Machine entry is addressed in detail later on. Briefly, an illegal machine entry alert is generated by the system when a machine door sensor, each of which is monitored on the network and by the system, indicates a door opened, and one of the following is true: a) no current user is linked to machine access card that is inserted into the card slot; b) there is no call at the machine; c) no entry reason was generated (by the system) or provided (by the responder); or d) the employee is on a call but at a different machine.

Figure 45:
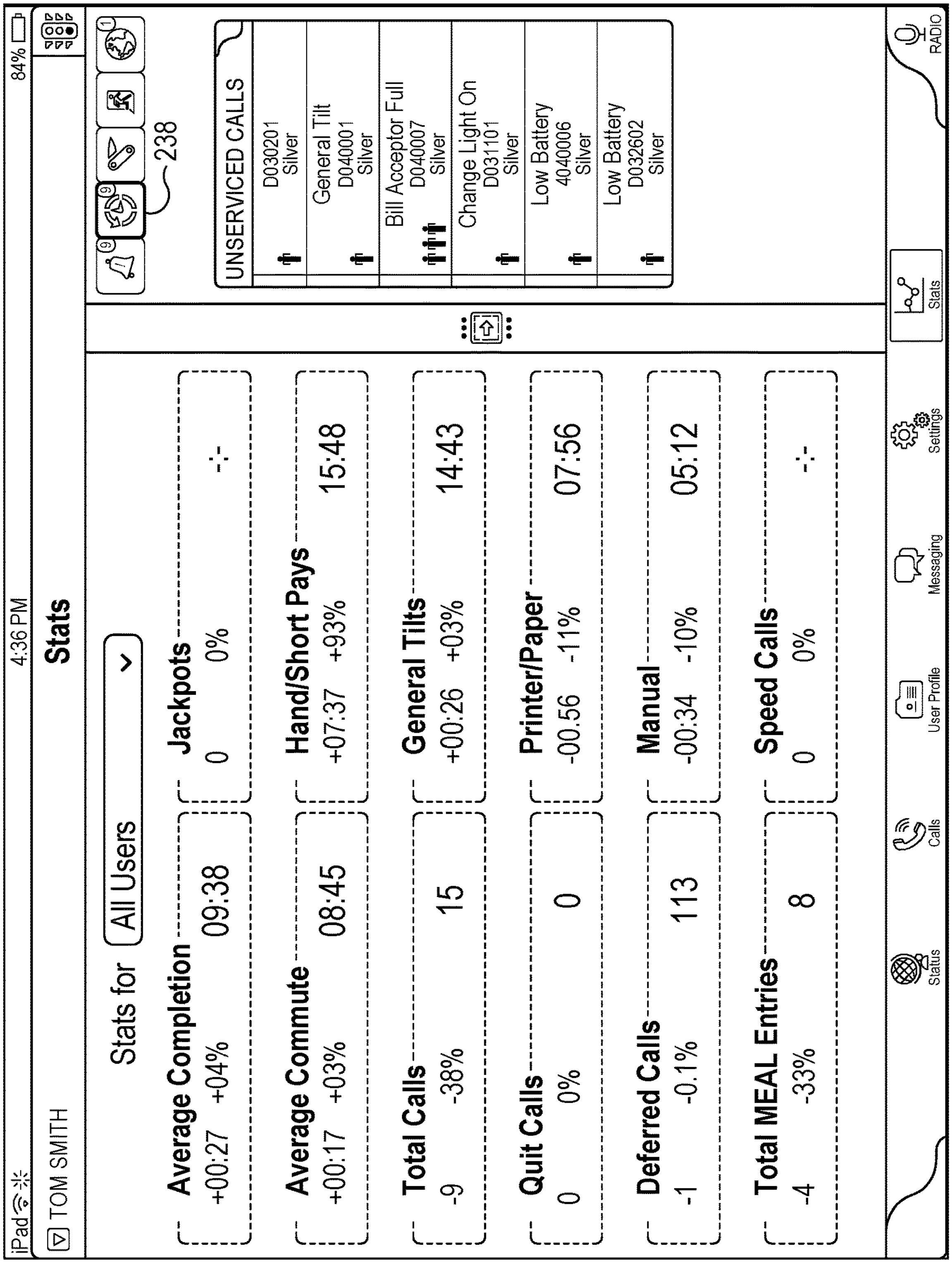

In FIG. 45, an Unserviced Calls icon 238 is selected, which lists all of the unserviced calls in the slide-out menu. As with other lists, touching one of the calls reveals the call detail in a panel positioned like panel 206 in FIG. 38. Thus a supervisor may quickly see how many calls there are, determine a rough status for each, via the colored stripe to the left of each call, and quickly review the detail on any of the calls.

Figure 46:
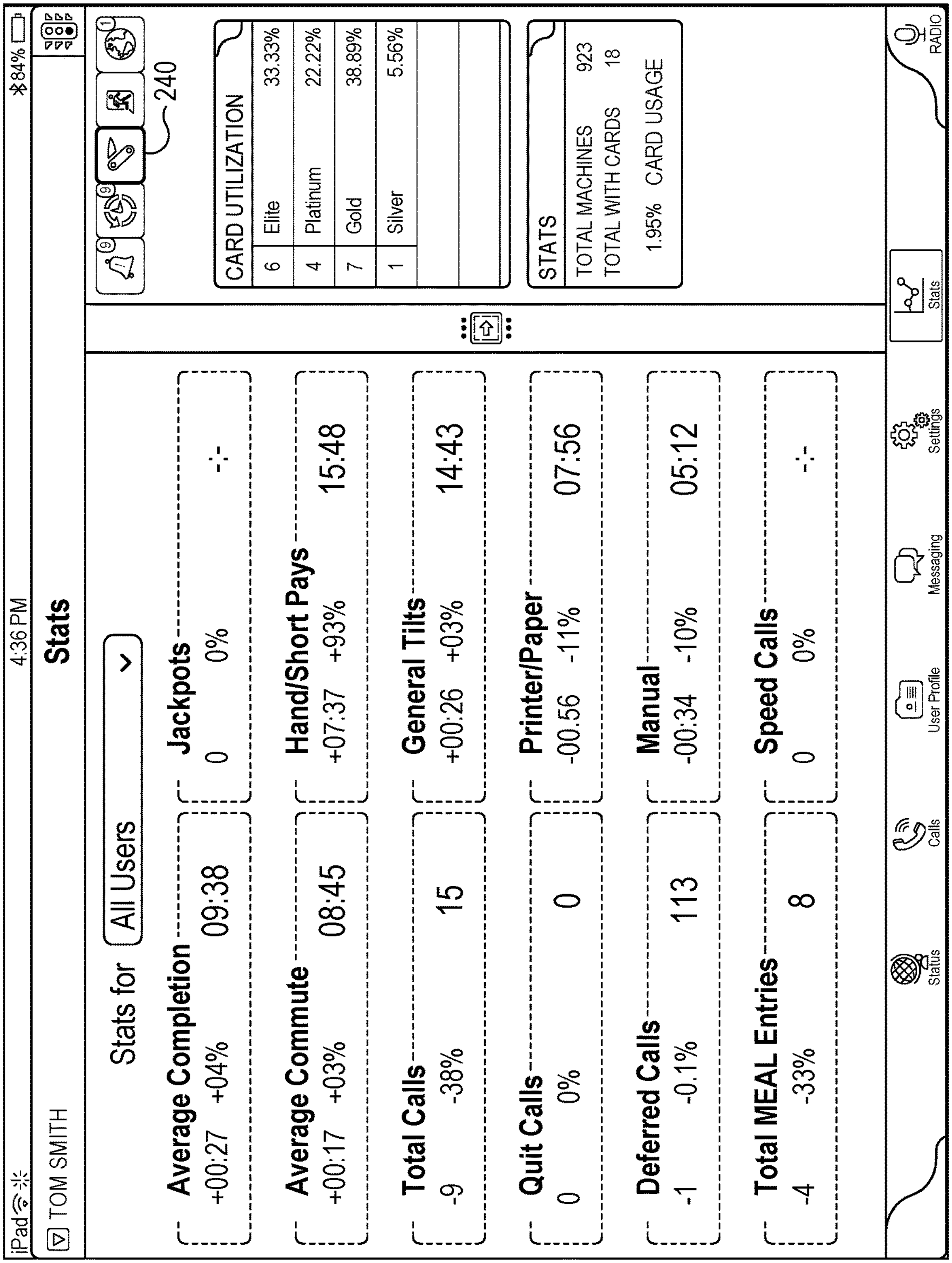
Figure 47:
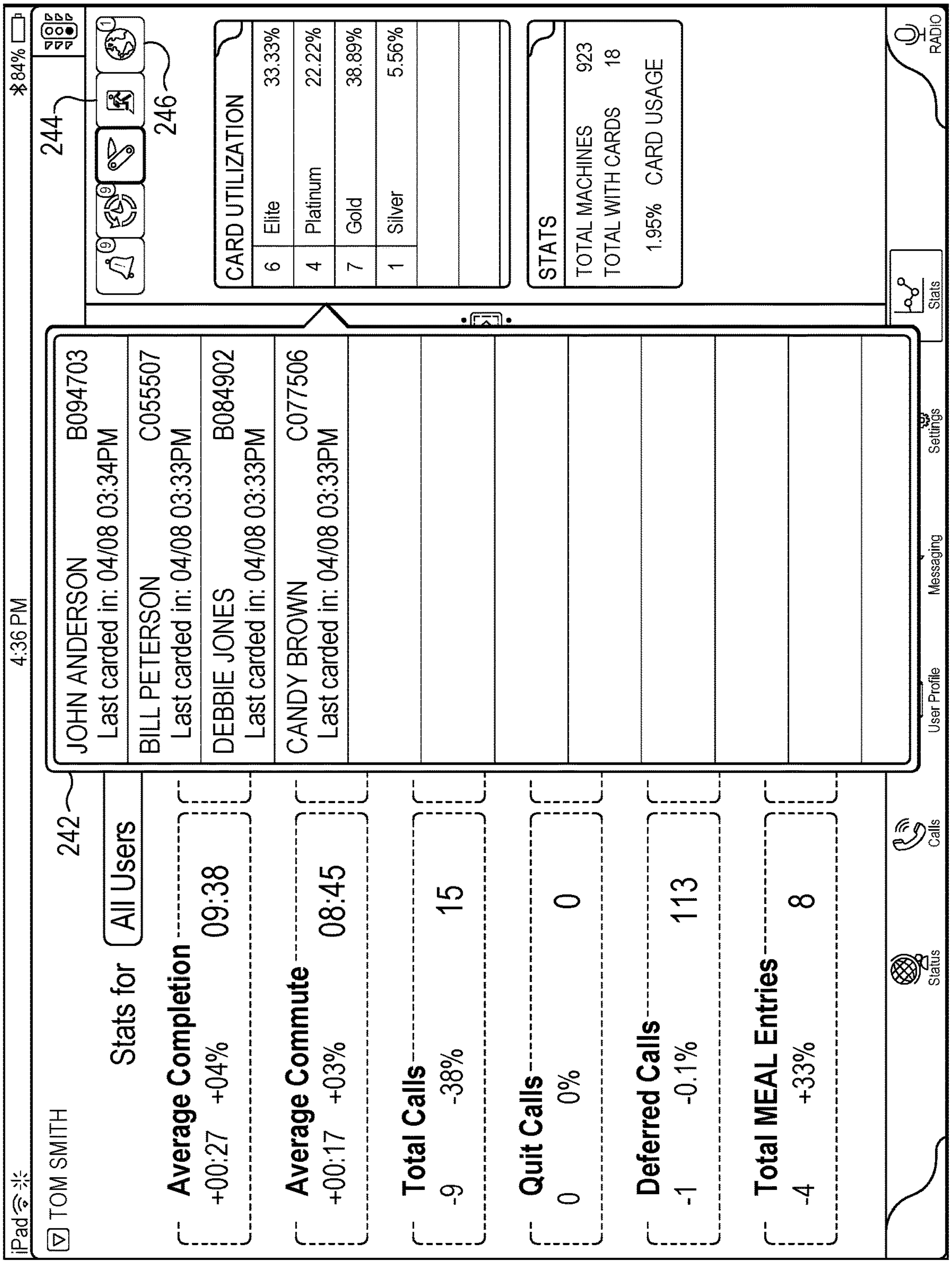

In FIG. 46, a Card Utilization icon 240 is selected. Doing so lists all of the categories of players in the player tracking system and indicates of all those currently carded in and playing, the percentage of each category. When one of the categories is touched a pop-up panel 242 in FIG. 47 creates a scrollable list of each player in that category and the machine at which he or she is playing. This facilitates marketing efforts, including providing appropriate complementary amenities, such as beverages, to an identified player.

Although exemplary lists are not shown for either, icon 244 generates a scrollable early out list, i.e., those employees who would like to leave early, if possible, and icon 246 displays a scrollable list of all current users who are associated with more than one section on the gaming floor.

Next, FIGS. 48-52 illustrate use of the system to locate machines or players to assist with players' club and other marketing functions. Most casinos want to make personal connections with players, especially those who wager large amounts as well as regulars. It is desirable to be able to greet, locate, and advise such players about game and machine locations and to do so in a way that results in the player experiencing a personal connection with casino personnel.

Figure 48:
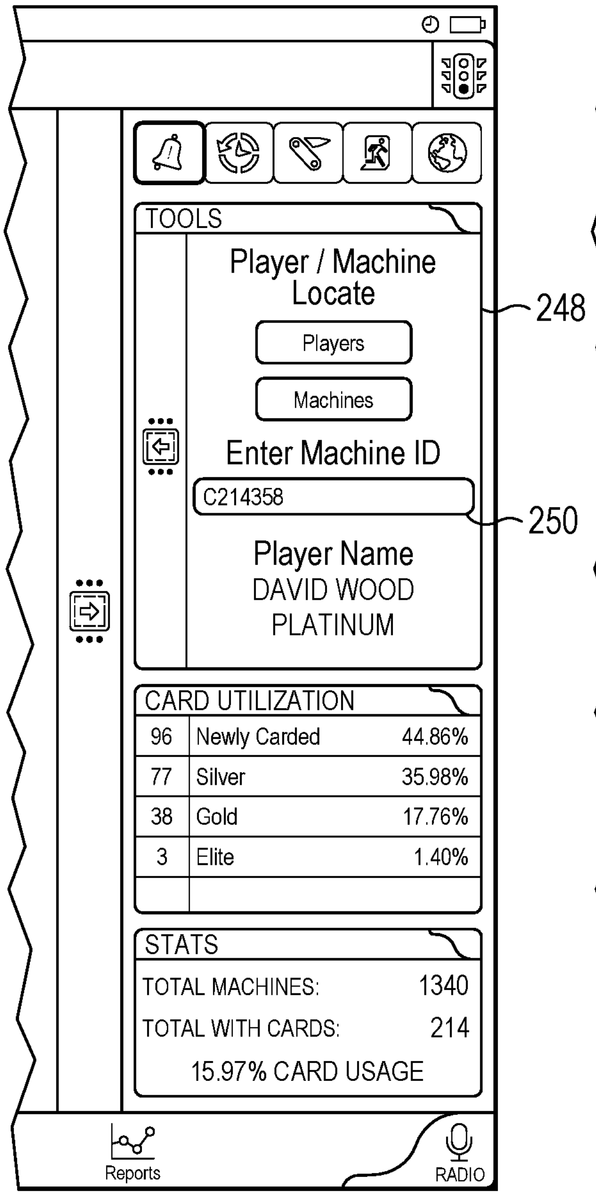
Figure 49:
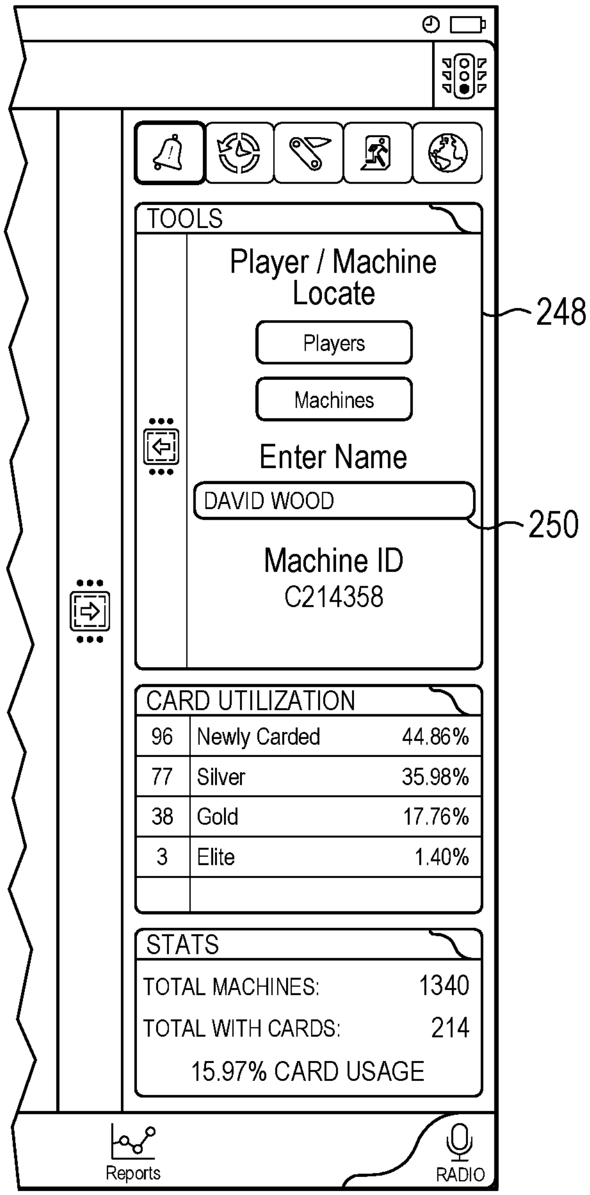

FIGS. 48 and 49 illustrate screens that can be used to a) identify the name associated with a card inserted at a particular machine orb) use the player's name to locate a particular machine into which the card associated with the player is inserted. In the embodiment of FIG. 48, a Tools panel 248 includes a Players button and a Machines button. In FIG. 48, the Players button is depressed, which brings up the Enter Machine ID message above a text entry field 250. A players' club representative, or any other person equipped with one of the devices, can see a player at one of the machines, enter the machine number (using the touch screen keyboard, not shown), and have the player's name and player's club status returned in Tools panel 248 in the space beneath text field 250 when the user hits Enter on the keyboard. If the player is not carded in, a message so indicating appears on panel 248. If there is no player or an un-carded player, the message so indicates.

Conversely, looking now at FIG. 49, when the Machines button on panel 248 is depressed, the phrase "Enter Name" appears above text field 250. As the user begins typing a player's name, a search program suggests names by displaying them in a list that drops down from text field 250 (not shown). Each of the suggested names is from the list of current carded players. A user can at any time select one of the suggested names or simply continue typing using the touch screen keyboard (not shown) until the name appears in full in field 250. When the user hits Enter on the keyboard, the identity of the machine (Machine ID) having that player's card in the associated card reader appears beneath text field 250, as shown in FIG. 49. This enables a user to locate the gaming device at which the carded player is playing. If there is no player carded in with that name, the system returns a message to that effect on panel 248. And if two carded players happen to have the same name, both names are presented along with each player's birthday, which is stored in the player tracking record. Knowing the ages of both players may help a user confirm which player is at the machine.

Figure 50:
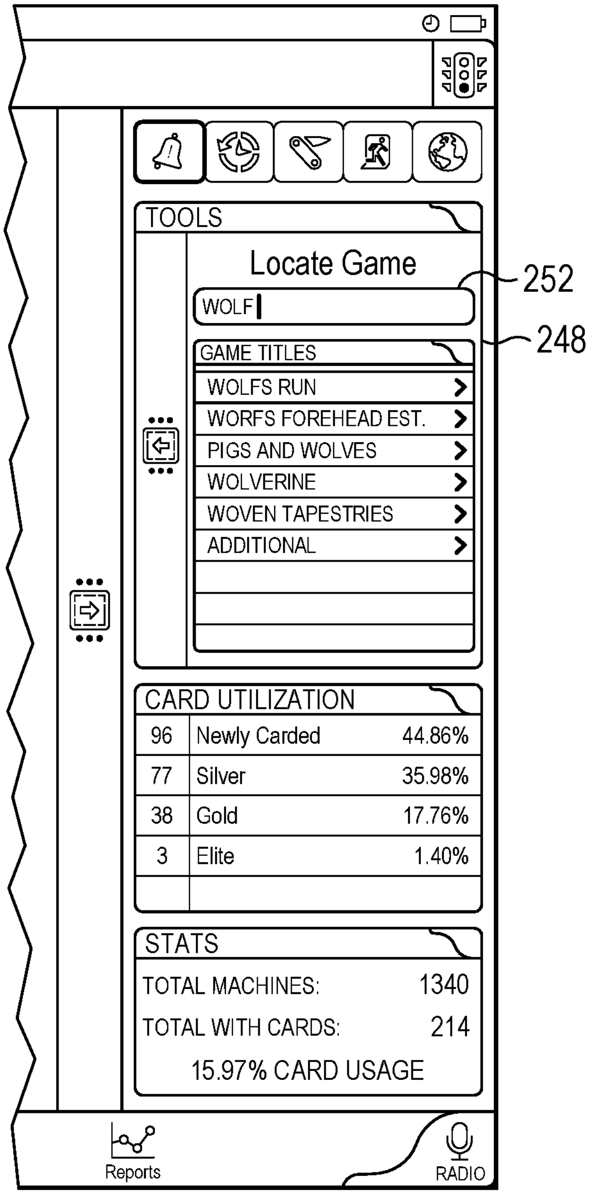
Figure 51:
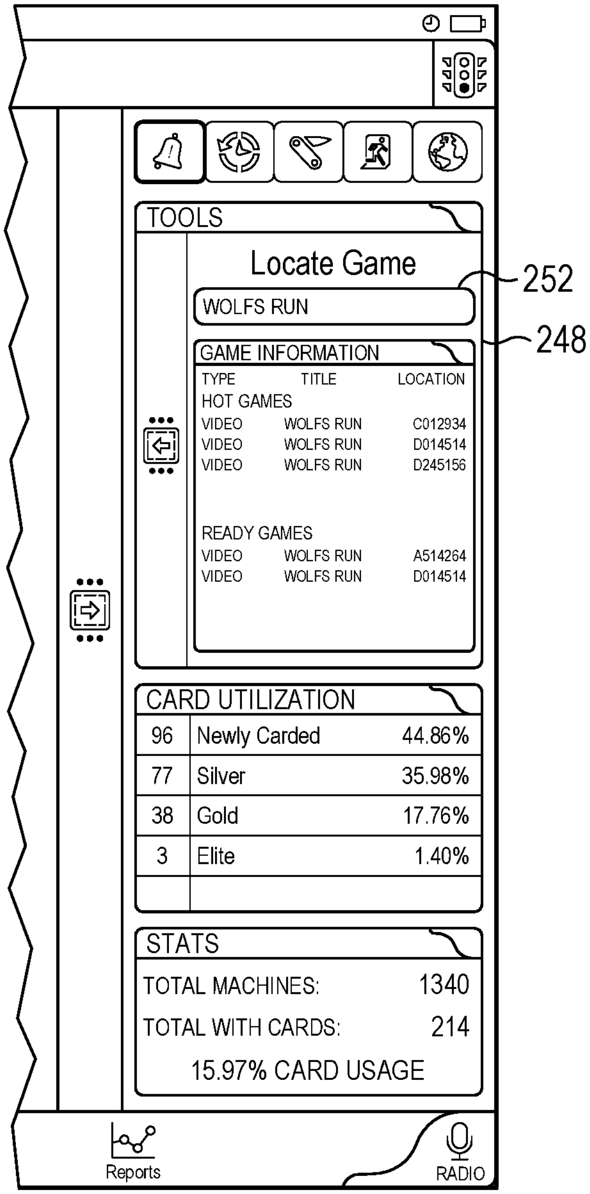

FIG. 50, in another embodiment, depicts a Locate Game feature in Tools panel 248. Game names can be entered into a text field 252 via the keyboard (not shown). As the name is spelled possible matches appear in a list below the text field. Once the name is fully entered, or selected from the list of possible matches, game information is displayed as shown in FIG. 51. This enables any user on the floor to respond to a player's query concerning the location of a certain game title or to direct a player to a game that the device user thinks will be one that the player will appreciate.

Note that in in FIG. 51, the Game Information panel beneath text field 252 lists the games in two categories: Hot Games and Ready Games. As is known in the art, gaming machines can be set to average a set percent of all wagers to be returned to players in the form of awards. Of course, each play of the game generates a random outcome, but if the game is designed and functioning properly, over time the average return will approach the set payback. A payback of 92% is fairly typical. But because each play is random, games can have short streaks in which they pay back more or less than the set payback. A game that is paying back more over a short time is referred to as a hot game; a game paying back less is referred to as a ready game. Some players are superstitious and have a preference for one game or the other—a hot one under the belief that it will continue to pay or a ready one because the player believes it is due to pay. This feature is described more fully in applicant's '355 application.

Figure 52:
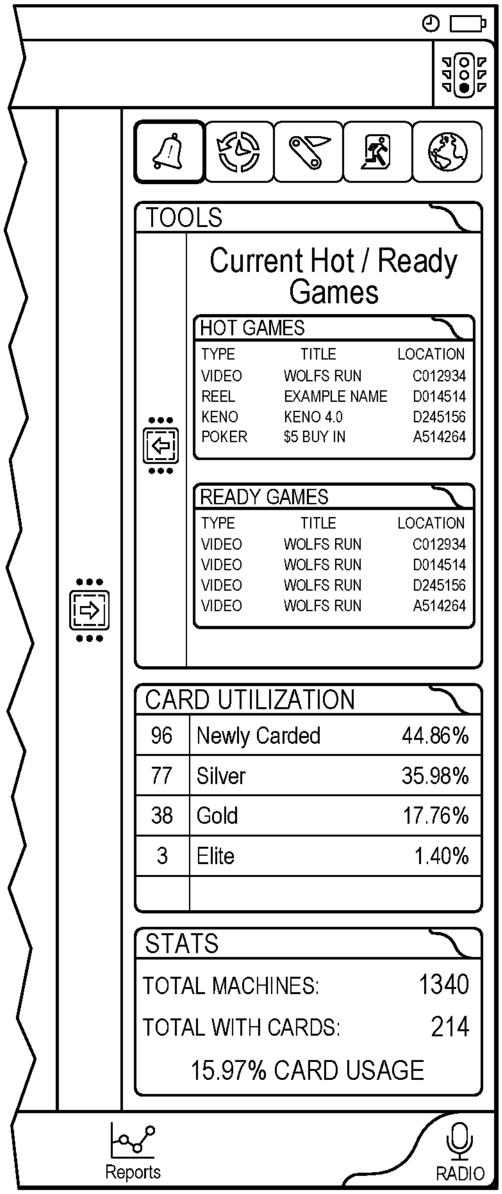

FIG. 52 discloses a screen in still another embodiment that simply lists hot games and ready games. This permits a user to quickly provide a player on the floor with information about hot or ready games and the location of each.

Figure 53:
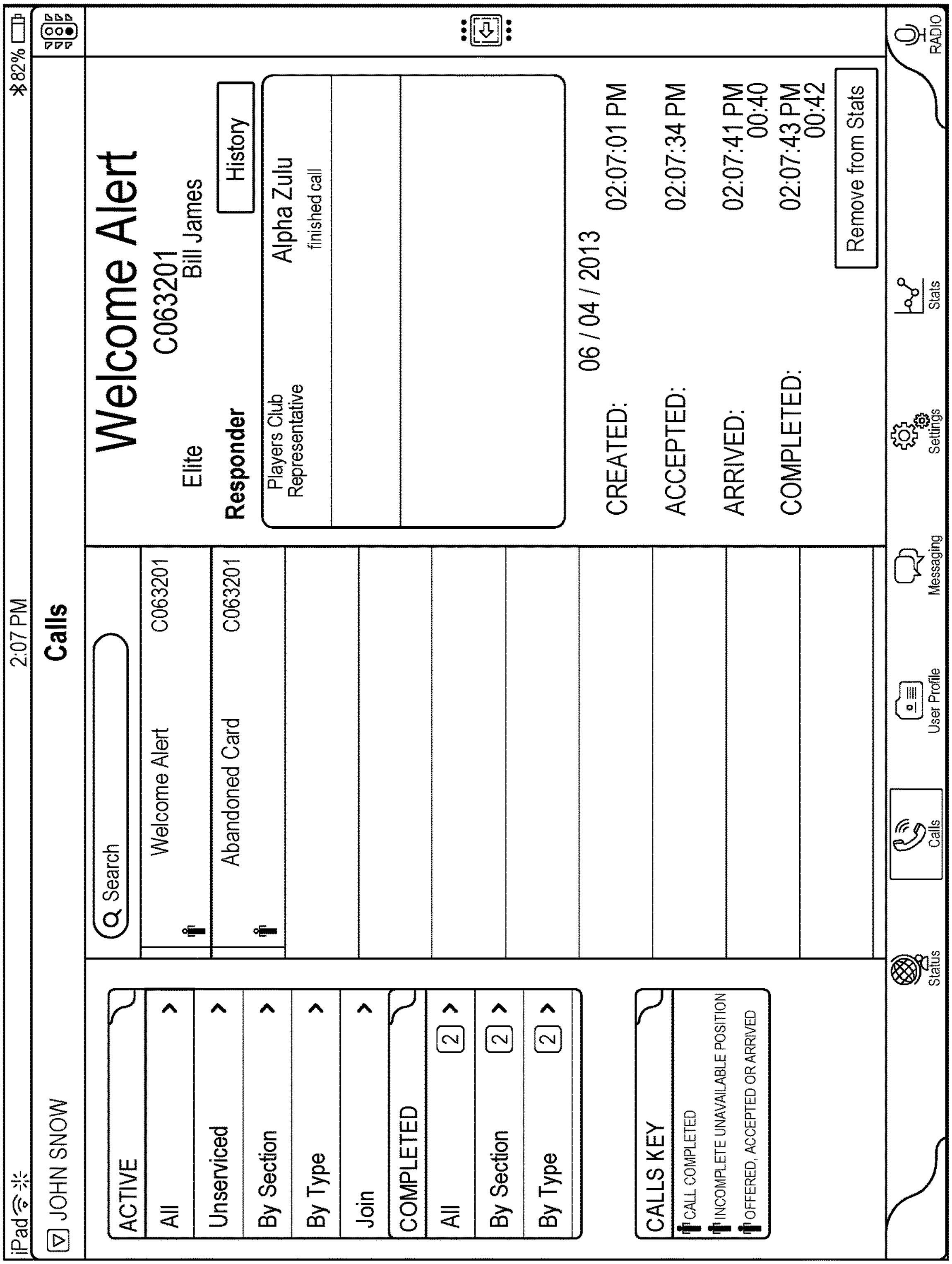

Next, FIGS. 53-63 illustrate further use of the system to assist device users in establishing personal connections with players or to otherwise enhance the level of service that is offered. First, considering FIGS. 53-55, a Welcome alert is generated by the system and included in the list of calls displayed on the screen of device 200 as shown in FIG. 53. This alert is generated when a pre-identified member (or member of a pre-identified group of players) of the players' club inserts his or her card into a card reader for the first time on the current day. For example, all members of a particular tier in the player's club could be set to generate such an alert. In FIG. 53, player Bill James, who is in the Elite tier of the player's club, carded in for the first time on Jun. 4, 2013. Like all other events, the time—and lapsed time from event start—that the event was created, accepted, and completed, along with the arrival time of the responder are displayed on this screen (and on the associated user profile and statistics screens) and stored in the system.

Figure 54:
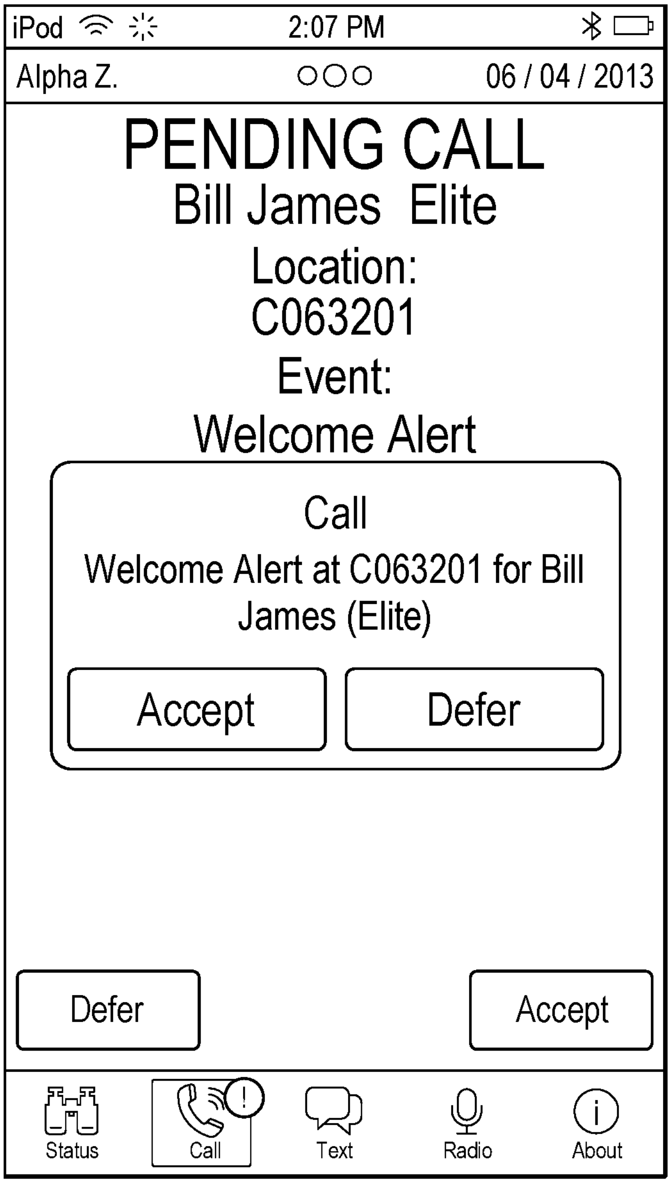

FIG. 54 shows the screen of an iPod touch to which the Welcome Alert in FIG. 53 has been offered Like other events, a pop-up panel indicates offers the call by displaying the type of call, machine location, and player name and status, with an invitation to accept or defer the call. A Pending Call screen appears behind the pop-up panel, also identifying the nature of the call along with the pertinent information.

Figure 55:
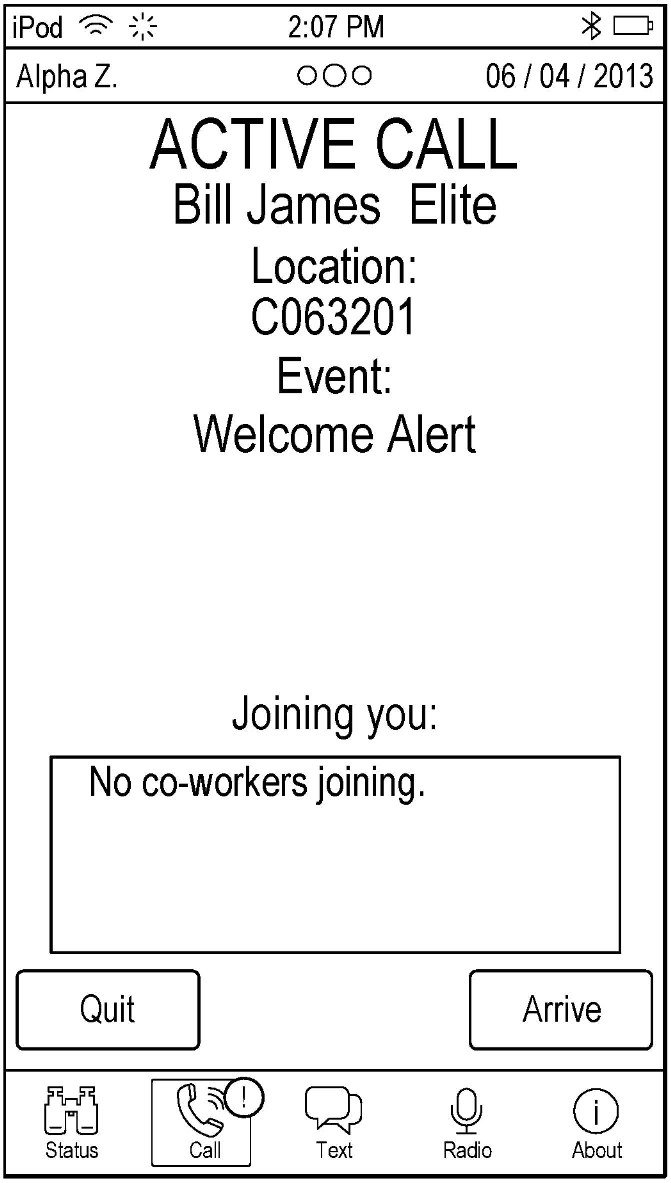

FIG. 55 depicts the screen after the device user hits the Accept button in FIG. 54. From there, the call proceeds in the usual fashion with the user being able to quit, arrive, escalate, etc. the call as previously described for other types of calls. This feature permits a responder to locate and greet the identified player when he or she first begins playing for the day—an important way to make a valued player feel valued and welcome.

Figure 56:
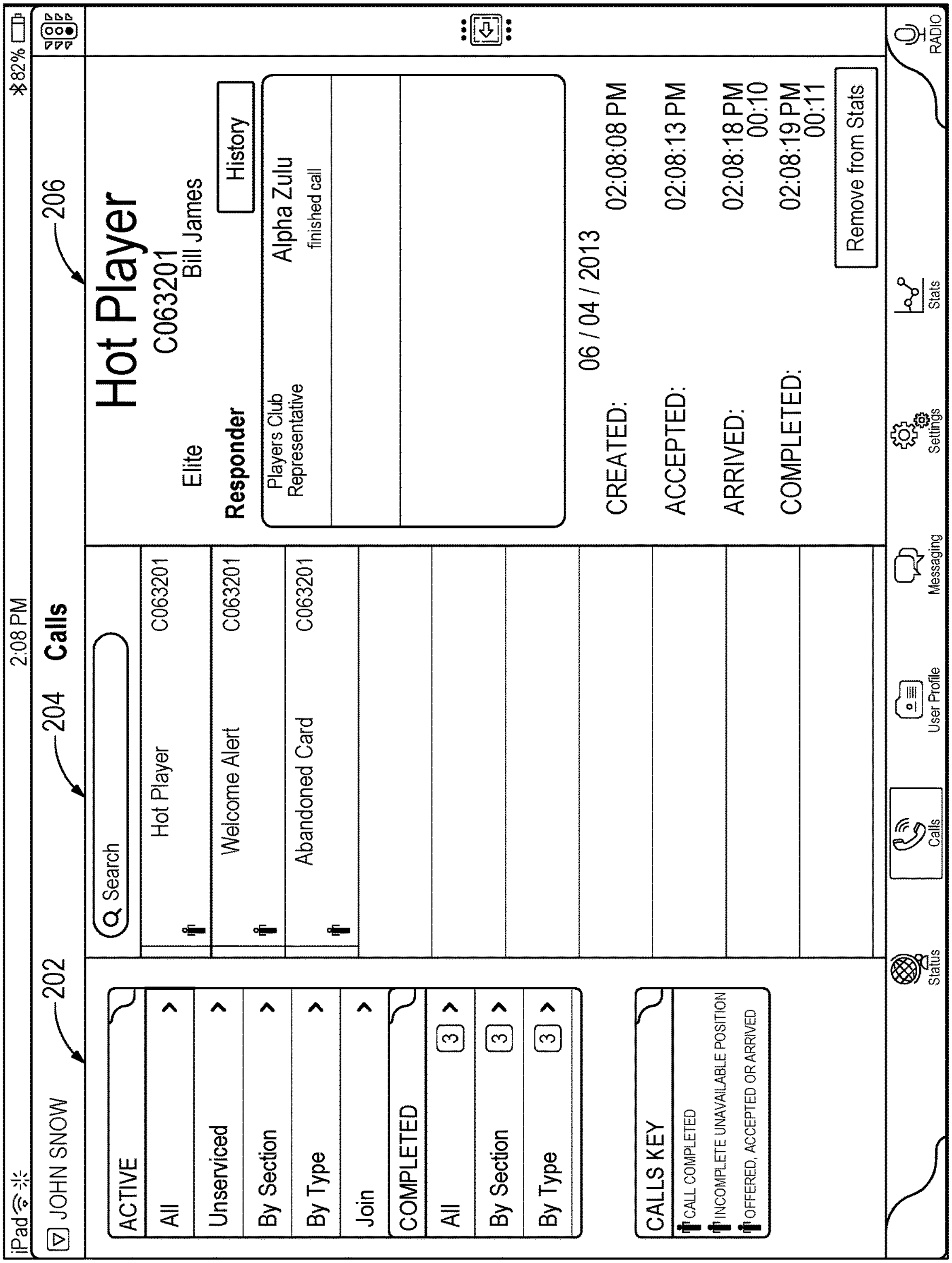
Figure 57:
Figure 58:
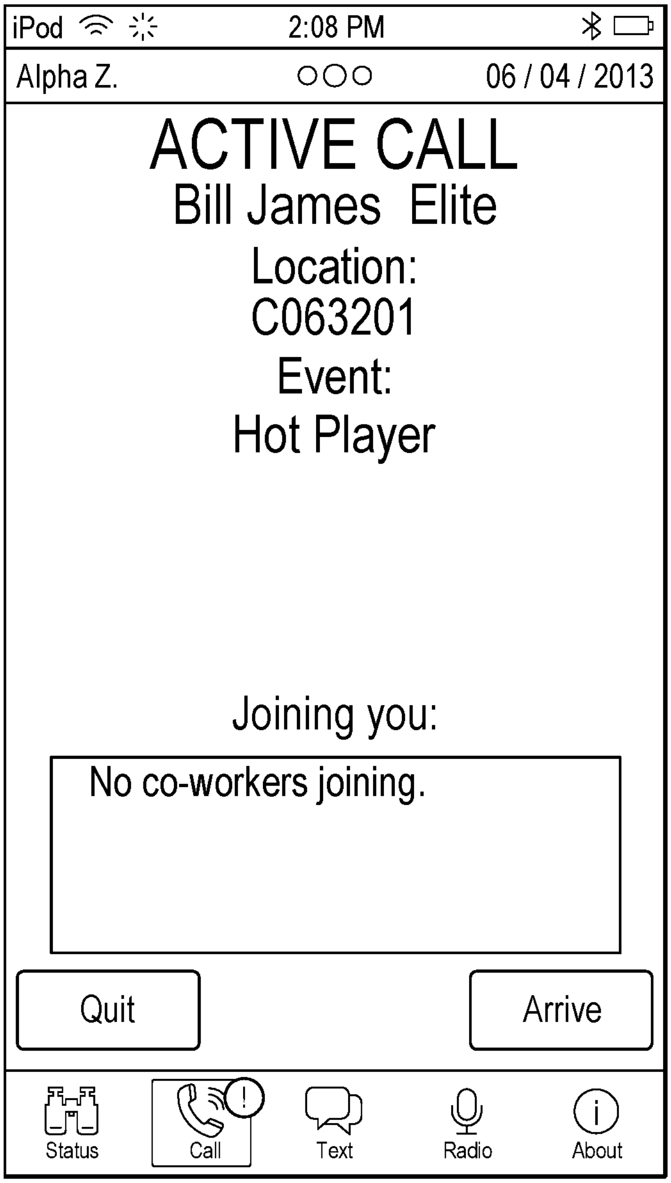

Turning now to FIGS. 56-58, a Hot Player event is displayed on the screen of device 200 in the usual fashion. This event was generated in response to any player, whether or not the player is enrolled in the player's club and whether or not a card is inserted, who wagers a predefined amount as detected and collected by the slot-machine network, which monitors the meters on each slot machine, including the bet and jackpot meters. The wagering could be above a certain level within a predefined period of time (e.g., over $2500 within 10 minutes), it could be a single wager above a predefined amount, or both. This can be set and changed in the system. When the Hot Player event is generated, the player's machine location, which is known in the system, is displayed in panel 206. In this case, the hot player is a carded player so his name appears as well. If the player were un-carded, only the machine location would appear.

FIG. 57 shows the panel that permits the user to whom the Hot Player event was offered to accept or defer. Like previously described calls, the Pending Call information appears behind the pop-up panel that offers the call. When the accept button is pressed in FIG. 57, the screen then appears as in FIG. 58. The responder then goes to the location of the hot machine, presses the arrive button in FIG. 58, greets the player, and in general makes him or her feel appreciated, with or without complementary amenities. And if the player is not carded, the responder can assist with enrolling the player into the player's club. At the end of the interaction, the user depresses the complete button (not shown in these views) to conclude the call.

Figure 59:
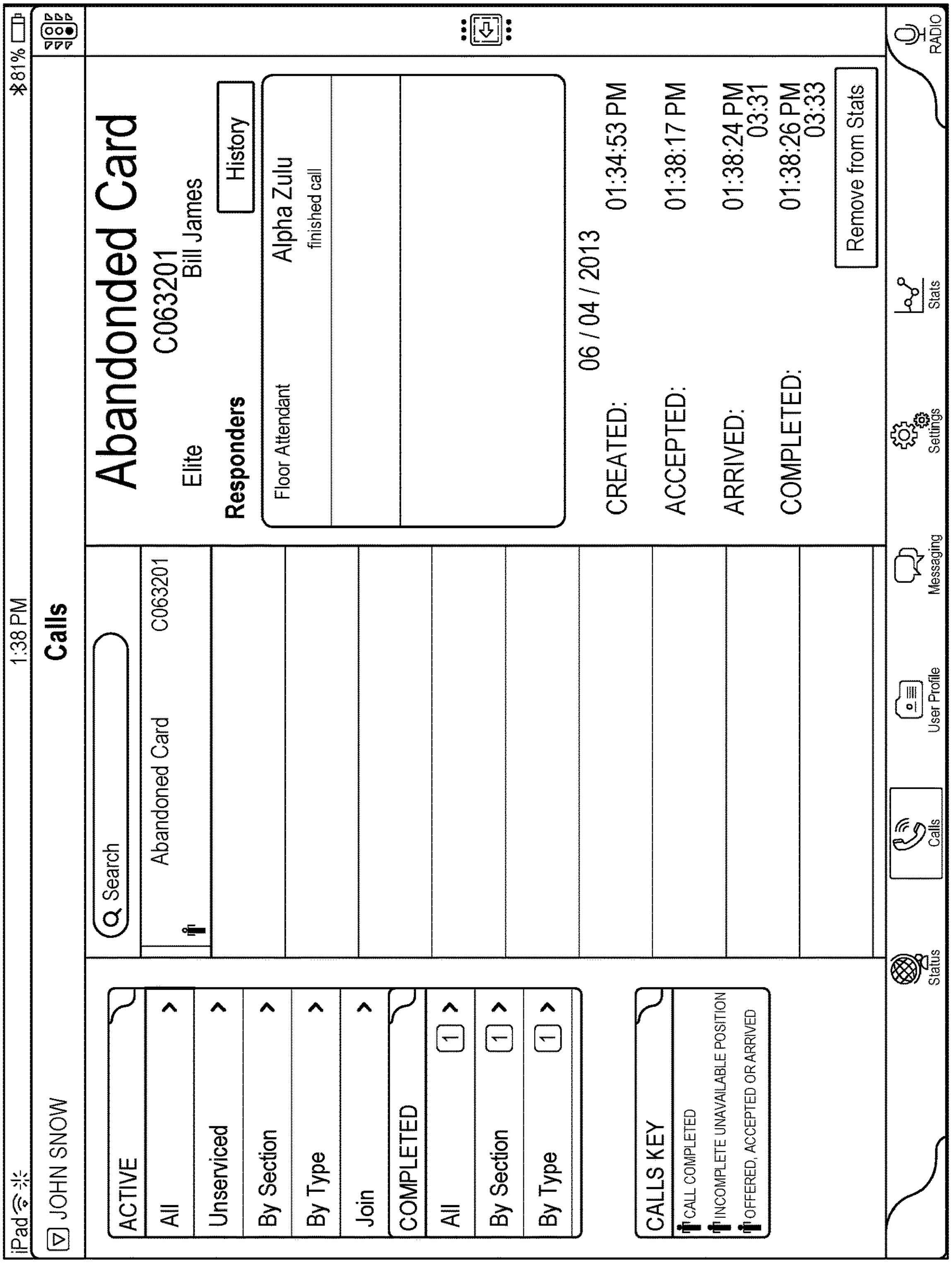
Figure 60:
Figure 61:

FIG. 59 illustrates an Abandoned Card event. This can be an employee card or a player's card. When a player's card is left in a card slot and a predefined length of time passes with no activity detected by the network on the machine associated with the card reader, the system generates an Abandoned Card event as shown in FIG. 59. When an employee's card is left in, and a current call is not completed after a predefined length of time, the Abandoned Card event is generated and offered to a user, as shown in FIG. 60. When the call is accepted in FIG. 60, the screen of FIG. 61 appears, the user heads for the machine having the card and retrieves it, if indeed it is abandoned, or determines what other course of action might be appropriate if there is a player or casino employee there. Like all other events, the usual user commands may be utilized, and the usual goal times and average completion times may be stored and displayed.

Figure 62:
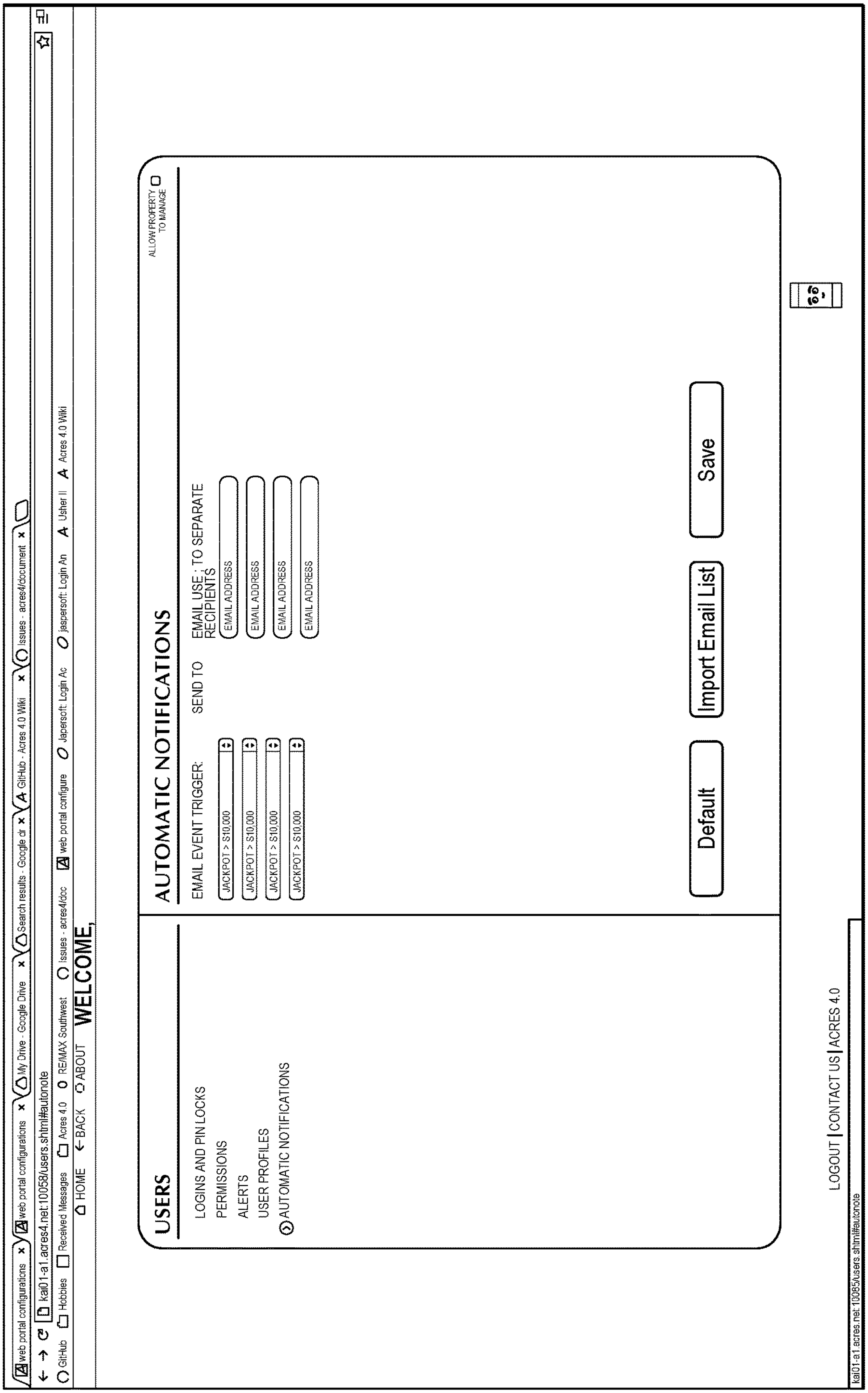

FIG. 62 provides an example of a setting screen for jackpot notifications. In brief, this feature permits a user to enter a mobile phone number or email address to which a notification can be sent upon the initial alert for a jackpot over a predefined amount, when the jackpot event is complete, or both. As can be seen in FIG. 62, multiple events can trigger an email, illustrated in FIG. 62, or text, not shown but implemented in a similar fashion. For example, the four jackpot events, which could each be selected from one of the drop-down menus in FIG. 62, could be set in the system in ranges: $0-$2499; $2500-$9,999; $10,000-$24,999; and $25,000 and up. Email addresses are entered in the text box associated with each event. In the case of text notification, the text field would contain the number of a mobile phone. And both text and email can be generated for carded players, un-carded players, or both. The notification will include the player's name and player's club status, if known, the amount of the jackpot, and the machine location. These notifications are in addition to the usual jackpot events generated by the system to which users must respond, e.g., to hand pay a jackpot. The notifications generated by the feature illustrated in FIG. 62 are more for marketing and player relations, permitting anyone who signs up for such notifications to quickly know about machine locations and players—or in the case of un-carded events, machine locations only—where jackpots of a predetermined size are won.

Figure 63:
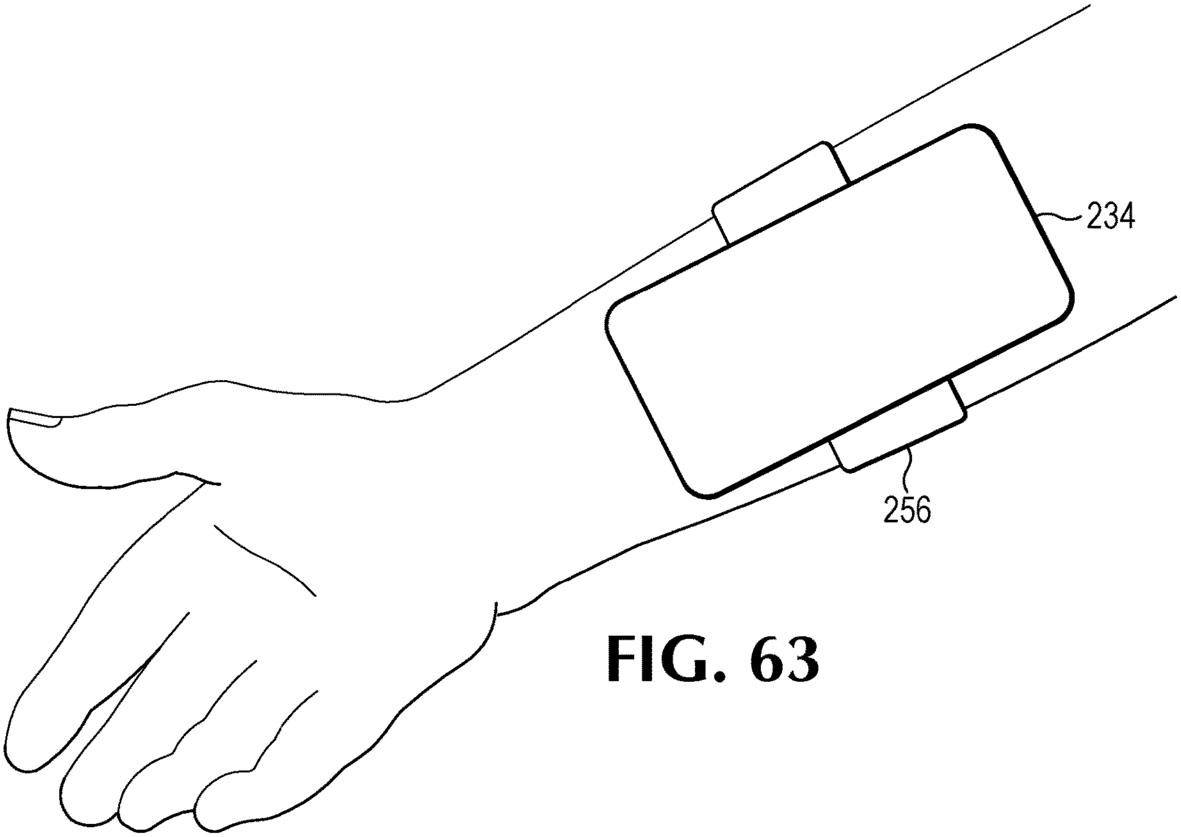
FIG. 63 is a view of an embodiment in use.

In FIG. 63, an arm of a user, indicated generally at 254, has device 234 attached to the user's arm via a strap 256, which can be repeatedly secured to and removed from the user's arm via a hook and loop material, such as Velcro™ material. The view of FIG. 63 shows device 234 as the user may use it on his or her shift. This leaves the user's hands free to perform work on the machine or otherwise carry out his or her duties while being able to refer to the screen responsive to an audible alert or to send a radio or text message. The alert may indicate that a radio or text message is on the way or that the user has received a call, which may come via the device's speaker or via a wireless headphone. As a result, the user typically refers to the device only when necessary as opposed to having to continually refer to it to check the status of communications and calls.

The various embodiments of the system described above, improve the experience of a consumer within a commercial environment. As is obvious, customer satisfaction is essential to gaining repeat business.

Although this discussion describes consumers in the role of gamblers or potential gamblers within a casino, this system is equally beneficial in any gambling environment including within a traditional casino, via mobile communication device, such as a phone, pad or laptop computer and when the consumer is at home via the same devices along with a more traditional fixed personal computer or game device such a Microsoft's Xbox.

The system is also applicable to non-gambling businesses where consumer gratification—leaving the consumer with a positive memory of an experience—is important. In sum, this system may be equally well implemented in any commercial enterprise, both gambling and non-gambling and with physical or virtual presence.

In casino operations, consumer satisfaction is presumed to exist when services are delivered within defined parameters. For example, if a consumer experiences a problem and an agent provides assistance within a prescribed time, it is presumed the consumer is satisfied.

In practice, satisfaction is determined more by the respect, consideration, recognition, empathy, and kindness with which the service is delivered rather than with than the actual service itself or the speed with which it is delivered.

Modern casinos lack the tools with which to personalize services for individual consumers, motivate employee agents to deliver satisfying experiences or to measure the performance of employees or actual satisfaction of consumers.

The systems described above make it possible to personalize services for consumers, motivate employee agents to deliver respectful and gratifying services, and measure the level of consumer satisfaction with each service delivered.

Some embodiments of the invention have been described above, and in addition, some specific details are shown for purposes of illustrating the inventive principles. However, numerous other arrangements may be devised in accordance with the inventive principles of this patent disclosure. Further, well-known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

What is claimed is:

1. A method comprising:

receiving, from an electronic gaming device, one or more activity signals;

determining one or more player account identifiers associated with the electronic gaming device;

determining, based on the one or more activity signals, an agent response call signal; and withholding, based on the one or more player account identifiers, the agent response call signal.

2. The method of claim 1, wherein the one or more activity signals are configured to indicate one or more of: a points jackpot, a deviation in a wagering pattern, a points bonus, a service button activation, a device malfunction, a bill jam, or an empty printer.

3. The method of claim 1, wherein determining the one or more player account identifiers comprises receiving, from the electronic gaming device, the one or more player account identifiers.

4. The method of claim 1, wherein the one or more player account identifiers are determined by the electronic gaming device based on a near field communication from a user device.

5. The method of claim 1, wherein withholding the agent response call signal comprises determining the one or more player account identifiers are associated with low gaming activity.

6. The method of claim 1, further comprising sending, based on a predetermined amount of time passing, the agent response call signal.

7. The method of claim 1, further comprising:
receiving a second activity signal;
determining a priority associated with the second activity signal; and
sending, based on the priority associated with the second activity signal, the agent response call signal.

8. One or more non-transitory computer-readable media storing processor executable instructions thereon, which, when executed by at least one processor cause the at least one processor to:
receive, from an electronic gaming device, one or more activity signals;
determine one or more player account identifiers associated with the electronic gaming device;
determine, based on the one or more activity signals, an agent response call signal; and
withhold, based on the one or more player account identifiers, the agent response call signal.

9. The one or more non-transitory computer-readable media of claim 8, wherein the one or more activity signals are configured to indicate one or more of: a points jackpot, a deviation in a wagering pattern, a points bonus, a service button activation, a device malfunction, a bill jam, or an empty printer.

10. The one or more non-transitory computer-readable media of claim 8, wherein the processor executable instructions that, when executed by the at least one processor, cause the at least one processor to determine the one or more player account identifiers, further cause the at least one processor to receive, from the electronic gaming device, the one or more player account identifiers.

11. The one or more non-transitory computer-readable media of claim 8, wherein the one or more player account identifiers are determined by the electronic gaming device based on a near field communication from a user device.

12. The one or more non-transitory computer-readable media of claim 8, wherein the processor executable instructions that, when executed by the at least one processor, cause the at least one processor to withhold the agent response call signal further cause the at least one processor to determine the one or more player account identifiers are associated with low gaming activity.

13. The one or more non-transitory computer-readable media of claim 8, wherein the processor executable instructions, when executed by the at least one processor, further cause the at least one processor to send, based on a predetermined amount of time passing, the agent response call signal.

14. The one or more non-transitory computer-readable media of claim 8, wherein the processor executable instructions, when executed by the at least one processor, further cause the at least one processor to:
receive a second activity signal;
determine a priority associated with the second activity signal; and
send, based on the priority associated with the second activity signal, the agent response call signal.

15. An apparatus comprising:
one or more processors; and
memory storing processor executable instructions that, when executed by the one or more processors, cause the apparatus to:
receive, from an electronic gaming device, one or more activity signals;
determine one or more player account identifiers associated with the electronic gaming device;
determine, based on the one or more activity signals, an agent response call signal; and
withhold, based on the one or more player account identifiers, the agent response call signal.

16. The apparatus of claim 15, wherein the apparatus comprises one or more of: a virtual slot machine, a virtual card machine, or a virtual table game.

17. The apparatus of claim 15, wherein the one or more activity signals are configured to indicate one or more of: a points jackpot, a deviation in a wagering pattern, a points bonus, a service button activation, a device malfunction, a bill jam, or an empty printer.

18. The apparatus of claim 15, wherein the processor executable instructions, when executed by the one or more processors, further cause the one or more processors to receive, from the electronic gaming device, the one or more player account identifiers.

19. The apparatus of claim 15, wherein the processor executable instructions that, when executed by the one or more processors, cause the one or more processors to withhold the agent response call signal further cause the one or more processors to determine the one or more player account identifiers are associated with low gaming activity.

20. The apparatus of claim 15, wherein the processor executable instructions, when executed by the one or more processors, further cause the one or more processors to:
receive a second activity signal;
determine a priority associated with the second activity signal; and
send, based on the priority associated with the second activity signal, the agent response call signal.

* * * * *